US008511937B2

(12) United States Patent
Obermeyer et al.

(10) Patent No.: US 8,511,937 B2
(45) Date of Patent: Aug. 20, 2013

(54) WATER CONTROL APPARATUS

(75) Inventors: Henry K. Obermeyer, Wellington, CO (US); Robert D. Eckman, Windsor, CO (US); Taewon Mo, Seoul (KR)

(73) Assignee: Henry K. Obermeyer, Wellington, CO (US)

( * ) Notice: Subject to any disclaimer, the term of this patent is extended or adjusted under 35 U.S.C. 154(b) by 0 days.

(21) Appl. No.: 13/012,733

(22) Filed: Jan. 24, 2011

(65) Prior Publication Data

US 2011/0116871 A1    May 19, 2011

Related U.S. Application Data

(63) Continuation of application No. 12/335,346, filed on Dec. 15, 2008, now abandoned, which is a continuation of application No. 11/193,879, filed on Jul. 29, 2005, now abandoned, which is a continuation of application No. 10/192,013, filed on Jul. 9, 2002, now Pat. No. 7,114,879.

(60) Provisional application No. 60/379,401, filed on May 9, 2002, provisional application No. 60/343,834, filed on Oct. 19, 2001, provisional application No. 60/334,870, filed on Oct. 18, 2001, provisional application No. 60/329,090, filed on Oct. 13, 2001, provisional application No. 60/304,263, filed on Jul. 9, 2001.

(51) Int. Cl.
*E02B 7/40* (2006.01)

(52) U.S. Cl.
USPC .............................. 405/91; 405/115; 277/644

(58) Field of Classification Search
USPC ....... 405/87–91, 98–100, 103–107, 114–116, 405/65, 71; 277/640, 644
See application file for complete search history.

(56) References Cited

U.S. PATENT DOCUMENTS

| 2,191,142 | A | * | 2/1940 | Greening ...................... 277/644 |
| 3,173,269 | A | | 3/1965 | Imbertson |
| 3,298,794 | A | * | 1/1967 | Mikesell, Jr. et al. ......... 422/242 |
| 3,638,429 | A | | 2/1972 | Sladek et al. |
| 3,786,638 | A | | 1/1974 | Fish |

(Continued)

FOREIGN PATENT DOCUMENTS

| DE | 195 13 145 A1 | 11/1996 |
| DE | 299 03 284 U1 | 5/1999 |

(Continued)

OTHER PUBLICATIONS

"Advances in Icing Control at Corps Hydraulic Structures", US Army Corps of Engineers: Cold Regions Research & Engineering Laboratory, No. 31, Nov. 2001.

(Continued)

*Primary Examiner* — Sunil Singh
(74) *Attorney, Agent, or Firm* — Santangelo Law Offices, P.C.

(57) ABSTRACT

The invention relates to improved water control gates and related inflatable actuators, and associated sealing, manufacture and operation apparatus and methods. Advancements in technologies related to air fitting design, inflated bladder stress relief, inflatable bladder strength enhancement, water gate related slide friction mitigation, abutment and other impounded water seals, gate panel fabrication, traffic accommodating water impoundment structures, and water gate panel system operation efficiency, as well as nappe aeration, hinges, and bladder manufacture technology are disclosed herein.

45 Claims, 85 Drawing Sheets

(56) References Cited

U.S. PATENT DOCUMENTS

| | | | |
|---|---|---|---|
| 3,855,800 A | 12/1974 | Ganzinotti | |
| 3,861,081 A * | 1/1975 | Maskell | 49/70 |
| 3,975,915 A | 8/1976 | Haw | |
| 4,103,497 A | 8/1978 | Colamussi et al. | |
| 4,167,358 A | 9/1979 | Besha | |
| 4,299,514 A | 11/1981 | Muramatsu et al. | |
| 4,330,224 A | 5/1982 | Muramatsu et al. | |
| 4,498,810 A | 2/1985 | Muramatsu et al. | |
| 4,662,783 A | 5/1987 | Muramatsu et al. | |
| 4,702,657 A | 10/1987 | Jelinek | |
| 4,780,024 A | 10/1988 | Obermeyer et al. | |
| 4,836,713 A | 6/1989 | Muramatsu et al. | |
| 4,877,351 A | 10/1989 | Enami | |
| 4,877,352 A | 10/1989 | Tuttle et al. | |
| 4,881,854 A | 11/1989 | Bowe | |
| 4,909,666 A | 3/1990 | Takasaki | |
| 5,067,851 A | 11/1991 | Fujisawa et al. | |
| 5,092,707 A | 3/1992 | Obermeyer | |
| 5,230,585 A | 7/1993 | Fujisawa et al. | |
| 5,318,381 A | 6/1994 | Enami et al. | |
| 5,538,360 A | 7/1996 | Obermeyer | |
| 5,577,863 A | 11/1996 | Nottle | |
| 5,642,963 A | 7/1997 | Obermeyer | |
| 5,709,502 A | 1/1998 | Obermeyer | |
| 5,713,699 A | 2/1998 | Obermeyer et al. | |
| 5,879,767 A | 3/1999 | Matsushima et al. | |
| 6,019,898 A | 2/2000 | Johnson | |
| 6,102,620 A | 8/2000 | Muramatsu | |
| 6,196,763 B1 | 3/2001 | Obermeyer | |
| 6,328,840 B1 | 12/2001 | Takano et al. | |
| 6,346,163 B1 | 2/2002 | Mizota | |
| 6,348,120 B1 | 2/2002 | Takasaki et al. | |
| 6,354,762 B1 | 3/2002 | Muramatsu | |
| 6,467,998 B1 | 10/2002 | Timms | |
| 2003/0143027 A1 | 7/2003 | Obermeyer et al. | |
| 2003/0190193 A1 | 10/2003 | Waters | |
| 2006/0072969 A1 | 4/2006 | Obermeyer et al. | |

FOREIGN PATENT DOCUMENTS

| | | | |
|---|---|---|---|
| EP | 1 143 073 A | 10/2001 | |
| FR | 2576936 | 2/1985 | |
| GB | 2030624 A | 4/1980 | |
| GB | 2077825 A | 12/1981 | |
| JP | 55019371 | 2/1980 | |
| JP | 55020835 | 2/1980 | |
| JP | 55032833 | 3/1980 | |
| JP | 5606012 | 6/1981 | |
| JP | 56064013 | 6/1981 | |
| JP | 56146510 | 11/1981 | |
| JP | 56146511 | 11/1981 | |
| JP | 57006012 | 1/1982 | |
| JP | 57006013 | 1/1982 | |
| JP | 57029719 | 2/1982 | |
| JP | 57044014 | 3/1982 | |
| JP | 57048008 | 3/1982 | |
| JP | 57066215 | 4/1982 | |
| JP | 57140414 | 8/1982 | |
| JP | 57155414 | 9/1982 | |
| JP | 57169122 | 10/1982 | |
| JP | 57205606 | 12/1982 | |
| JP | 58176310 | 10/1983 | |
| JP | 59015111 | 1/1984 | |
| JP | 59041506 | 3/1984 | |
| JP | 5904416 9 | 3/1984 | |
| JP | 59044417 | 3/1984 | |
| JP | 59048512 | 3/1984 | |
| JP | 60095016 | 5/1985 | |
| JP | 60173209 | 9/1985 | |
| JP | 60199110 | 10/1985 | |
| JP | 60219313 | 11/1985 | |
| JP | 60219314 | 11/1985 | |
| JP | 60246912 | 12/1985 | |
| JP | 61049014 | 3/1986 | |
| JP | 61064912 | 4/1986 | |
| JP | 61087008 | 5/1986 | |
| JP | 61098809 | 5/1986 | |
| JP | 61098810 | 5/1986 | |
| JP | 61200215 | 9/1986 | |
| JP | 61270409 | 11/1986 | |
| JP | 62033918 | 2/1987 | |
| JP | 62090420 | 4/1987 | |
| JP | 62090421 A * | 4/1987 | |
| JP | 63007409 | 1/1988 | |
| JP | 63055210 | 3/1988 | |
| JP | 63147007 | 6/1988 | |
| JP | 63261010 | 10/1988 | |
| JP | 01167611 | 7/1989 | |
| JP | 01250512 | 10/1989 | |
| JP | 01280114 | 11/1989 | |
| JP | 01280115 | 11/1989 | |
| JP | 01280134 | 11/1989 | |
| JP | 01287319 | 11/1989 | |
| JP | 01290813 | 11/1989 | |
| JP | 02080708 | 3/1990 | |
| JP | 02171409 | 7/1990 | |
| JP | 02171410 | 7/1990 | |
| JP | 02178410 | 7/1990 | |
| JP | 02190508 | 7/1990 | |
| JP | 02190509 | 7/1990 | |
| JP | 02279815 | 11/1990 | |
| JP | 02279816 | 11/1990 | |
| JP | 03039513 | 2/1991 | |
| JP | 03055308 | 3/1991 | |
| JP | 03151408 | 6/1991 | |
| JP | 03219175 | 9/1991 | |
| JP | 03224908 | 10/1991 | |
| JP | 03235808 | 10/1991 | |
| JP | 04011109 | 1/1992 | |
| JP | 04034111 | 2/1992 | |
| JP | 04062220 | 2/1992 | |
| JP | 04083010 | 3/1992 | |
| JP | 04111806 | 4/1992 | |
| JP | 4149306 | 5/1992 | |
| JP | 04161607 | 6/1992 | |
| JP | 04309614 | 11/1992 | |
| JP | 04333713 | 11/1992 | |
| JP | 05079031 | 3/1993 | |
| JP | 05087268 | 4/1993 | |
| JP | 05179857 | 7/1993 | |
| JP | 05230817 | 9/1993 | |
| JP | 05230818 | 9/1993 | |
| JP | 06128928 | 5/1994 | |
| JP | 06200514 | 7/1994 | |
| JP | 06272232 | 9/1994 | |
| JP | 07042136 | 2/1995 | |
| JP | 07150541 | 6/1995 | |
| JP | 7-233517 | 9/1995 | |
| JP | 07233517 | 9/1995 | |
| JP | 07252815 | 10/1995 | |
| JP | 7269799 | 10/1995 | |
| JP | 0 524 805 | 11/1995 | |
| JP | 8003972 | 1/1996 | |
| JP | 8081945 | 3/1996 | |
| JP | 8085934 | 4/1996 | |
| JP | 8105033 | 4/1996 | |
| JP | 8-134876 | 5/1996 | |
| JP | 8120652 | 5/1996 | |
| JP | 8120653 | 5/1996 | |
| JP | 8120974 | 5/1996 | |
| JP | 8-165632 | 6/1996 | |
| JP | 08232248 | 9/1996 | |
| JP | 294968 | 11/1996 | |
| JP | 2565271 | 12/1996 | |
| JP | 9051732 | 2/1997 | |
| JP | 9-137434 | 5/1997 | |
| JP | 9119124 | 5/1997 | |
| JP | 9119125 | 5/1997 | |
| JP | 9125348 | 5/1997 | |
| JP | 9125349 | 5/1997 | |
| JP | 9125350 | 5/1997 | |
| JP | 9137435 | 5/1997 | |
| JP | 9137631 | 5/1997 | |
| JP | 9151443 | 6/1997 | |
| JP | 9151444 | 6/1997 | |

| | | |
|---|---|---|
| JP | 9195250 | 7/1997 |
| JP | 10005757 | 1/1998 |
| JP | 10-60872 | 3/1998 |
| JP | 10-82034 | 3/1998 |
| JP | 10168861 | 6/1998 |
| JP | 11-200347 | 7/1998 |
| JP | 10-204851 | 8/1998 |
| JP | 10282028 | 10/1998 |
| JP | 11140843 | 5/1999 |
| JP | 11156956 A | 6/1999 |
| JP | 11200350 | 7/1999 |
| JP | 11229357 | 8/1999 |
| JP | 11229359 | 8/1999 |
| JP | 11-256554 | 9/1999 |
| JP | 11269856 | 10/1999 |
| JP | 11-303049 | 11/1999 |
| JP | 11-303050 | 11/1999 |
| JP | 11-303051 | 11/1999 |
| JP | 11-336056 | 12/1999 |
| JP | 080631 | 3/2000 |
| JP | 129991 | 5/2000 |
| JP | 00-240043 | 9/2000 |
| JP | 00-297419 | 10/2000 |
| JP | 00-297421 | 10/2000 |
| JP | 290974 | 10/2000 |
| JP | 290980 | 10/2000 |
| JP | 1107339 | 4/2001 |
| JP | 1132322 | 5/2001 |
| JP | 1152433 | 6/2001 |
| JP | 1152739 | 6/2001 |
| JP | 1164542 | 6/2001 |
| JP | 0 726 364 | 11/2001 |
| WO | WO 90/00649 | 12/1990 |
| WO | WO 03/006747 | 1/2003 |

OTHER PUBLICATIONS

"Environmental energy association business", http://hokoku-kogyo.co.jp/eg/energy/index.htm, printed Apr. 25, 2002, 1 page.
"Hochwasserschutz mit Mobilelementen", Wasserbaq in Niederster-rfic.
"Hokoku World", http://www.hokohu-kogyo.co.jp/eg/seihin.htm, printed Apr. 25, 2002, 1 page.
"Icing Reduced with Plastic on Miter Gate Recess Walls", REMR Technical note HY-N-1.10, Suppl 6, 1994.
"SR Combination Inflatable Dam", Public Works Research Center, Applicants for Examination and Certification: Tokyo Boeki Ltd.; Niigata Mechatronics Co., Ltd.; and Lida Tekko Co., Ltd, Dec. 2000.
"Water Guard", Hokoku Ind.
Army Corps of Engineers, Navigable Dam Including Wicket Gate Section, Plate No. 11-24, Apr. 1996.
Haynes, D., et al. "Air-Bubbler Systems and High-Density Polyethylene Sheets Alleviate Icing at Locks and Dams", http://www.wes.army.mil/REMR/bulls/vol12/no2/text/bubbler.html, printed Apr. 29, 2002, 1 pag.
http://web.tiscali.it/jolleytech/habsp.jpg, printed Jul. 8, 2002, 1 page.
Interpretation of http://web.tiscali.it/jolleytech/habsp.jpg, 1 page.
Obermeyer Hydro, Inc., Water control Solutions, Spillway Gates, Rubber Dams and Inflatable Dams; http://www.obermeyerhydro.com, Apr. 30, 2002; 17 pages.
U.S. Appl. No. 60/304,263, "Inflatable article with reduced stress concentrations", filed Jul. 9, 2001.
U.S. Appl. No. 60/329,090, "Inflatable article and method of manufacturing same", filed Oct. 13, 2001.
U.S. Appl. No. 60/334,870, "Roadway flood protection and traffic barrier", filed Oct. 18, 2001.
U.S. Appl. No. 60/343,834, "Roadway flood protection and traffic barrier with simplified mounting means", filed Oct. 19, 2001.
U.S. Appl. No. 60/379,401, "Water Control Gate and Actuator Therefore", filed May 9, 2002.
SPX Power Team, Inflatable Jack, www.powertean.com.
Tuthill, A., "Ice-Affected Components of Locks and Dams", US Army Corps of Engineers: Cold Regions Research and Engineering Laboratory Feb. 2002.
English Translation of Office Action, Aug. 25, 2005, 5 pages for Taiwan patent Application No. 92109468.

* cited by examiner

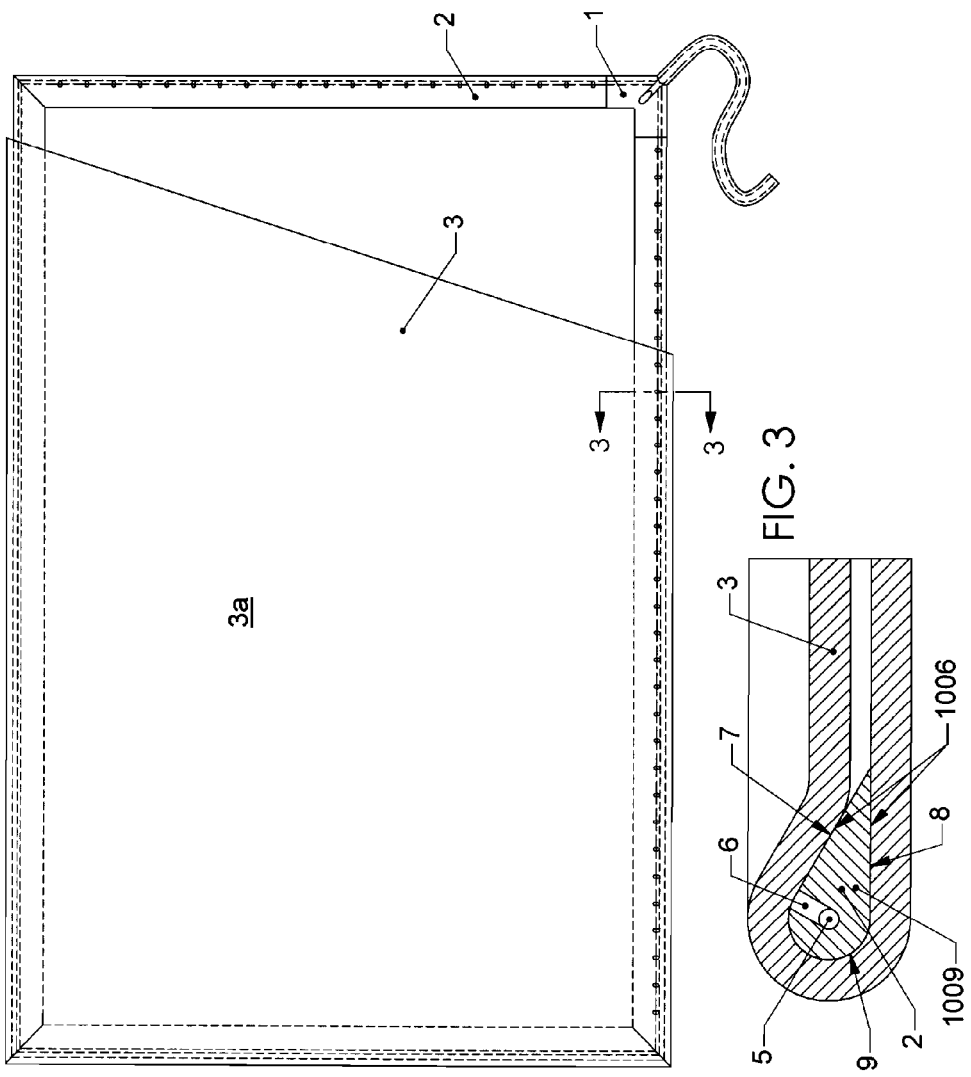

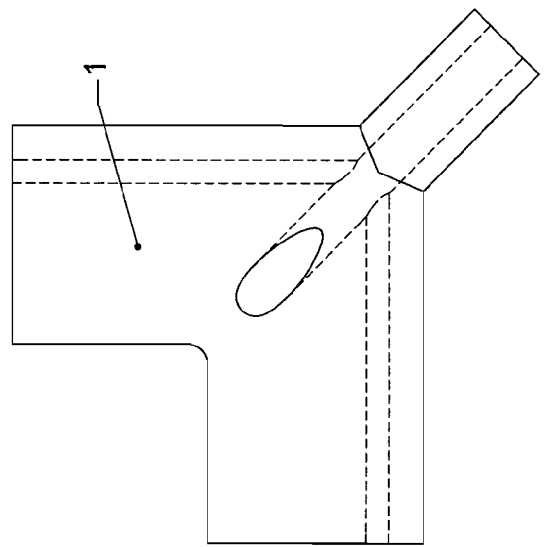
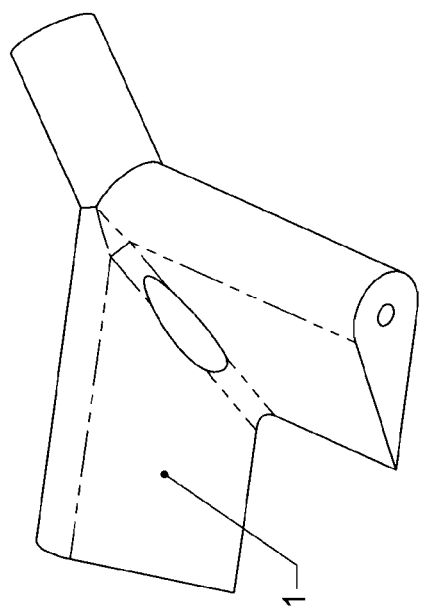
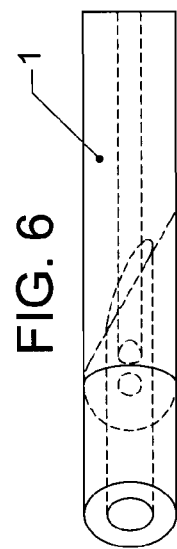
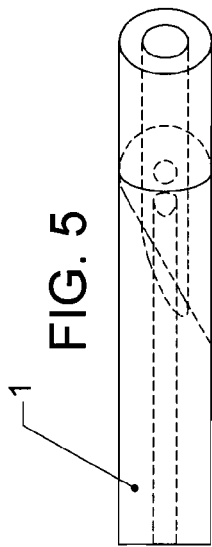

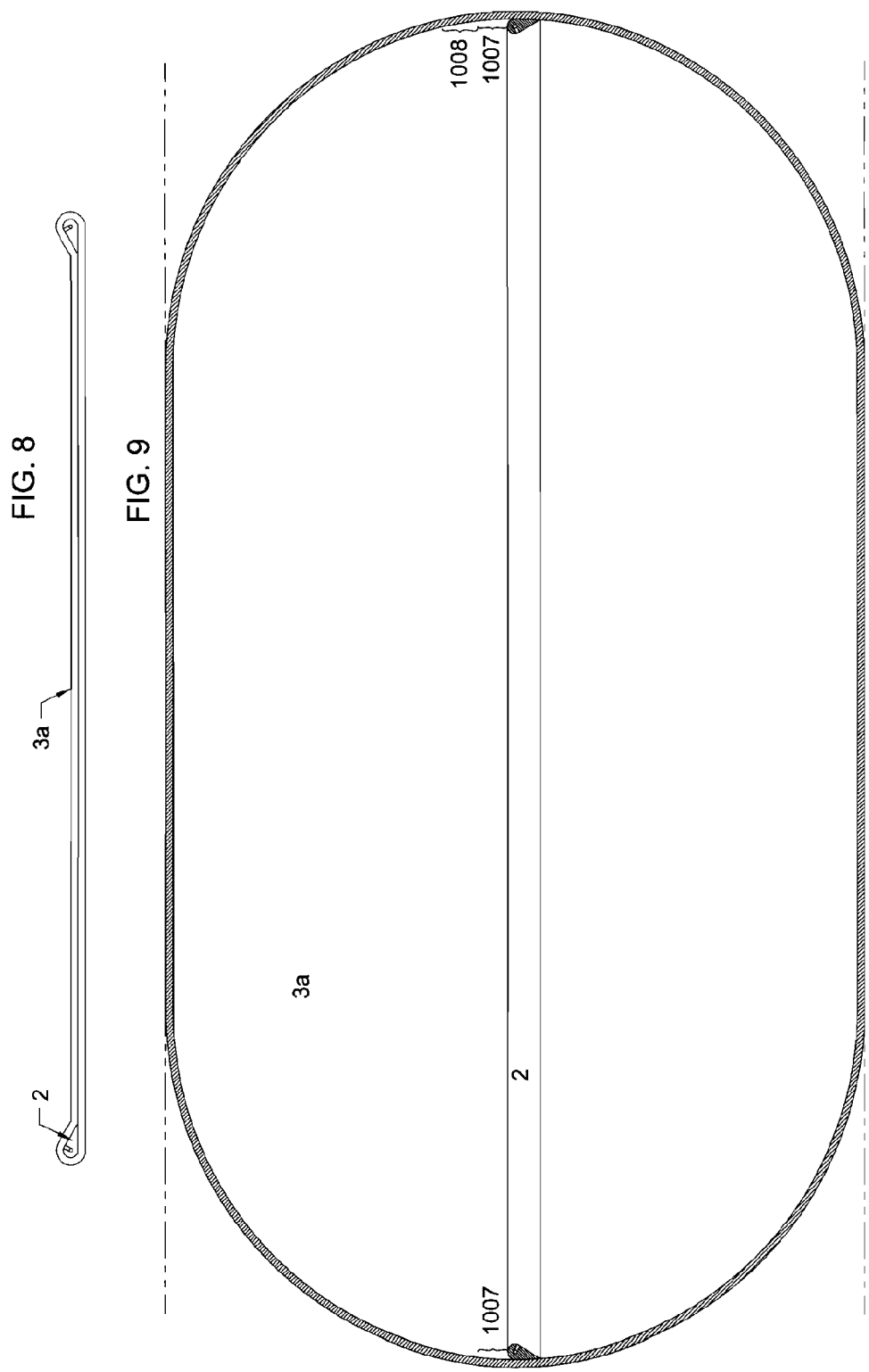

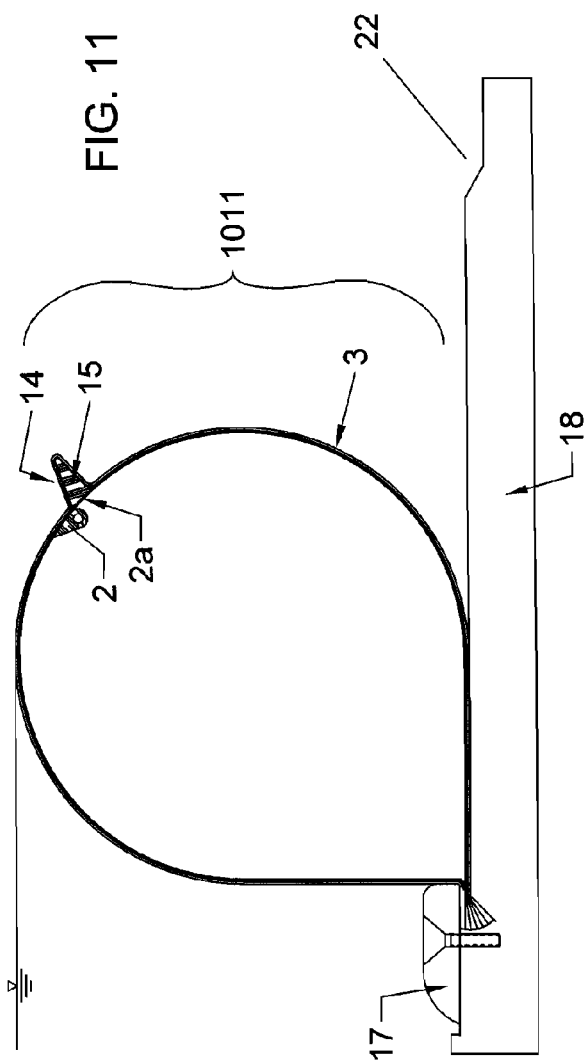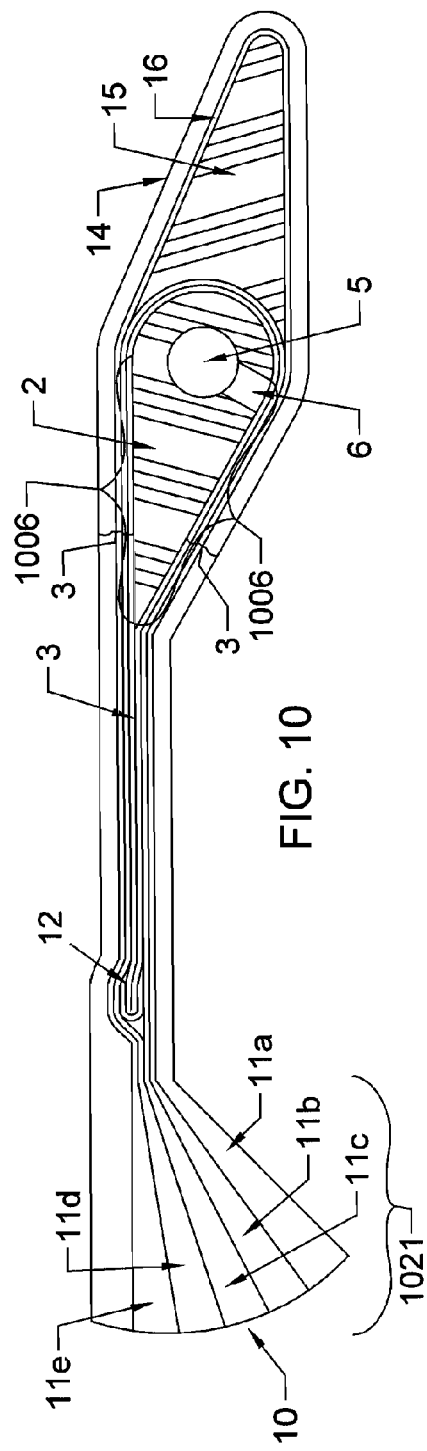

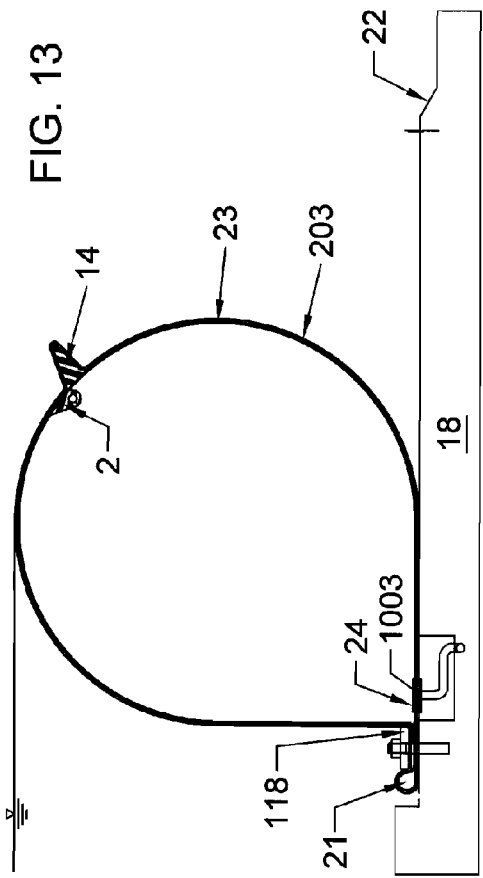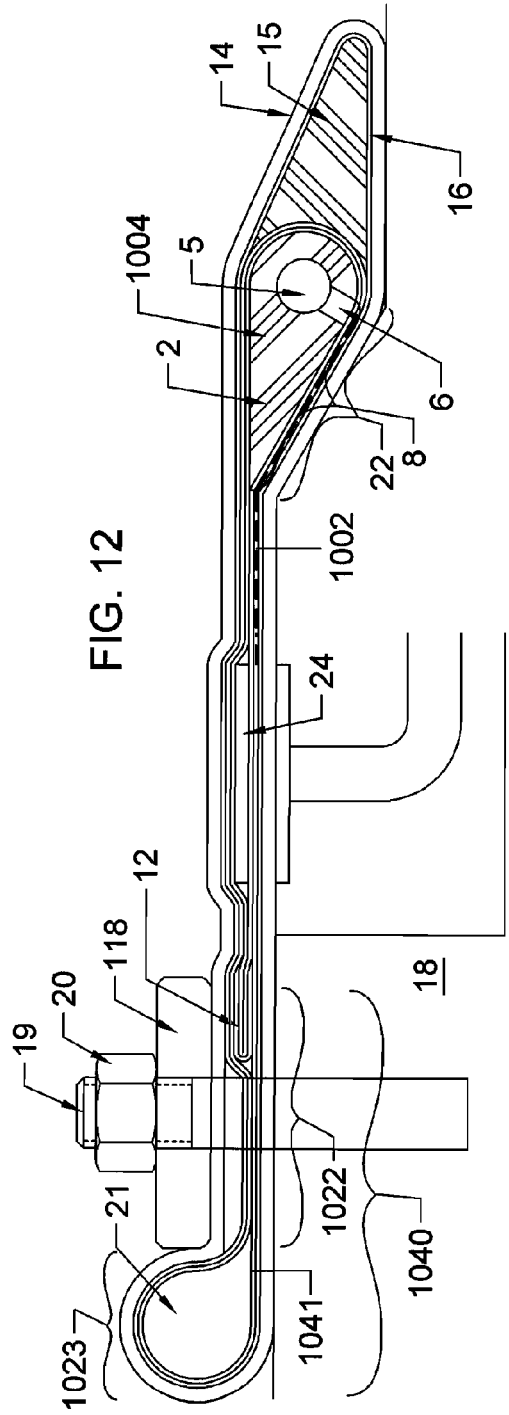

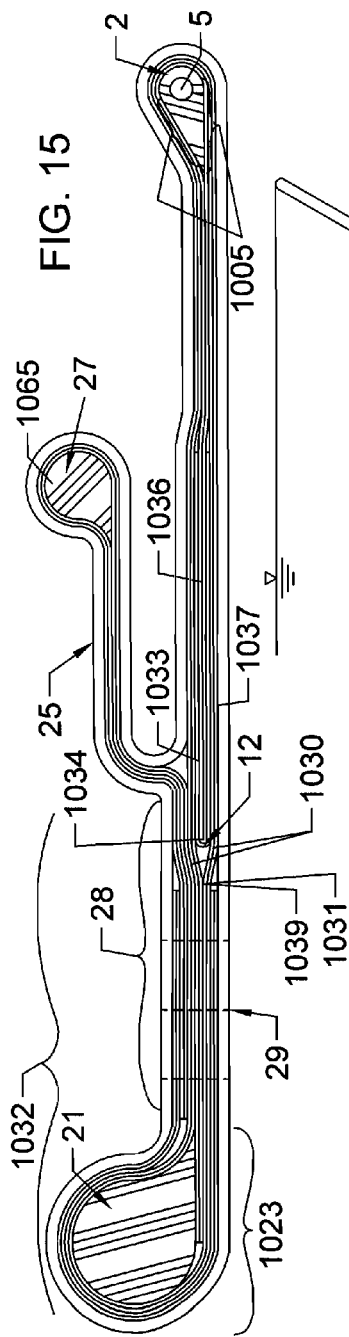
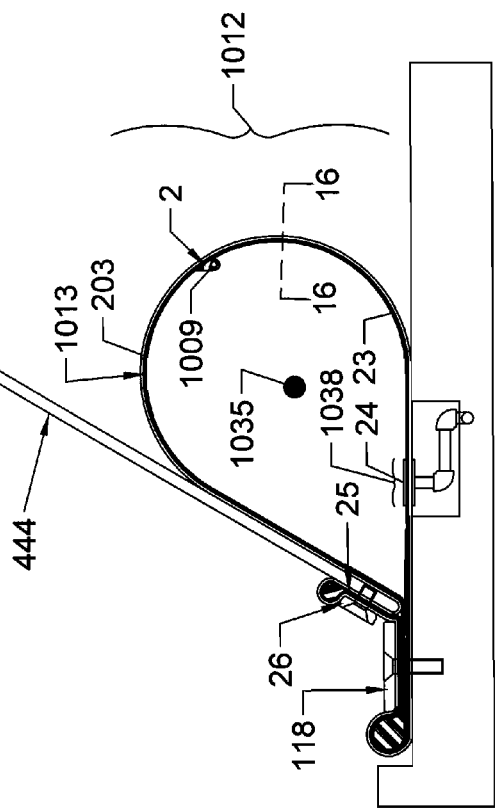
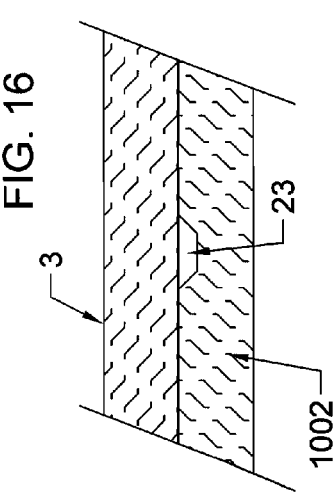

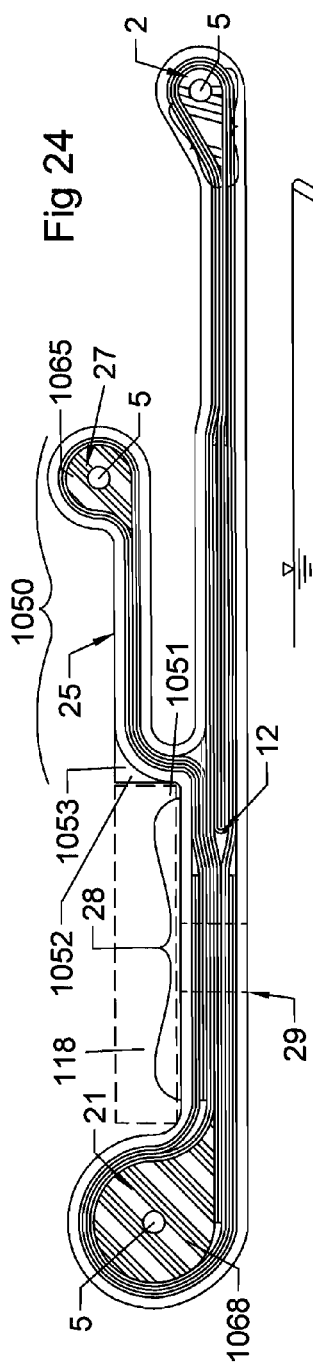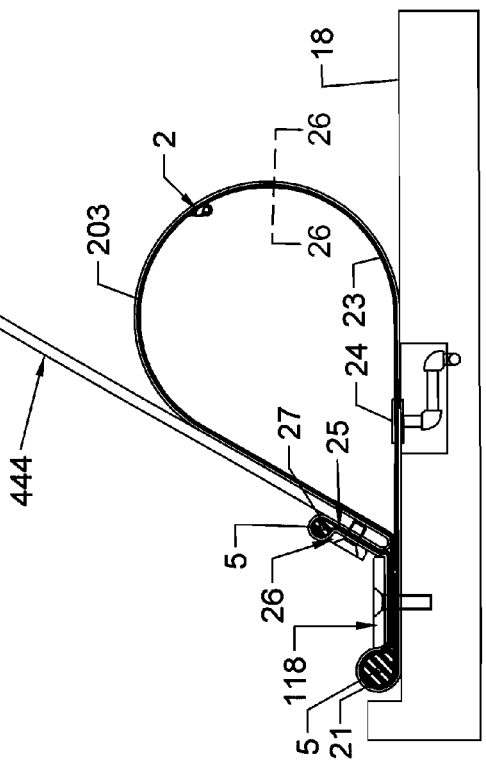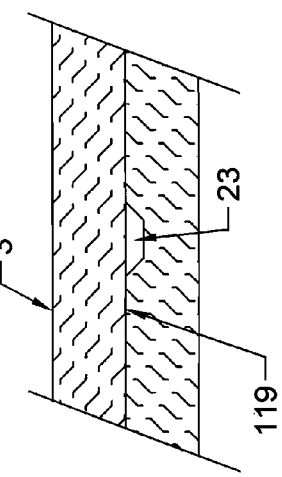

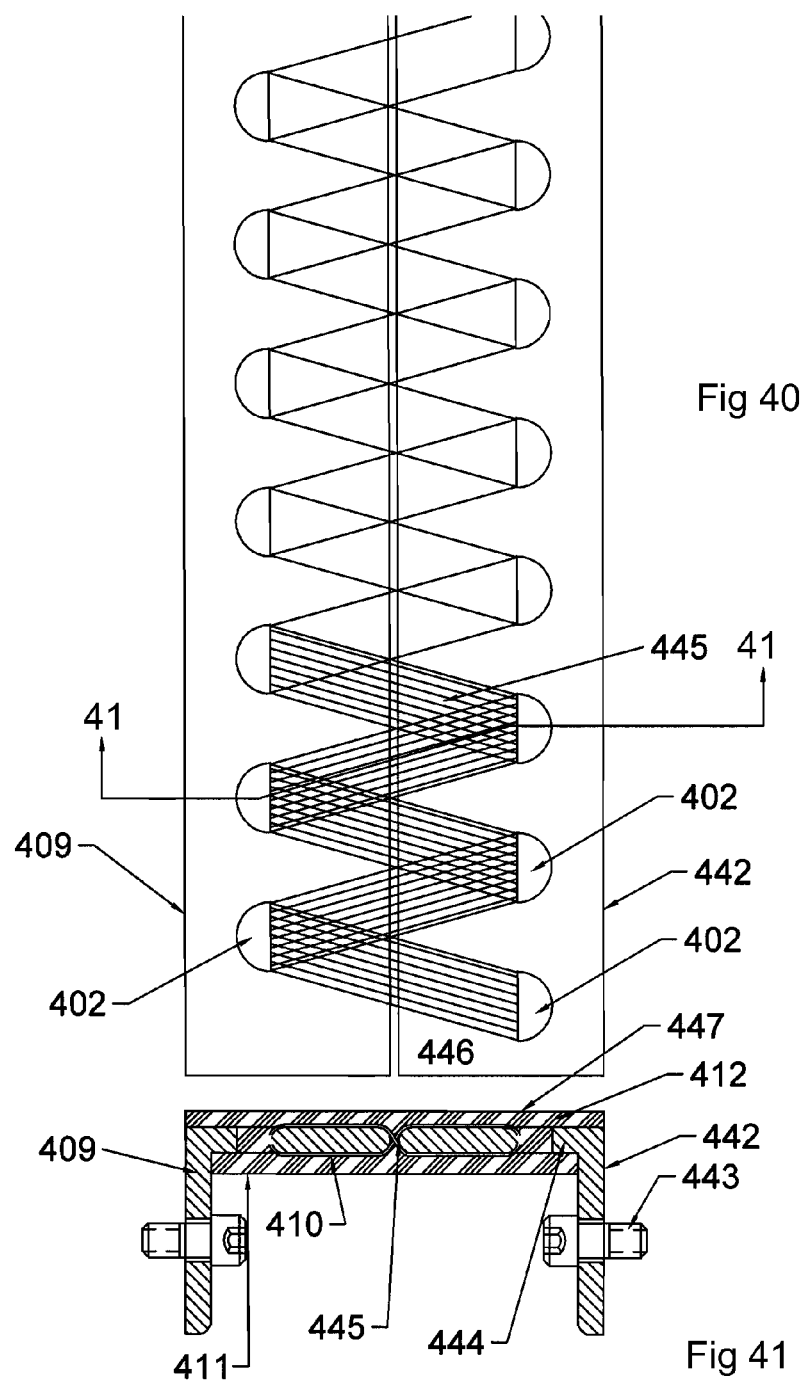

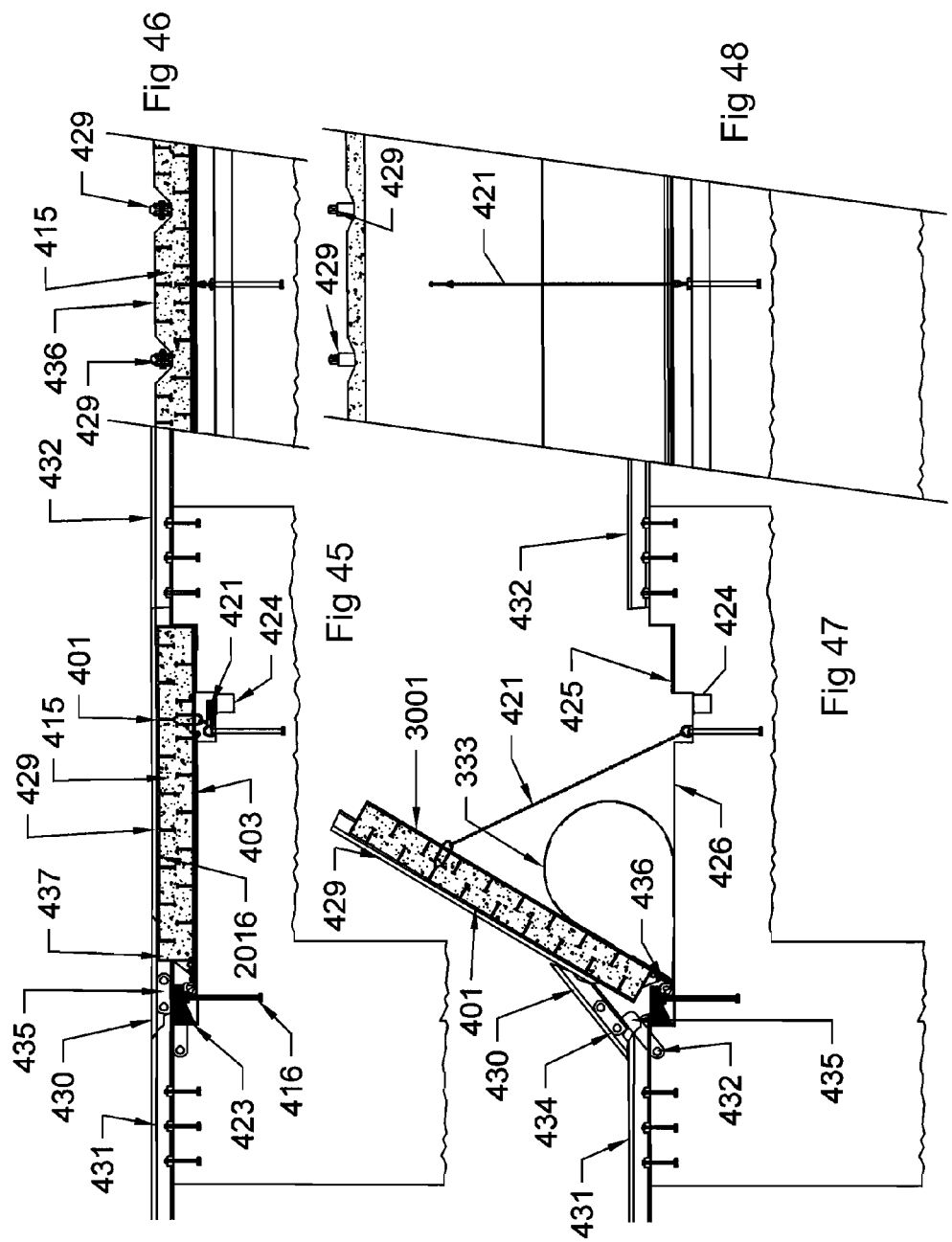

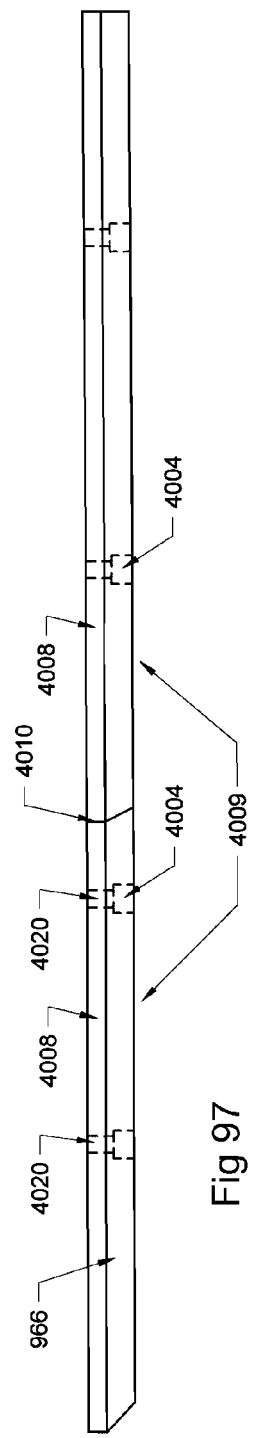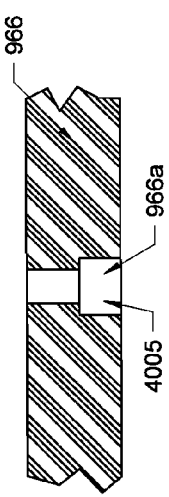

WATER CONTROL APPARATUS

This application is a continuation application of, and claims the benefit of and priority to U.S. patent application Ser. No. 12/335,346, filed Dec. 15, 2008, published on Jul. 16, 2009 as US Publication Number 2009-0180835 A1 which itself is a continuation application of, and claims the benefit of and priority to U.S. patent application Ser. No. 11/193,879, filed Jul. 29, 2005, published on Jul. 31, 2003 as US Publication US 2006-072969 A1 which itself is a continuation application of, and claims the benefit of and priority to, U.S. patent application Ser. No. 10/192,013, filed Jul. 9, 2002, published on Jul. 31, 2003 as US Publication US 2003-0143027 A1, and issued on Oct. 3, 2006 as U.S. Pat. No. 7,114,879, each of which are hereby incorporated herein by reference, said application itself claiming benefit of and priority to: U.S. Provisional Application No. 60/304,263 filed Jul. 9, 2001; U.S. Provisional Application No. 60/329,090 filed Oct. 13, 2001; U.S. Provisional Application No. 60/334,870 filed Oct. 18, 2001; U.S. Provisional Application No. 60/343,834 filed Oct. 19, 2001; and U.S. Provisional Application No. 60/379,401 filed May 9, 2002, each of said applications hereby incorporated herein by reference.

I. BACKGROUND OF THE INVENTION

1. Field of Invention

The present invention relates to water control gates and inflatable dams for control of water for use in conjunction with, but not limited to, dam spillways, hydroelectric projects, flood control structures, river diversions, irrigation canal check structures, roadway water barriers, levee crossings, parking garage water barriers, to inflatable actuators therefore, to inflatable actuators in general, to reinforced elastomeric hinges therefore, and to inflatable articles in general such as actuators for machines such as presses, dunnage bags, inflatable jacks, collapsible hoses and the like. The inflatable actuators herein disclosed may have many other applications, particularly where low cost, long life and reliability are important.

2. Description of Related Art

Various attempts have been made to develop economical water control gates. In many instances, the most economic water control gates are air actuated bottom hinged gates and inflatable dams. As but one advantage, the position of a plurality of water control gates can be infinitely adjusted by adjustment of the inflatable actuator pressures. Various patents relating to air-actuated bottom hinged gates and relating to inflatable dams are attached to this application and are hereby incorporated by reference. Various other materials relating to what may be prior art are also attached and are also hereby incorporated by reference. Hydraulically or mechanically operated gates are generally more expensive than the aforementioned air operated gates and inflatable dams, particularly if the cost of construction of required associated piers, equipment platforms, service cranes and bridges is accounted for. The limitations heretofore of inflatable dams have included high stresses at the downstream fold. In the case of inflatable dams manufactured from a single flat sheet, these stresses in the elastomeric material may occur with the inflatable dam in the inflated configuration. Failure may result due to a combination of tensile stresses in the outermost layers due to bending of the dam body in conjunction with flow induced vibration associated with a rounded flexible surface from which flow may separate in an oscillatory manner. In the case of inflatable dams manufactured as a folded sheet, high tensile stresses may result in both the elastomeric inner-liner and in the inner most plies of reinforcing fabric when the dam is inflated. These high stresses in the reinforcing fabric may dictate that a high elongation fiber such as nylon be used even though nylon may have inferior long term water resistance compared to polyester, for example. The high stresses may generally lower the factor of safety or increase the overall cost of such an inflatable dam. Furthermore, even if reinforcement failure is avoided, high tensile stresses in the elastomeric inner-liner may result in cracking which may cause air leakage into the fiber reinforcement. This fiber reinforcement may be exposed at other locations resulting in gradual but undesirable air loss from the inflatable dam. Furthermore, inter-ply pressures may be increased, which may result in long-term oxygen degradation of the dam body and the susceptibility of the outer cover to blistering.

The limitations heretofore of bottom hinged air actuated gates have been the requirement for custom field fitting of seals, the requirement for heating of abutment plates during icing conditions, and the somewhat higher cost, relative to benefits, of gates for low damming heights such as 2 meters or less. Specifically, with respect to gates for low damming heights such as 2 meters or less, the designs of the prior art have generally fallen into two categories. In the first category are designs such as those described in U.S. Pat. No. 5,092,707 to Obermeyer, U.S. Pat. No. 5,538,360 to Obermeyer, and U.S. Pat. No. 5,713,699 to Obermeyer et al. The designs of this first category call for a secondary vulcanization process for joining of the seam under the clamp bar. Secondary vulcanization processes (an additional, second vulcanizing process) may entail extra expense and may result in joints, which are less reliable than those created using a single stage vulcanization (merely one vulcanizing process) used in accordance with at least one embodiment of the present invention. Furthermore, said secondary vulcanization process can, at best, provide an elastomeric seal under the clamp bar. Continuity of circumferential reinforcement around the inflatable portion of the air bladder may not be accomplished by simply bonding and sealing the clamped joint in a secondary vulcanization step. Although the use of a wedge type clamping system as disclosed in U.S. Pat. No. 5,709,502 to Obermeyer eliminates the requirement for a vulcanized joint under the clamp system, the clamp system itself may become relatively expensive as damming heights become lower.

A disadvantage common to both inflatable dams with clamped unvulcanized joints and to air actuated bottom hinged gates with vulcanized joints is the phenomenon of creep of the elastomer compressed under the clamp system. Proper functioning of each system may generally rely on sufficient compressive stress under the clamp to prevent air leakage. The higher the compressive stress, the higher the associated shear stress becomes which, in turn, may lead to increased creep rates. Thus, the more securely such a clamp is tightened, the more often it may require re-tightening. Proper maintenance requires a careful balance between insufficient tightening which may result in leakage or system failure and excessive tightening which may lead to high rates of creep and also to system failure.

Conventional inflatable dams may also be subject to vibration during over-topping conditions. Attempts have been made to aerate a nappe, leaving a fin by varying the dimensions of the fin or by providing discrete fins. Even with these mitigative measures, vibration may still be a problem under certain flow conditions.

Additionally, the air fittings most commonly used in conjunction with air actuated bottom hinged gates and inflatable dams of the prior art may require protection during installation and may include sharp-machined edges. These sharp edges of these air fittings may damage or even penetrate adjacent air bladders if several air bladders are stacked for shipment or if such a fitting were to be installed prior to rolling up a long inflatable dam.

Additionally, air actuated bottom hinged gates and inflatable dams of existing systems may generally not be well suited for vehicle or pedestrian traffic when in the lowered or deflated position. Conventional bottom hinged water control gates may be fitted with irregularly shaped hinges and reinforcing ribs which may not obstruct water flow but may pose a hazard or even a barrier to vehicular or pedestrian traffic.

Conventional bottom hinged water control gates have also incorporated restraining straps, which may protrude from beneath the lowered gate panels. The protrusion of said restraining straps may be hazardous to pedestrian traffic. Such protruding restraining straps may be damaged by vehicular traffic. Furthermore, the protrusion of these restraining straps may be undesirable in certain water control applications even where traffic is not a design criterion.

Conventional bottom hinged roadway and walkway water barriers have in some cases utilized mechanical hinges, which may be subject to leakage of water and corrosion and in some cases have used mechanical actuators, which may be subject to corrosion. Additionally, such mechanical hinges may require precise alignment, which may be expensive.

Inflatable articles such as lifting bags (inflatable jacks), dock bumpers, hoses, inflatable dams and spillway gate actuators are typically manufactured by one of two methods. In the first method an internal mandrel or tool is used to define an internal surface with rounded edges. This method requires a secondary bonding operation or special device to seal the opening through which the mandrel or tool may be removed. In the second method, the interior is allowed to simply fold flat while the interior surfaces are prevented from bonding by means of a release film. This results in extreme stress concentrations of the inner liner in the inflated condition and, with multiple layers of reinforcement, extremely uneven load sharing between the layers of reinforcement. A third method utilizes three dimensional soluble mandrels of eutectic salts, aluminum, paper mache, etc. This type of soluble mandrel is expensive, time consuming, and in the case of salt, very fragile.

Conventional spillway and navigation dam gates may be fitted with individual actuators or, in some instances, may be lifted to raised and locked positions one by one from a work boat or overhead cable hoist. Lifting the gates from overhead with either a boat or cableway may require dangerous work by highly skilled operators. Individual actuators may be too expensive for some projects. The use of very long spans of actuated water control gates in lieu of levees has often been cost prohibitive with existing systems.

Conventional spillway gates often use nappe breakers to prevent vibration under conditions of small amounts of overtopping. Such nappe breakers are generally made of steel and are easily damaged by winter ice flows.

II. SUMMARY OF INVENTION

It is an object of an aspect of this invention to provide a low-cost alternative to current water control gates for low damming heights, which is easy to transport and install, and which does not require heated abutment plates for winter operation. It is another object of an aspect of this invention to provide, in one type of embodiment, a gate system which may be driven over or walked upon without undue hazard or damage to the gate system. It is another object of an aspect of this invention to provide a low cost flood control barrier, which may be suitable for spanning long distances.

In accordance with at least one embodiment of this invention, an air bladder is provided which may be inflated, for quality control purposes for example, without the requirement that this air bladder be secured to a spillway or special test fixture.

In accordance with another aspect of this invention, air bladders may contain plies of reinforcement which are continuous, except for any splices, around the circumference of said inflated air bladder and which may cross the joint connecting the inflated portions of said air bladders to the clamped portions of said air bladders. Said plies of reinforcement which are continuous may prevent de-lamination of the bonded layers of reinforcement which extend under the clamp bar while the air bladder is pressurized and the clamp is either not yet installed or is not clamped tightly. De-lamination, which can occur in some conventional designs, may reduce structural integrity or cause leakage.

According to another aspect of the invention, air bladders may be vulcanized in a single stage vulcanization process and may not require any secondary vulcanization steps. Such single stage vulcanization may enhance overall structural integrity and may minimize manufacturing costs.

According to another aspect of this invention, air bladders may be secured to a dam spillway, for example, with a simple rectangular clamp bar. This simple rectangular clamp bar may be less expensive, easier to install and require less space than alternative clamping systems. Space on existing spillways to which such gate systems may be retrofitted may be severely restricted.

According to another aspect of this invention, air bladders may be provided with precisely molded ends to which matching inter-panel seals and abutment seals may be fitted to create a leak tight assembly with minimal installation time.

According to another aspect of this invention, an integral hinge flap may be provided which may conform tightly to the downstream face of aforementioned clamp bar. With such a configuration, the trapping of sand or gravel between the hinge flap and the clamp bar may be avoided. Sand and gravel trapped between the hinge flap and the clamp bar may, during actuation of a gate system over time, damage the hinge flap or remove corrosion protection from the clamp bar.

According to another aspect of this invention, air bladders may be provided with air fittings which lack damaging or damageable protrusions. This may be accomplished with a fitting, which may be entirely contained within the lower membrane of an inflatable air bladder as herein disclosed.

According to another aspect of this invention, air fittings may be generally disk shaped and may feature a connection such as pipe threads at a centrally located through-hole.

According to another aspect of this invention, air fittings may feature a tapered profile which may limit undesirable changes in direction of reinforcing fabric. Excessive changes in direction of reinforcing fabric may cause delamination of the layers of the reinforcing from each other or disbonding of the reinforcing from the embedded air fitting.

According to another aspect of this invention, air fittings may feature rounded outer edges, which may prevent the fitting from cutting aforementioned reinforcing fabric.

According to another aspect of this invention, the radius of the rounded outer edges may be sufficiently small such that the formation of voids in the elastomer and the direct contact of reinforcing cords with the air fitting may be avoided.

According to another aspect of this invention, the air fittings may be made of (in part or whole) or coated with a material which bonds to the elastomeric body of said inflatable bladder during vulcanization.

According to another aspect of this invention, said air fittings may be made of brass.

According to another aspect of this invention, inter-panel seals may be provided with a bend in cross-section to enhance flexibility in installations where the distance between adjoining gate panels varies with gate actuation angle, such as on a spillway which is curved in plan view.

According to another aspect of this invention, interpanel seals may be provided which may be identical or similar in profile to the clamped edge of the associated air bladder. In this manner, the inter-panel seals and air bladder may be simultaneously secured to a dam spillway with the same clamp arrangement.

According to another aspect of this invention, abutment seals may be provided which may be identical or similar in profile to the clamped edge of the associated air bladder. In this manner, the abutment seals and air bladder may be simultaneously secured to a dam spillway with the same clamp arrangement.

According to another aspect of the present invention, elastomeric abutment seals may be provided with a bonded low friction wear surface such as polyethylene or PTFE, for example.

According to another aspect of the invention, a polyethylene wear surface is co-vulcanized to a reinforced elastomer containing EPDM (ethylene-propoylene-diene-methylene rubber).

According to another aspect of the present invention, a polyethylene wear surface is co-vulcanized to a reinforced elastomer comprised of a blend including EPDM and Chlorobutyl.

According to another aspect of this invention, an abutment plate may be provided which has low thermal conductivity and low adhesion to ice.

According to yet another aspect of this invention, said abutment plate may be provided with a large number of fasteners and may have a relatively large thickness so as to prevent buckling (including warping) which might otherwise result due to the low modulus and high coefficient of thermal expansion of materials such as polyethylene.

According to another aspect of this invention, the fastener spacing to thickness ratio may be approximately 20 to 1 or less, and is preferably no greater than 12 to 1 (perhaps 8 to 1). In this manner, buckling of the abutment plates when exposed to direct sunlight may be avoided. Buckling is generally undesirable because a leak path may be opened up behind the abutment plate. This leak path may not entirely re-close due to creep of the abutment plate material or the lodging of debris. Buckling is also undesirable because it may interfere with free travel of the adjoining gate panel and seal assembly.

According to another aspect of this invention the fasteners may be recessed below the surface of said abutment plates.

According to another aspect of this invention, the fasteners may be covered with a polyethylene plug or auto body filler like material to leave a smooth surface against which a gate abutment seals may travel.

According to another aspect of this invention, a groove may be provided around the periphery of each of several abutment plate segments so as to allow the placement and retention of sealant.

According to another aspect of this invention, the abutment plate material may contain a dark pigment such as carbon black to facilitate solar heating and to block ultraviolet radiation, which could damage a polymer such as polyethylene.

According to another aspect of the invention the abutment plate material may be ultra high molecular weight (UHMW) polyethylene.

According to another aspect of this invention the abutment plate may be comprised of high density polyethylene.

According to another aspect of this invention, the abutment plates may incorporate reinforcement such as fiberglass which has low thermal conductivity yet may confer stiffness to the abutment plates.

According to another aspect of this invention, a heated seal assembly or other heating means (or, perhaps even, heating element) may be attached to and movable with a gate panel associated with the aforementioned low thermal conductivity abutment plate.

According to another aspect of this invention, an inflatable dam may be provided which, although vulcanized in a folded "deflated" position, features a prescribed finite internal radius along the interior of the downstream edge. This internal radius may be formed, for example, with a removable tool, a soluble tool, or with an extruded elastomeric profile which may be left in place after manufacture.

According to another aspect of the present invention, the unclamped edges of an inflatable article such as an inflatable actuator for a water control gate or the body of a rubber dam may incorporate an elastomeric profile which may be extruded and pre-cured and then subsequently bonded over a portion of its profile to the interior marginal edges of the inflatable article. This elastomeric profile may be "tear drop" shaped and may feature a hole through its center. This hole may be used to locate the profile during manufacture, or may be used as a crush-resistant air supply manifold. The elastomeric profile may be bonded to the interior of the inflatable article along one side, while the rounded surface and opposite flat side remain un-bonded. In this manner, the article may be inflated without being constrained by the profile. Furthermore, a desirable as-molded rounded shape is imparted to the interior of the inflatable article, and the need to remove a tool used for the same purpose is eliminated. Portions of said profile may be selectively bonded with rubber cement, for example, or selectively caused to not bond by the use of release film or agent, in accordance with the compounds and methods used for manufacture.

The economics of some projects may prohibit the use of individual actuators for each gate panel. Accordingly, it is an object of an aspect of this invention to provide a water control gate system that may provide the safe remote actuation capability of more expensive systems with individual gate actuators, while retaining the economy of simple manually operated gates.

It is a further object of an aspect of this invention to provide a method of construction that may be economical for large scale gates.

It is another object of an aspect of this invention to provide gate panels that may be adapted to also serve as a roadway, walkway, or railroad bed surface.

It is another object of an aspect of this invention to provide a water control gate system that may provide for easy and reliable pneumatic actuation yet may also provide a smooth and safe upper surface for vehicular and pedestrian traffic.

It is another object of an aspect of this invention to provide a method of construction that may be economical for a wide range of gate heights.

It is also an object of an aspect of this invention to provide a gate hinge mechanism that may have a high load rating without the requirement for precision rotating bearings, which might require time consuming and expensive field alignment procedures.

It is another object of an aspect of this invention to provide a hinge mechanism that may also serve as a seal which may prevent fluids, particles or contaminates from passing through the hinge assembly.

It is another object of an aspect of this invention to provide a flexible barrier, which may protect the hinge mechanism from corrosive fluids or gasses and may protect the hinge mechanism from abrasive or damaging particles.

It is the further object of an aspect of this invention to provide a hinge that may allow shear loads between the two hinged objects to be transmitted from the flexible cable, cord or fibrous elements to the rigid elements by a bonded chemical connection.

It is the further object of an aspect of this invention that said bonded chemical connection provides an elastic connection, which serves to reduce stress concentrations and optimize the ability of the assembly to accommodate misalignment and absorb dynamic loads without damage. Such an elastic connection may be manufactured using a vulcanizable elastomer such as EPDM, butyl rubber, natural rubber, styrene butadiene rubber, nitrile rubber, chloroprene rubber or blends thereof.

It is the further object of an aspect of this invention to configure flexible and preferably twisted cords, cables or other means so as to resist loads in any direction in the plane normal to the hinge axis and to be able to resist shear loads parallel to the hinge axis, while providing little resistance to rotation about the hinge axis within the angular design limits of the hinge.

It is the further object of an aspect of this invention to utilize pre-assembled groups of cords such as strips of unidirectional tire cord fabric, preferable embedded in rubber or other elastomer.

It is the further object of an aspect of this invention to provide an un-bonded zone between the rigid hinge elements and the flexible elements in the region of rolling contact.

It is the further object of an aspect of this invention to provide smooth rounded edges adjacent the flexible cord elements both in the zone of rolling contact and at the edges where the flexible elements reverse directions.

It is the further object of an aspect of this invention to provide robust mechanical support to the portion of the rigid elements around which the flexible elements wrap, preferably by approximately 50% solid material for support and approximately 50% slotted length for wrapping of the reverse bend of said flexible elements.

A still further object of an aspect of this invention is to provide a low friction and low wear robust hinge mechanism which does not require hard metallic or ceramic surfaces but for which the rigid elements may be fabricated of light weight fiber reinforced composites such as carbon fiber, aramid fiber, ceramic fibers or glass fibers in a matrix of epoxy, polyester, etc.

A still further object of an aspect of this invention is to provide the lowered gate panels with mechanical support through transmission of compressive bearing loads through the deflated air bladders.

A further object of an aspect of this invention is to provide a smooth upper surface in conjunction with a water control gate so as to prevent the entrapment of sediment, debris or other solids, which could hinder the free flow of water.

A further object of an aspect of this invention is to provide a smooth surface, which does not present a danger to recreational water uses such as raft, kayak, and canoe passage.

A further object of an aspect of this invention is to provide a smooth and safe surface for users of swimming facilities and amusement park water features. Such a smooth surface may be molded of vulcanizable elastomers such as EPDM, Butyl rubber, natural rubber, styrene butadiene rubber, nitrile rubber, or blends thereof, for example.

A still further object of this invention is to provide a compact enclosed hinge mechanism which requires no sliding surfaces subject to contamination by abrasives and wear.

Another object of an aspect of this invention is to provide a smooth surface fixed to the bottom of a concrete gate panel against which the air bladder can slide without excessive wear or friction. Such a smooth surface may be manufactured from UHMW polyethylene in conjunction with suitable concrete anchors, for example.

Another object of an aspect of this invention is to provide a smooth low friction corner under the upstream edge of the gate panel around which the inflated air bladder can slide without excessive friction or wear. Such a corner piece may be manufactured from nylon or UHMW polyethylene rod, for example.

A further embodiment of this invention is an articulated gate mounted by a hinge to a mounting element within a roadway or walkway and actuated by inflatable actuators located under the articulated panels of said gate system. The inflatable actuators may be shimmed after installation to transmit compressive loads from the lowered gate panels downward to the foundation slab. For large scale installations, the gate panels are preferably constructed in place of reinforced concrete. This eliminates the need not only for transport of heavy gate panels to the site, but also to relocate the completed gate panels after they are manufactured.

Another object of an aspect of this invention is to provide a water control gate system wherein the restraining straps may be located between the ends of adjacent air bladders and, optionally, between air bladders adjacent abutments and these abutments. This arrangement may allow the simultaneous use of large low pressure air bladders in conjunction with restraining straps which may be sufficiently short to remain covered and protected by the gate panels when said gate panels are in a fully lowered position. Large low pressure air bladders may be generally desirable in that their use generally reduces reaction forces at the associated hinge assembly, reduces gate panel loading, and reduces loads within said air bladders themselves.

Another object of an aspect of this invention is to provide dummy inserts, made of elastomeric material similar to that from which the air bladders are manufactured, for example, within the clamping system to replace the air bladders at locations where said air bladders may be truncated to provide clearance space for restraining straps. In some cases, a radius which may be provided in the as-manufactured shape in conjunction with the inflated radius of adjoining air bladders may provide sufficient clearance for said restraining straps.

A further object of an aspect of this invention is to provide a flood protection barrier means (or, perhaps even, flood protection barrier element) for a railroad which may lie below flood level, such as in the case of a railway passing through a levee. Specifically this invention may allow for rails to be attached to and supported by gate panels which may, in turn, be supported through an inflatable actuator by the underlying foundation.

It is another object of an aspect of this invention to provide articulated segments of rail which can slide over the fixed rails as the gate panel and its rail segments are raised.

A further object of an aspect of this invention is to provide a smooth surface out of cast-in-place polyurethane, for example, over a gate clamp system which would otherwise not be flat.

A further object of an aspect of this invention is the use of a cover plate to provide a smooth surface over the clearance gap above the hinge, which gap may be necessary for the hinged angular upward motion of the gate. Said cover plate may be fixed with a hinge at one edge and may be supported at the opposite edge in such a manner that it may slide as the gate is raised and lowered. The preferred arrangement is to provide a cover plate which may be pivotably mounted to the gate panel and which may be able to slide in an upstream direction over the clamp area as the gate panel is raised.

A still further object of an aspect of this invention is to provide sufficiently large gate panels such that seal leakage between individual gate panels may not be a significant problem.

Another object of an aspect of this invention is a movable actuator that may be positioned and operated safely from a remote dry location. A single actuator may be used to lift, sequentially for example, a large quantity of individual gate panels or segments. After lifting, each gate panel or segment may be held in the raised position by a restraint such as an inexpensive mechanical strut, latch or tension member. These restraints may be designed to release automatically in response to high upstream levels or increased hydrostatic loads on the gate.

For some flood control applications, the gate panels may preferably be constructed in place of reinforced concrete, thus eliminating the need, not only for transport to the site, but also possibly eliminating the need to relocate or lift the gate panels at all once they are manufactured.

Another object of an aspect of one embodiment of the present invention is the casting of concrete gate panels so as to incorporate the associated hinge elements into said gate panels. The expense of hinge fasteners and the expense of labor otherwise required for fastening hinges to finished gate panels may be thus avoided.

Another aspect of the present invention is the provision of flexible nappe breakers (or aerators) which may resist damage due to ice flows. These flexible nappe breakers may be manufactured from reinforced elastomers, for example.

A further aspect of the present invention is the provision of vertically extended inter-panel seals or abutment seals which may also serve as flexible nappe breakers.

III. BRIEF DESCRIPTION OF THE DRAWINGS

Note that the following drawings relate to one or more embodiment only and are not in any way to limit the invention, embodiments thereof, claims, or elements thereof. Other objects, advantages and capabilities of the present invention will become apparent as the description proceeds taken in conjunction with the following drawings in which:

FIG. 1 is a cut-away view of an inflatable jack. Inflatable membrane 3 wraps around extruded member 2. Air may be supplied through pre-molded shape 1 through hose 4.

FIG. 2 is a cut-away plan view of the inflatable jack depicted in FIG. 1. Inflatable membrane 3 encloses extruded member 2

FIG. 3 is a section identified in FIG. 2. Extruded member 2 is bonded along surface 8 to inflatable membrane 3, but not bonded along surface 7, nor along the circular surface of contact 9. Hole 5 allows transmission of pressurized fluid (e.g. pressurized air) around the periphery of the inflatable jack. The air may pass from continuous, longitudinal hole 5 out through vent holes 6

FIGS. 4, 5, 6, and 7 depict an optional pre-molded elastomeric fitting, which adapts an external hose to the internal stress relief profile.

FIG. 8 shows a cross section of an inflatable jack in a deflated condition.

FIG. 9 shows an inflatable jack in the inflated condition with the stress relief profile secured to the side of the inflated device.

Figure 1:
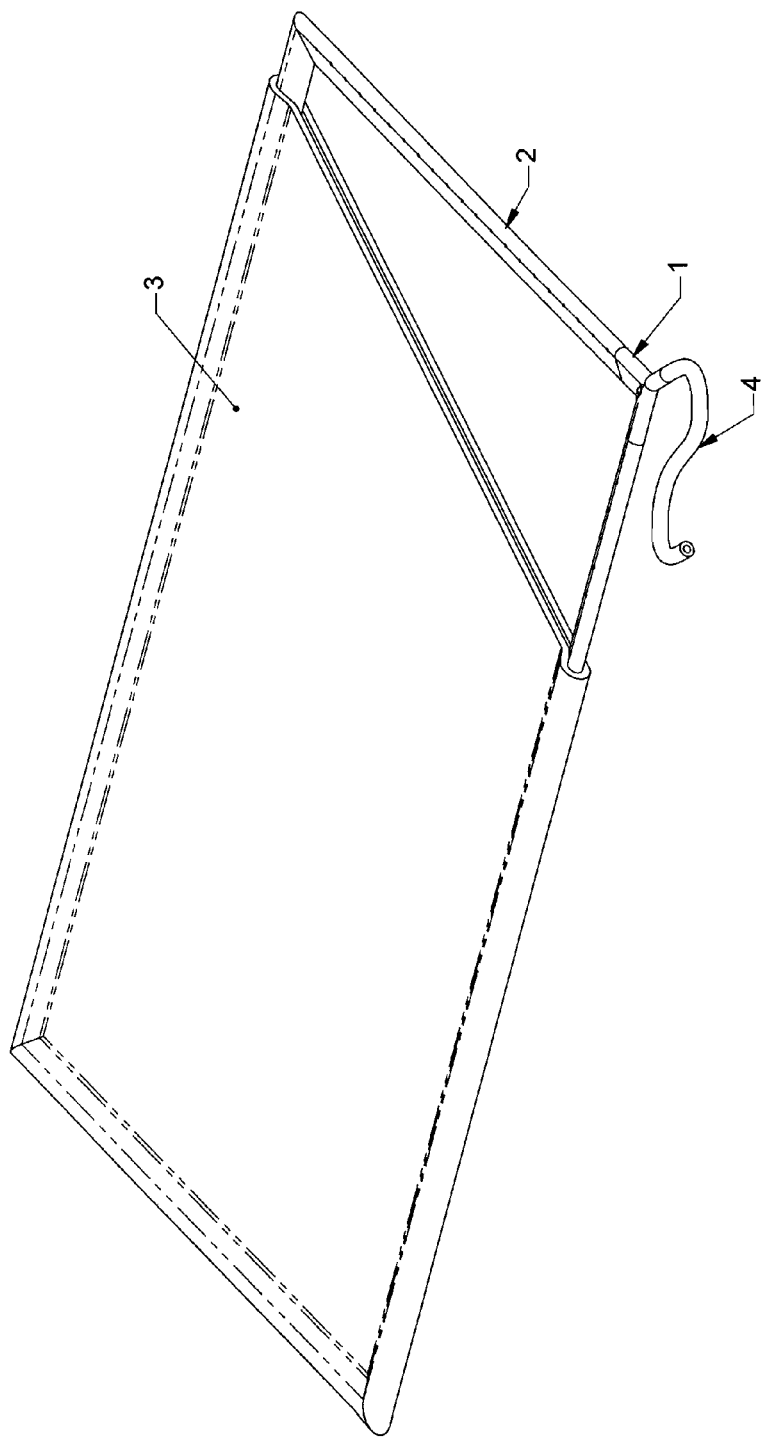

FIG. 10 shows an inflatable dam body in the deflated condition. Inflatable membrane 3 is secured by wedges 11a, 11b, 11c, 11d, and 11e at upstream end 10. Insert (or circumferentially continuous, or integrally adjoined, or joint traversing) layer 12 prevents tearing if the envelope is inflated without external clamping forces. Fin 14 includes fin insert 15 under reinforcement layer 16.

FIG. 11 is the inflatable dam of FIG. 10 in the inflated configuration. Inflatable membrane 3 holds fin 14 and stress relief extrusion 2 in position. Dam-to-spillway clamp 17 holds the inflatable dam to spillway foundation 18 (a spillway).

FIG. 12 shows another embodiment of an inflatable dam, using a simple rectangular clamp 118 in conjunction with "comma" insert 21 and anti-tear reinforcement 12. The thickened portion of the inflatable membrane 3 containing stress relief shape 2 and fin insert 15 lies within a recess in the spillway 22. Nut 20 holds clamp 118 onto anchor bolt 19. The air connection 24 to the inflatable dam may be connected to hollow extrusion 5 by means of a molded groove 23 that provides a clearance space for air between upper and lower adjacent portions of deflated membrane 3. Expressed in more general terms, a segment of at least one layer of the inflatable bladder membrane 1002 may be adapted to surround a spatial void (that may be termed a membrane spatial void) that is fluidically responsive to a spatial void 1003 formed by the air supply fitting (or pressurized fluid element) 24 and to a longitudinal spatial void 5 enclosed by the longitudinal spatial void enclosing insert element 1004. The membrane spatial void may also be fluidically responsive to a bladder interior-to-longitudinal spatial void fluid conveyance hole. The inflatable dam may be rendered less prone to flow induced vibration damage when deflated by lowering the internal pressure to below atmospheric pressure by means of a vacuum system connected to air supply fitting 24. This causes tight adherence of membrane 3 to insert 2, resulting in a stiffer structure at a location known for damage problems with conventional designs.

FIG. 13 is an inflatable dam similar to that shown in FIG. 12 in the inflated configuration. Insert 21 provides positive engagement to clamp 118. Recess 22 can be seen on spillway 18.

FIG. 14 is a cross section of a pneumatic spillway gate in accordance with the present invention. Relief groove 23 connects air fitting 24 to hollow stress relief extrusion 2. Gate panel 444 is secured to hinge flap 25 by means of hinge retainer 26.

FIG. 15 shows the deflated air bladder of the spillway gate shown in FIG. 14. "Comma-" type Insert member 21 is located upstream of flat portion 28. Holes 29 through flat portion 28 permit assembly with the clamp 118 of FIG. 14. The enlarged portion 27 of the hinge flap 25 prevents the hinge flap from pulling out from under the hinge retainer 26 of FIG. 14. Anti tearing layer 12 prevents rupture of the air bladder under unclamped or loosely clamped conditions.

FIG. 16 shows an air supply groove 23 molded into inflatable membrane 3.

Figure 17:
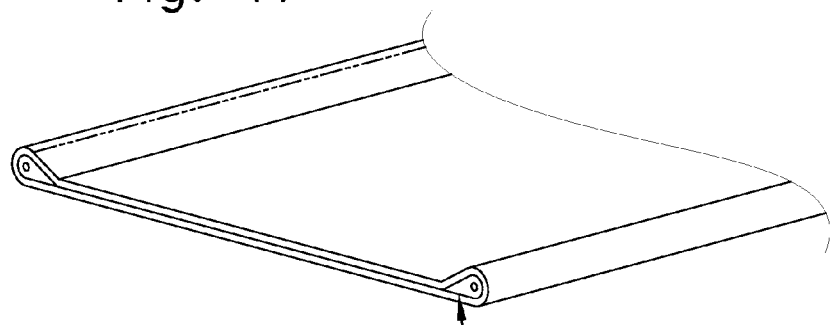
Figure 18:
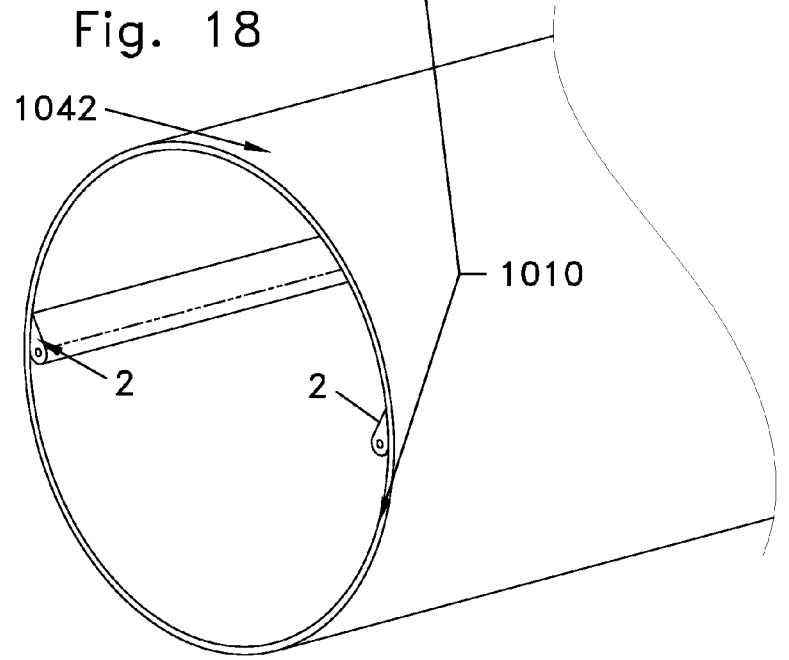

FIGS. 17 and 18 show an inflatable hose in accordance with the present invention.

Figure 19:
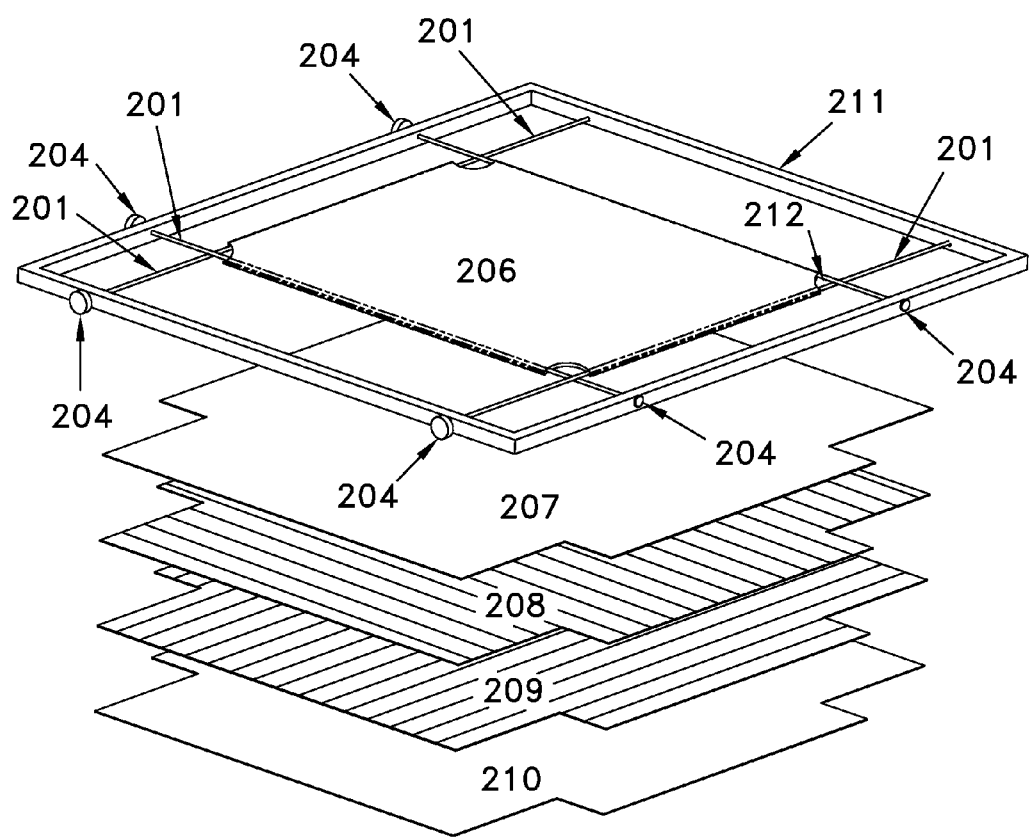

FIG. 19 is a perspective view of a frame across which four wires are stretched. The wires define the edges of an inflatable article of which the innermost layer is shown positioned on the wires. The subsequent layers are indicated in the exploded view.

Figure 20:
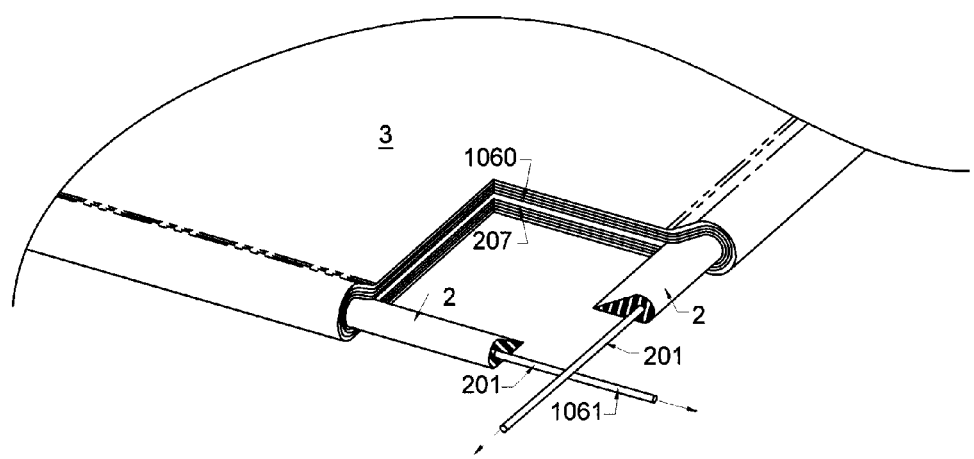

FIG. 20 is a perspective view of a corner of an inflatable article showing a positioning rod (or wire) within stress relief inserts.

Figure 21:
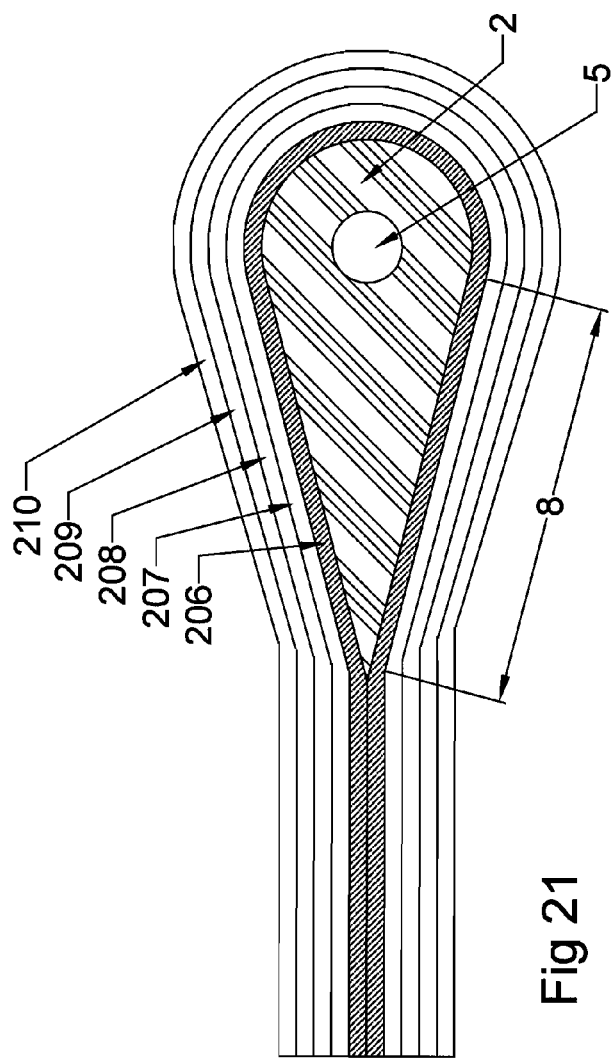

FIG. 21 is a sectional view of the edge of an inflatable article in its deflated configuration.

Figure 22:
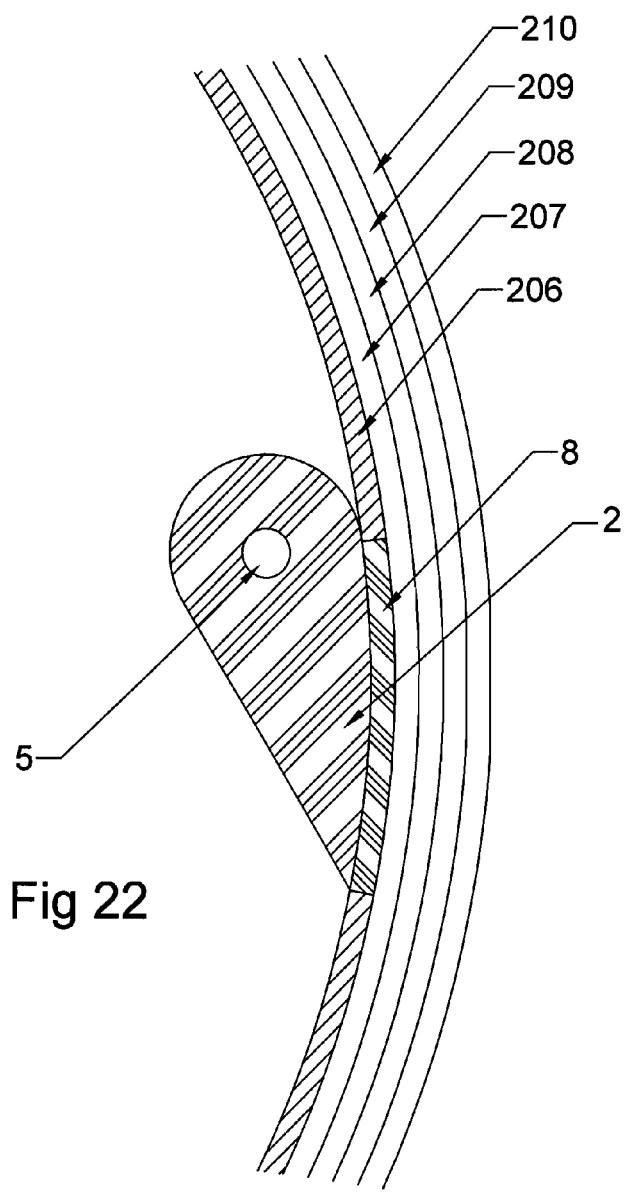

FIG. 22 is a sectional view of the edge of an inflatable article in its inflated configuration.

Figure 23:
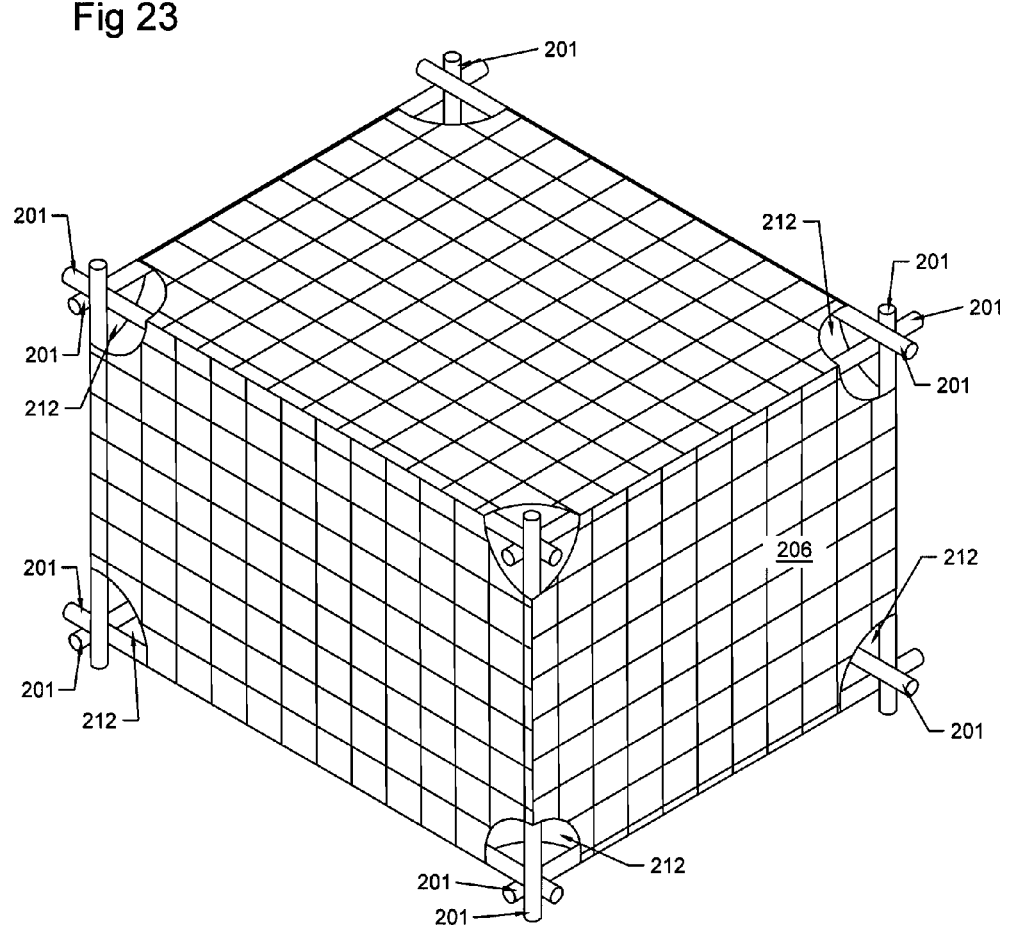

FIG. 23 is a perspective view of the release fabric layer only of a rectangular box shaped inflatable article positioned on tight wires or cables which define the article's shape and dimensions.

FIG. 24 is a sectional elevation view of a spillway gate actuator as it would be manufactured by the method of at least one embodiment of the inventive technology.

FIG. 25 is a sectional elevation of the inflatable actuator of FIG. 24 shown in conjunction with other elements of a spillway gate system and shown in the inflated position.

FIG. 26 is section 26-26 of FIG. 25 showing an air supply groove molded into interior surface of the inflatable air bladder.

Figure 27:
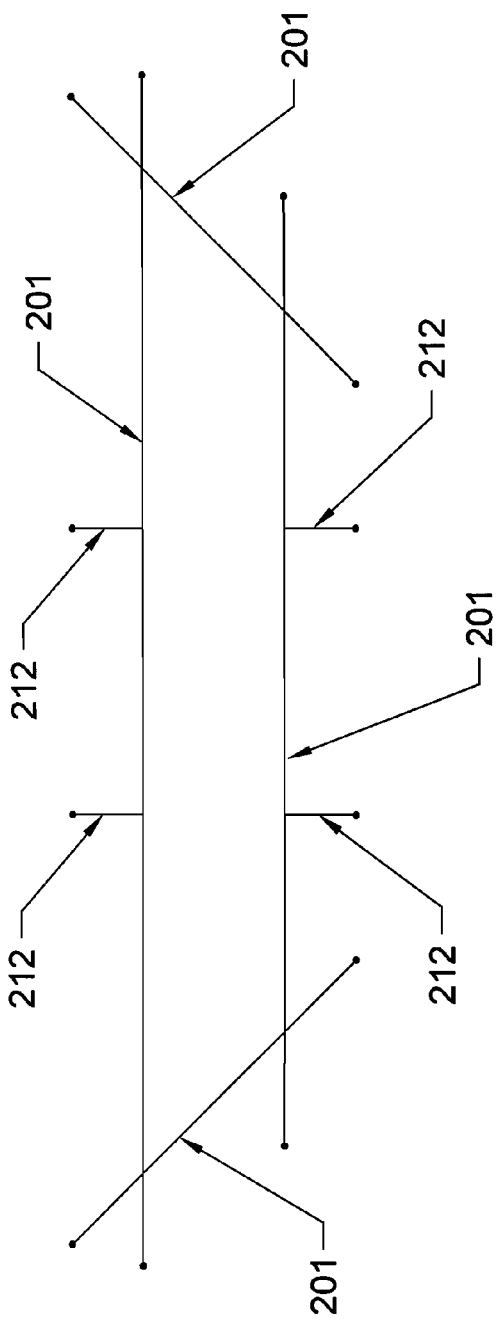

FIG. 27 shows an arrangement of edge defining wires in conjunction with auxiliary wires, the purpose of which is to limit the deflection of the edge defining wires.

Figure 28:
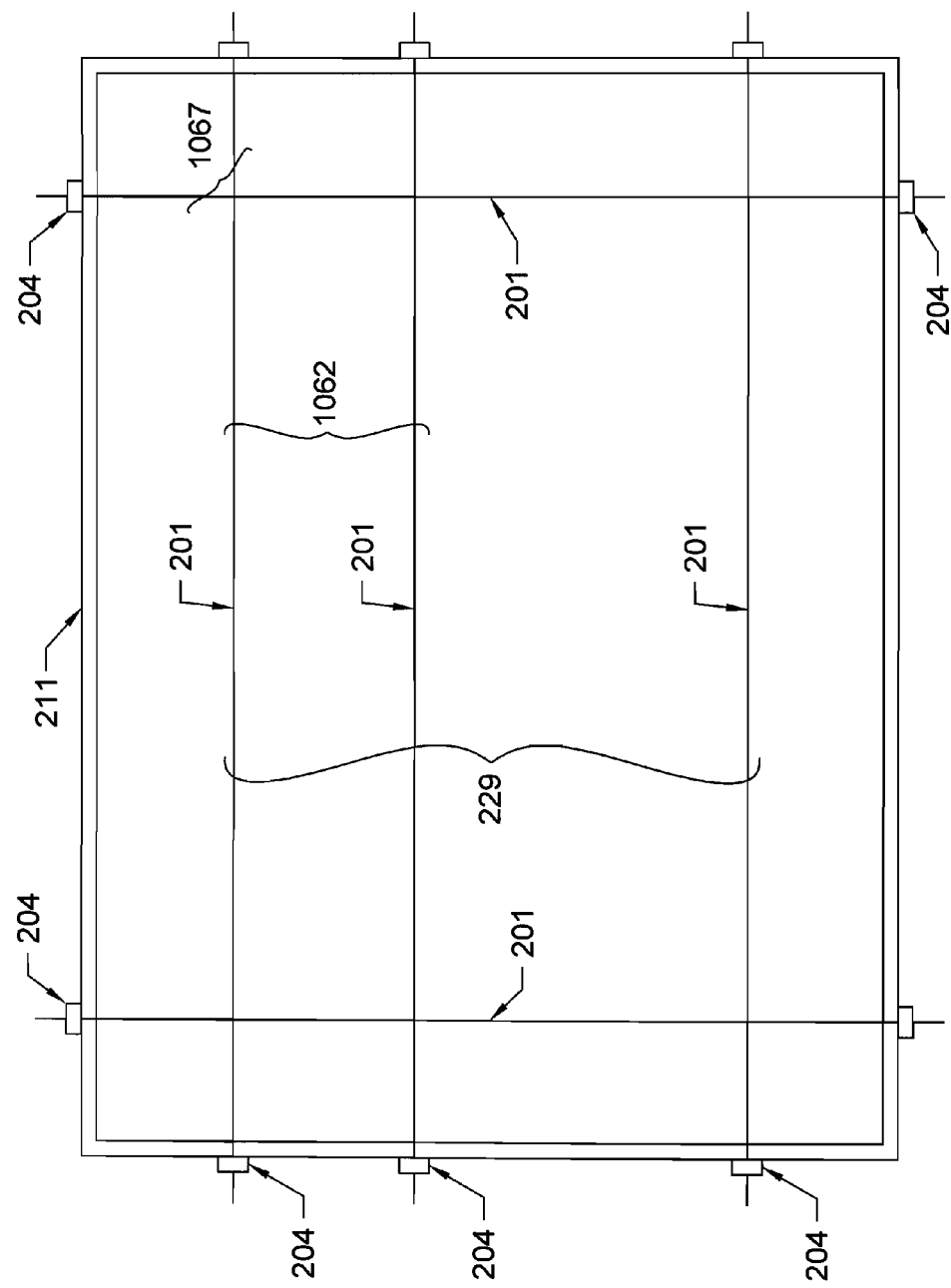

FIG. 28 shows an arrangement of four wires used to define the edges of a rectangular inflatable air bladder as well as a fifth wire used to define the position of a hinge flap manufactured integral to the air bladder.

Figure 29:
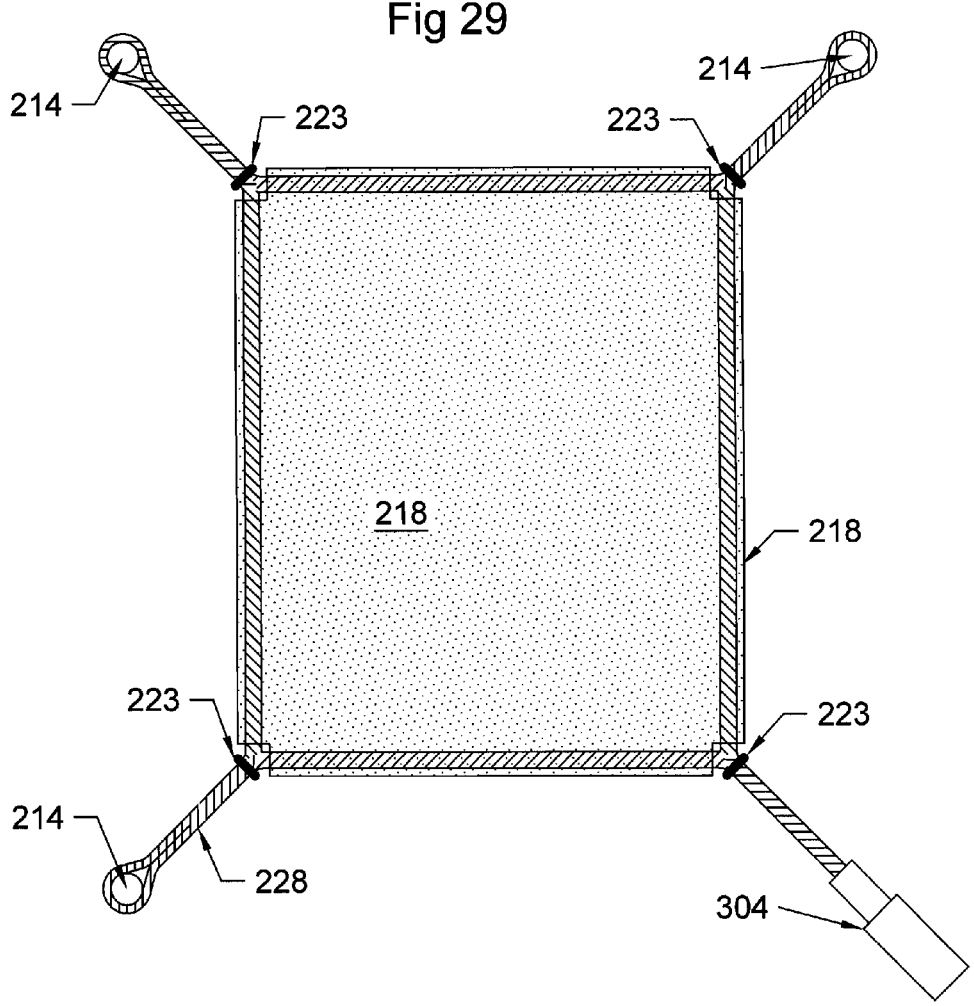

FIG. 29 shows the use of a single wire rope to define all four edges of a rectangle for use in manufacturing a rectangular inflatable "pillow shape".

Figure 30:
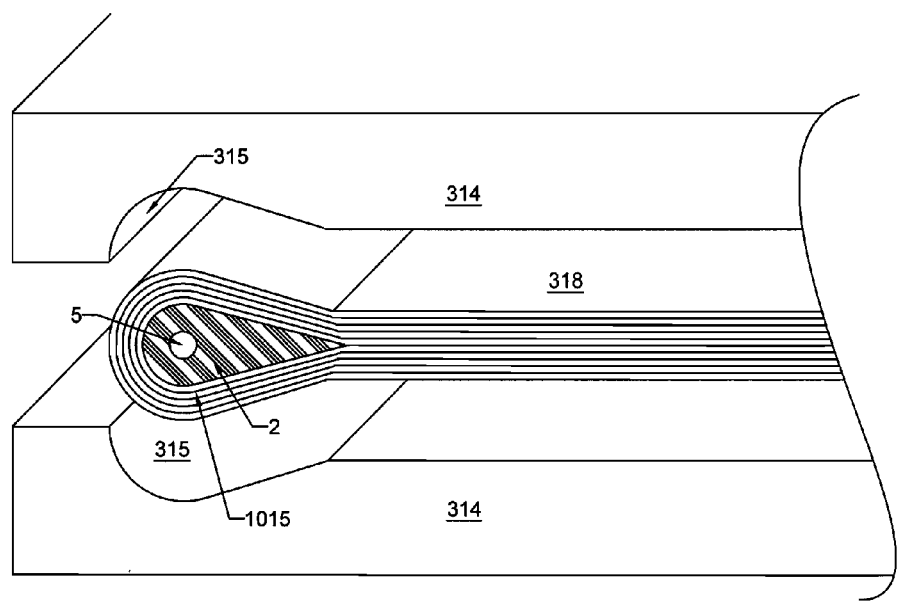

FIG. 30 is a perspective cut-away view of the edge of an inflatable article in conjunction with a mold in which said article might be vulcanized.

Figure 31:
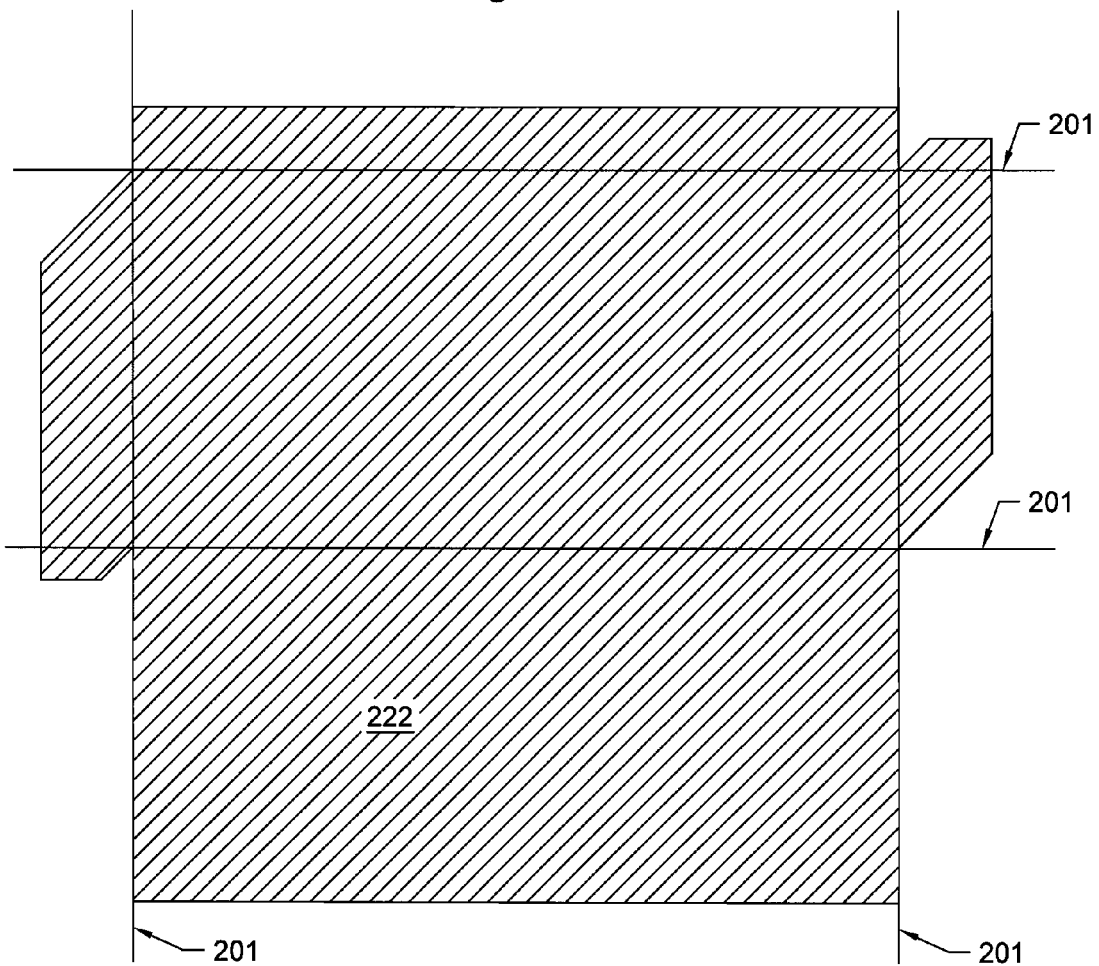

FIG. 31 shows the outline of a bias ply layer in relation to the wires around which it would be subsequently folded.

Figure 32:
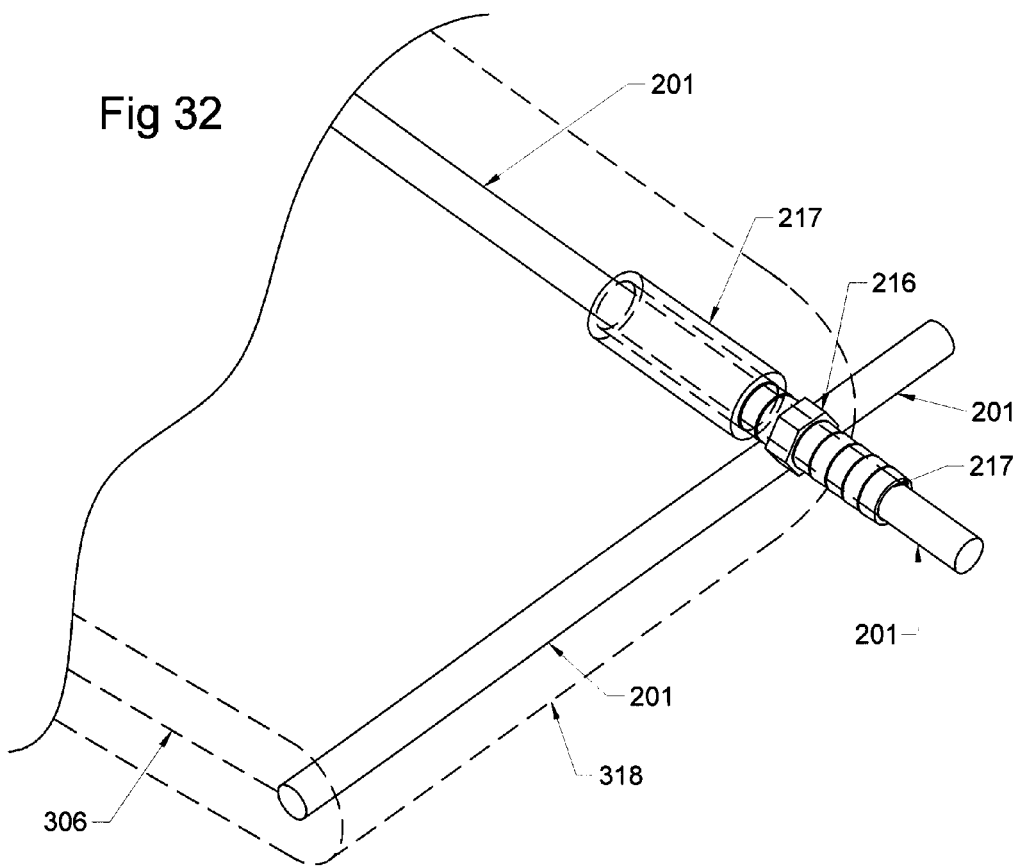

FIG. 32 is a perspective view of a double ended hose nipple positioned on an edge defining wire in conjunction with a removable tube used to keep an open fluid passage during cure.

Figure 33:
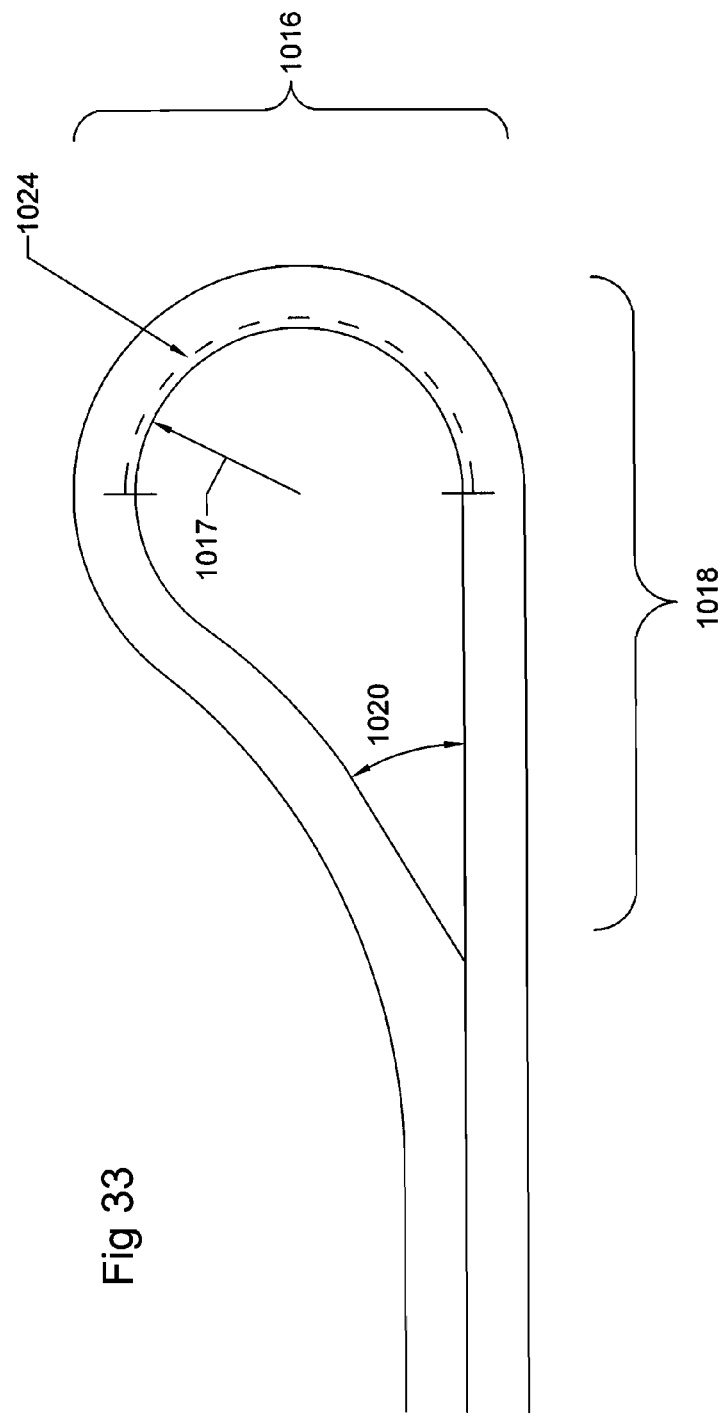

FIG. 33 is a cross-sectional view of a positively conformed, inflated stress reduced deflated bladder fold membrane element.

Figure 34:
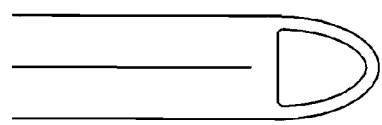
Figure 35:
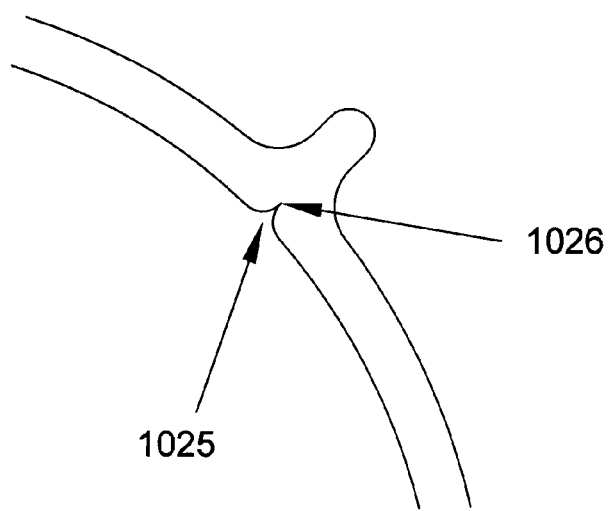

FIGS. 34 and 35 are cross-sectional views of one type of conventionally designed inflatable elastomeric dam in the vicinity of the deflated bladder fold. FIG. 34 is a deflated configuration, FIG. 35 is an inflated configuration.

Figure 36:
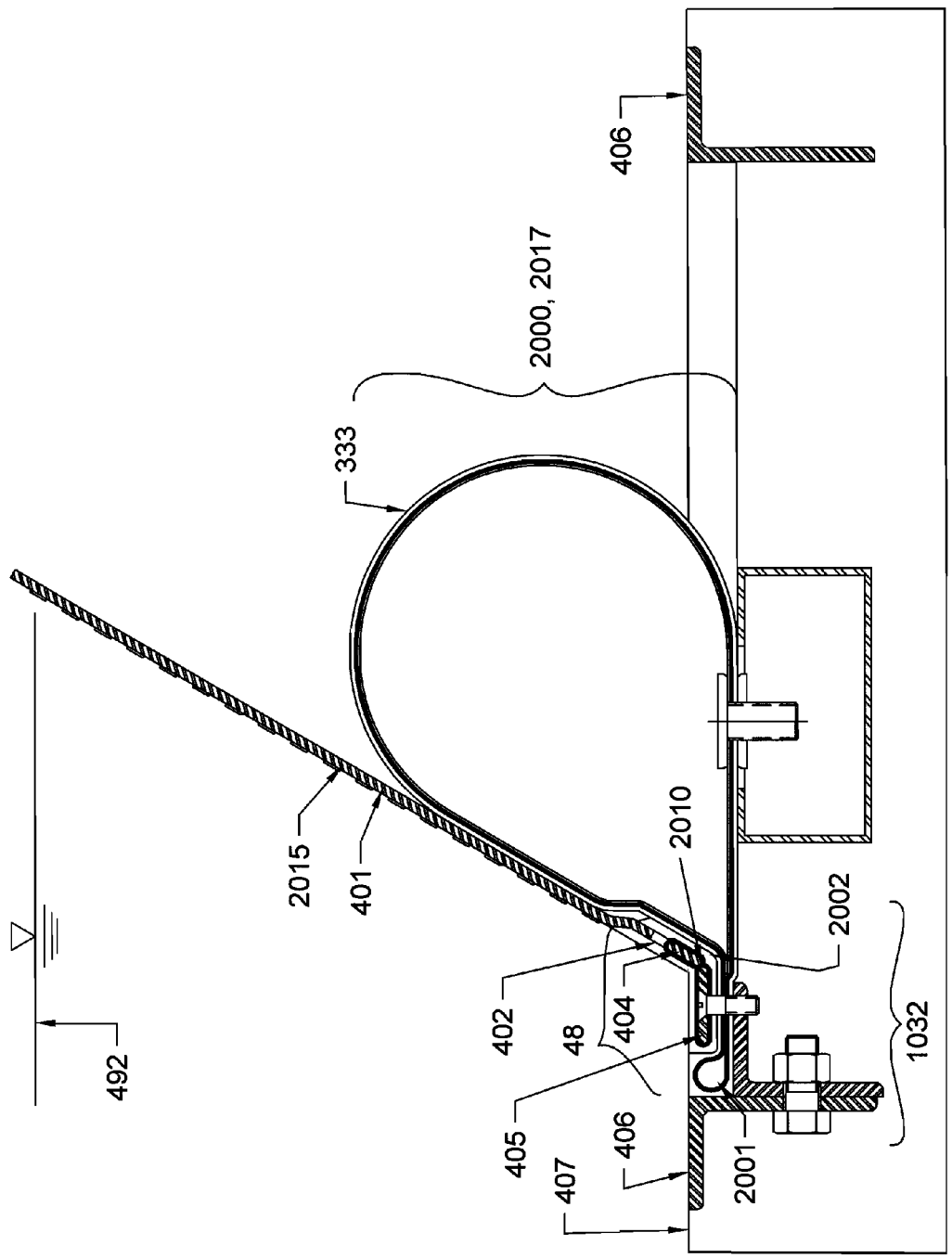

FIG. 36 is a sectional elevation of a traffic compatible roadway flood protection barrier shown in the raised position.

Figure 37:
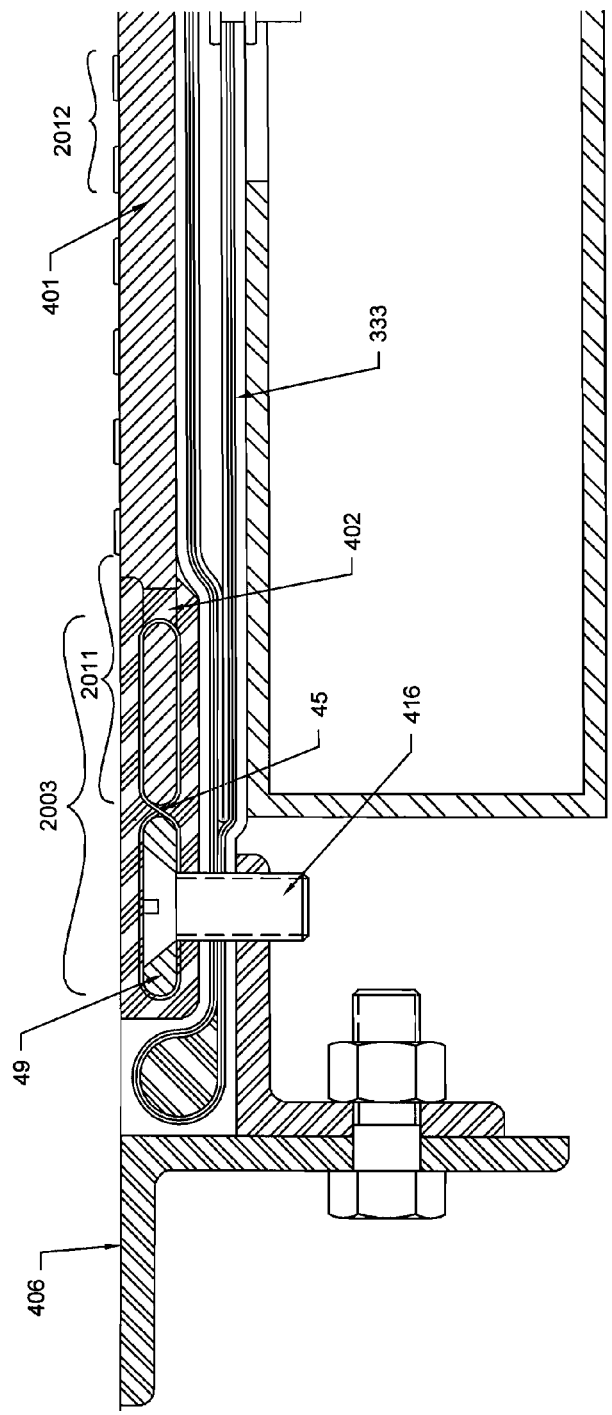

FIG. 37 is a detailed sectional elevation of the gate shown in FIG. 36 showing the details of the hinge and air bladder connections.

Figure 38:
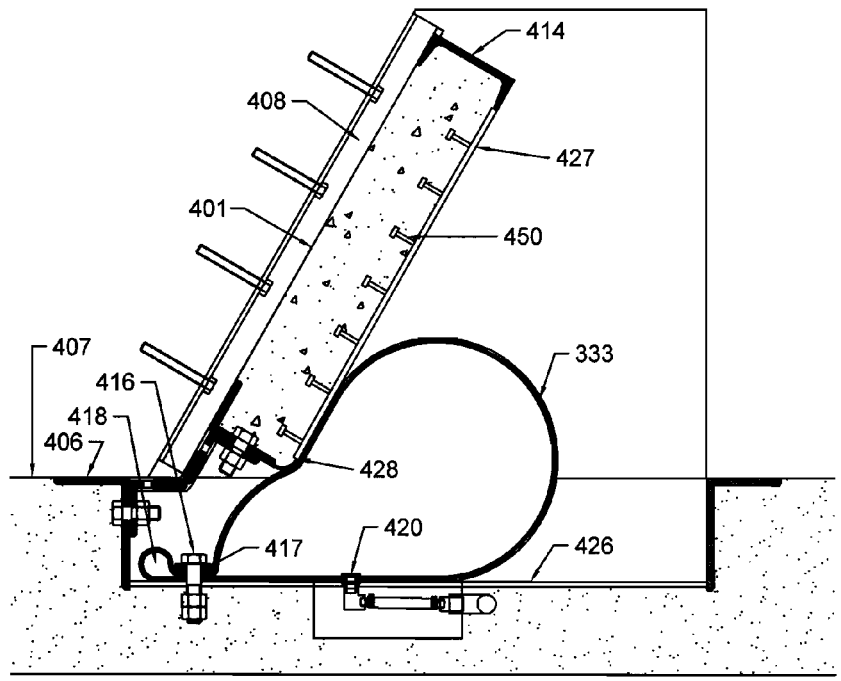
Figure 39:
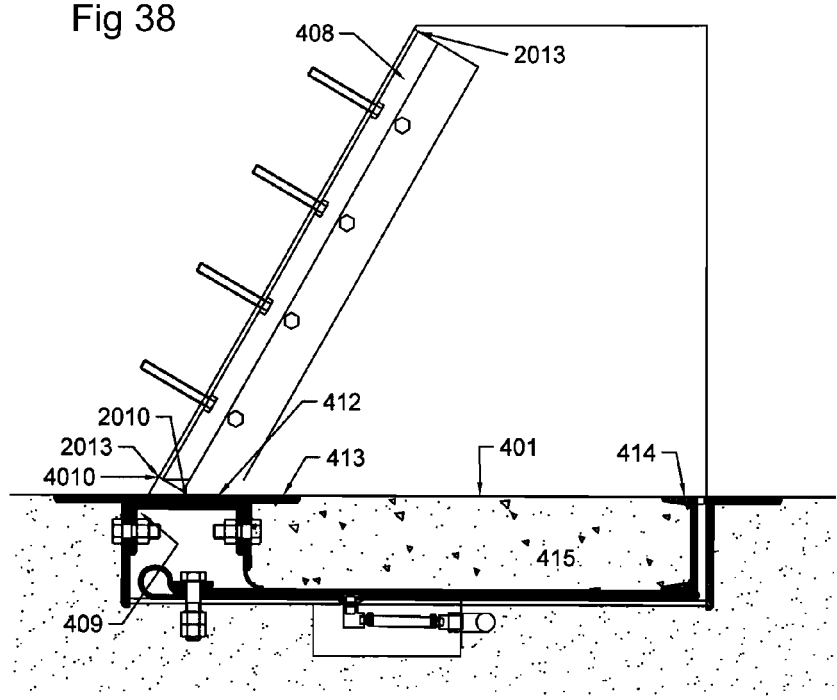

FIG. 38 is a sectional elevation of at least one embodiment of the present invention showing the gate of FIG. 39 in its raised position with the actuating air bladder inflated.

FIG. 39 is a sectional elevation of at least one embodiment of the present invention showing a gate in its lowered position in association with the actuating air bladder deflated.

FIG. 40 is a plan view of a hinge assembly with the rubber covering not shown.

FIG. 41 is sectional view 41-41 of the hinge of FIG. 40, with the rubber covering shown.

Figure 42:
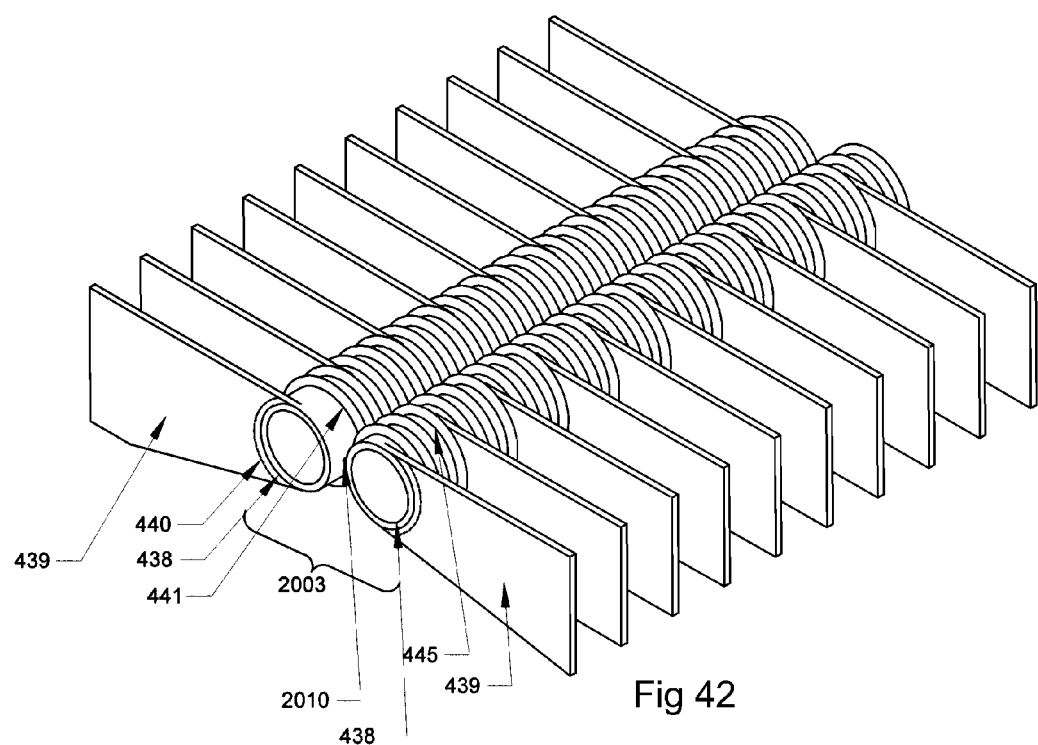

FIG. 42 is a hinge as it might be configured from lightweight composite materials.

Figure 43:
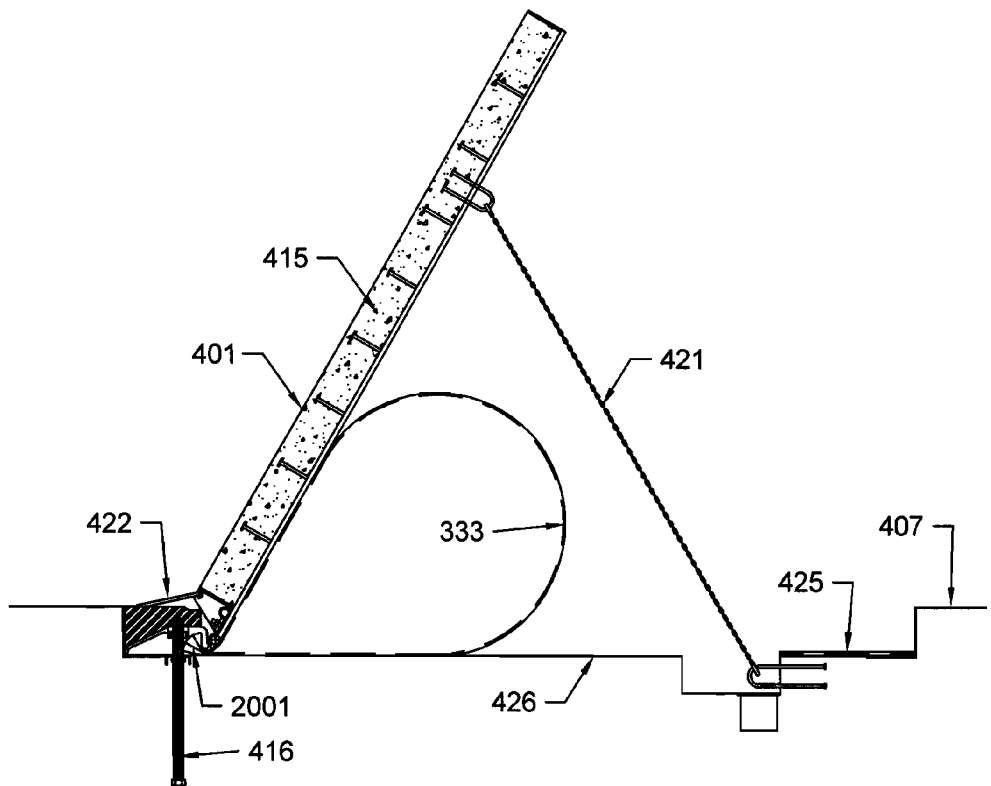

FIG. 43 is a roadway flood barrier gate assembly shown in its raised position.

Figure 44:
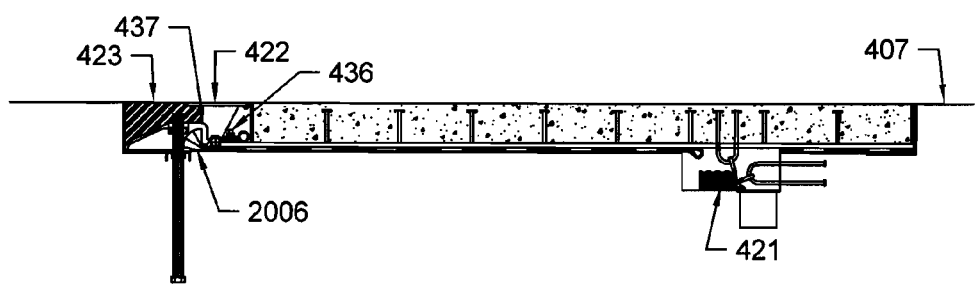

FIG. 44 is the gate of FIG. 43 shown in its lowered position.

FIG. 45 is a sectional elevation view of a gate configured for a railroad flood barrier shown in its lowered position.

FIG. 46 is a sectional view of the gate of FIG. 45.

FIG. 47 is a sectional elevation view of the gate of FIG. 45 shown in its raised position.

FIG. 48 is an end view of the gate shown in FIG. 47.

Figure 49:
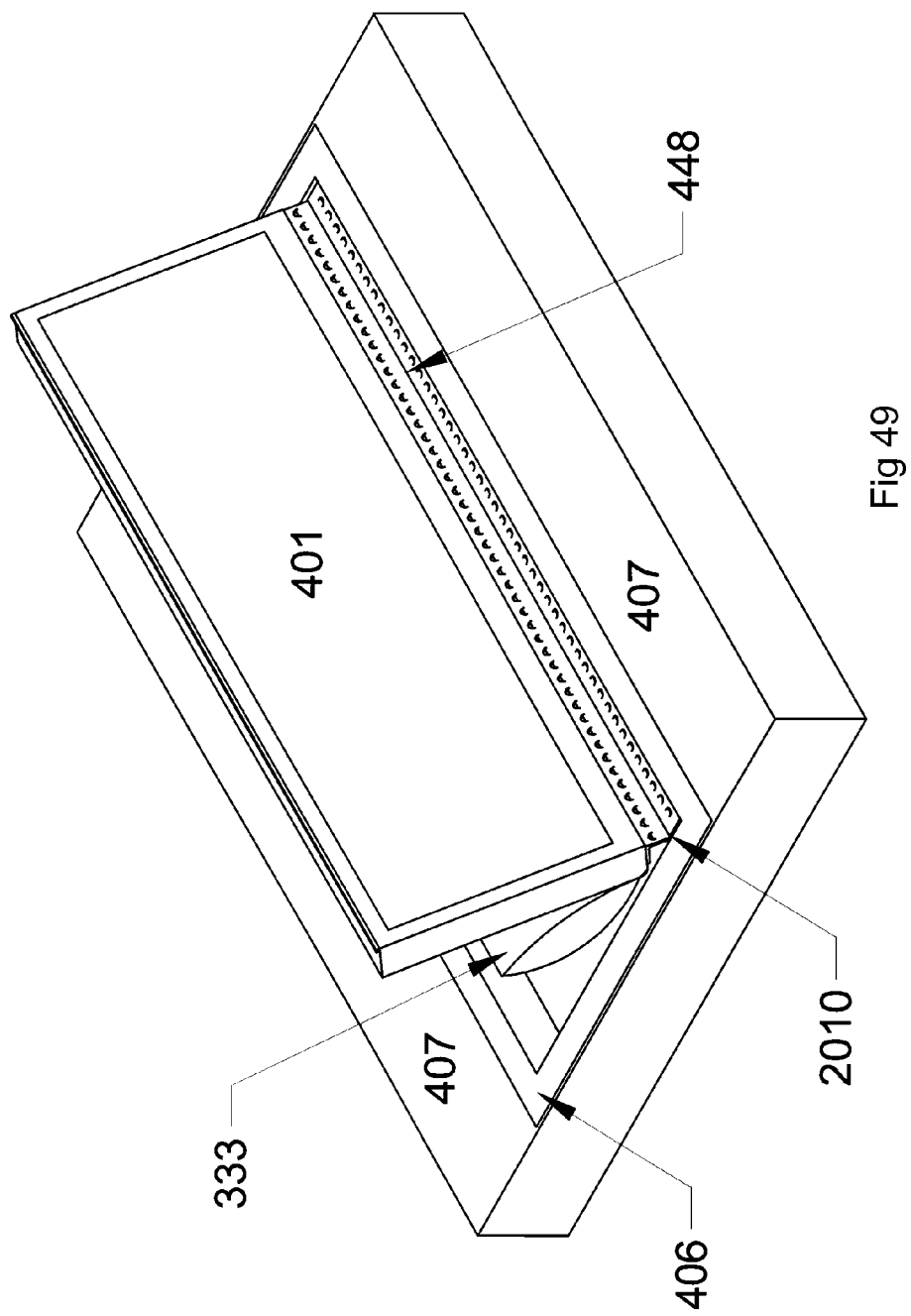
Figure 50:
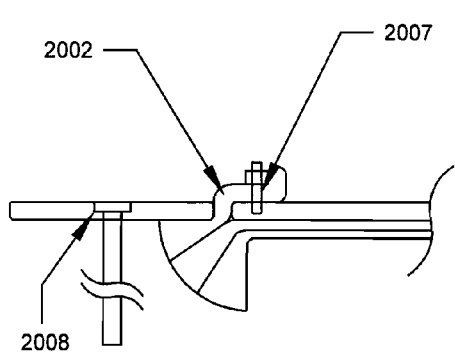
Figure 51:
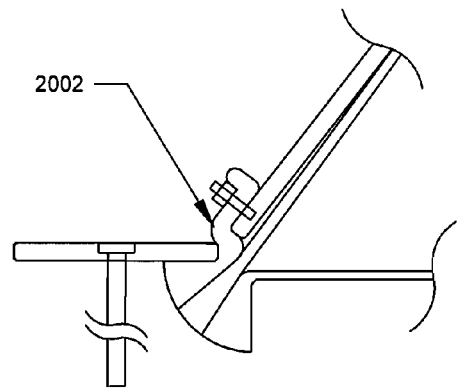
Figure 52:
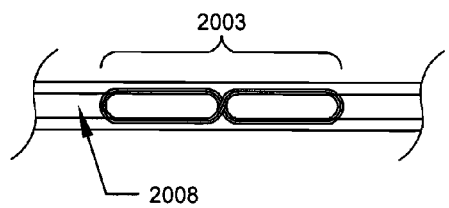
Figure 53:
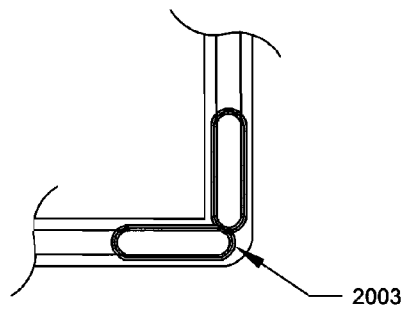
Figure 54:
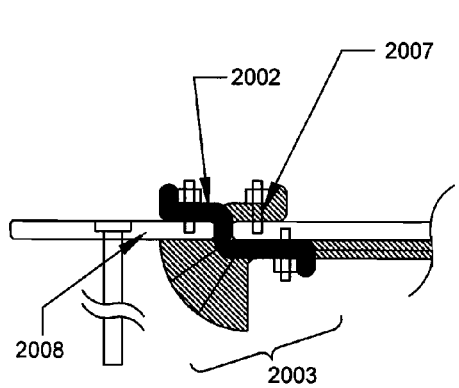
Figure 55:
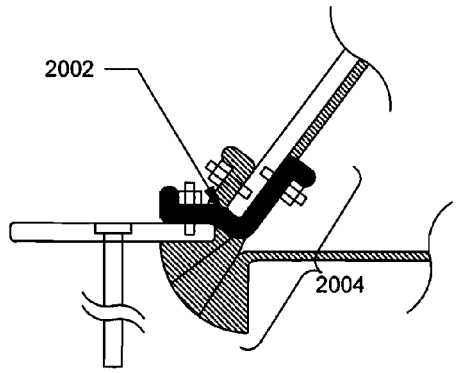

FIG. 49 is a perspective view of the gate of FIGS. 38 and 39 shown in its raised position.

FIGS. 50 through 55 are a cross-sectional view of different types of hinges.

Figure 56:
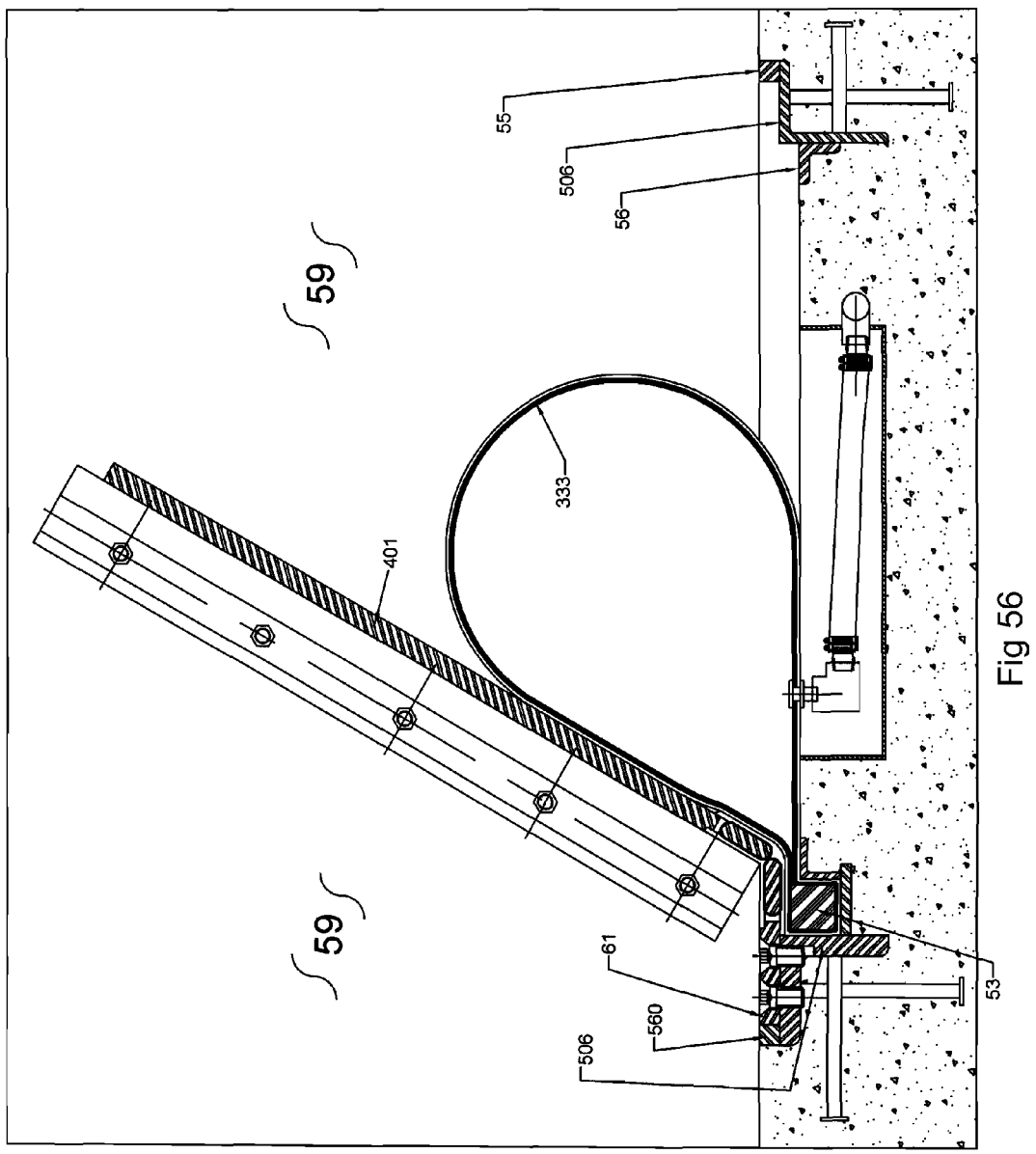

FIG. 56 is a sectional elevation of a traffic compatible roadway flood protection barrier shown in the raised position.

Figure 57:
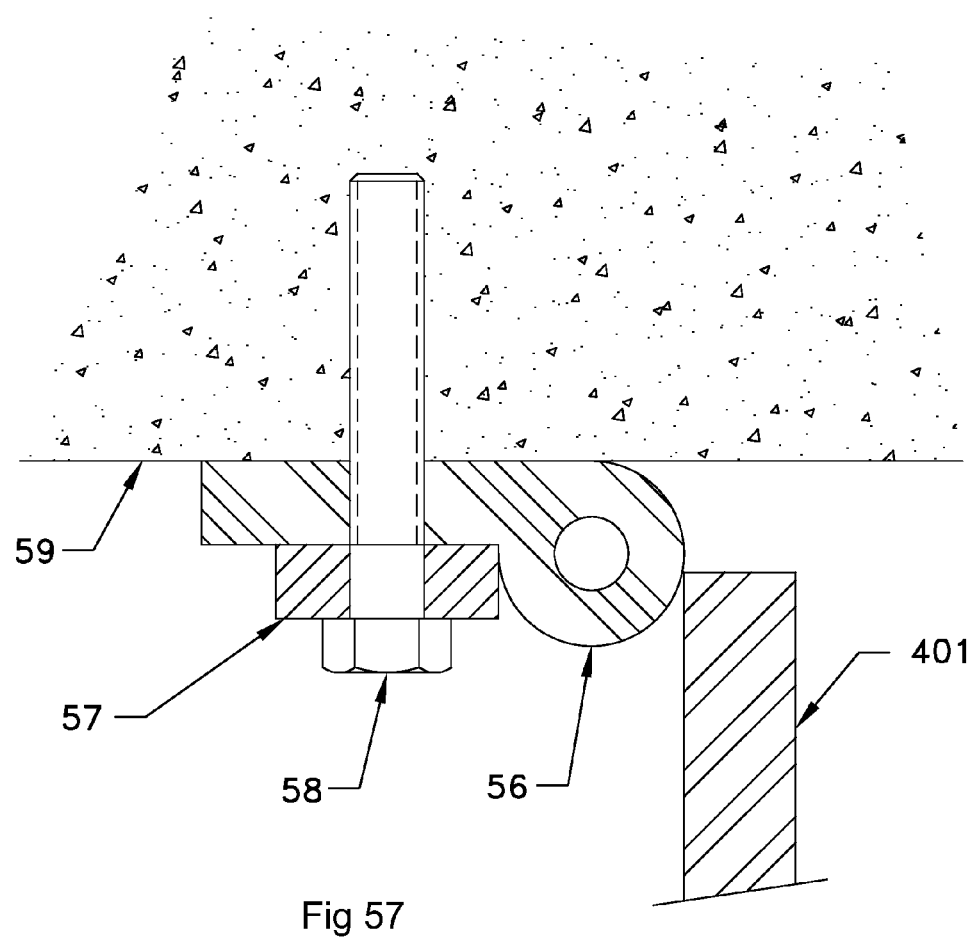

FIG. 57 is a detailed sectional of the side seal of the gate shown in FIG. 56.

Figure 58:
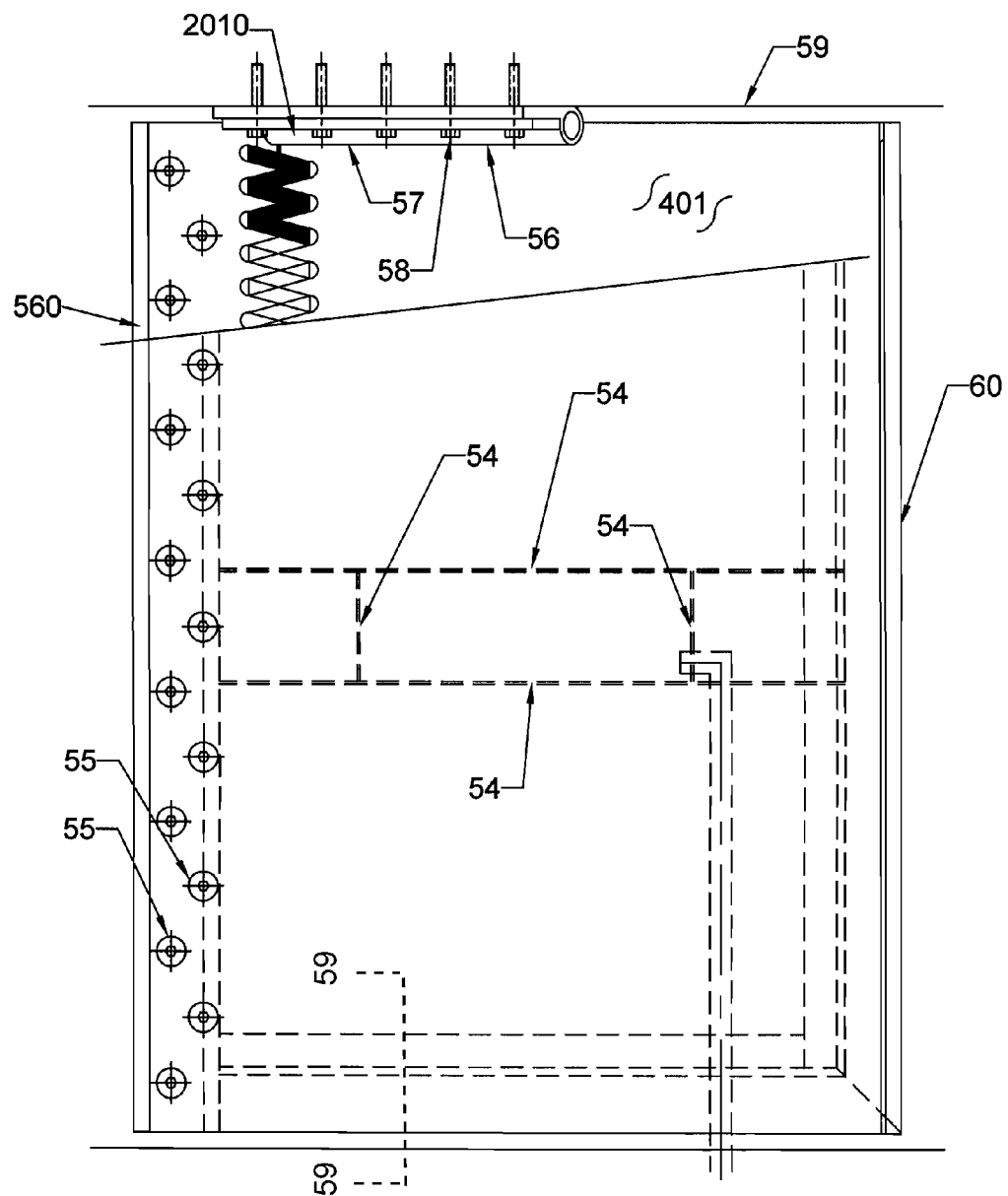

FIG. 58 is a cut-away plan view of the gate shown in FIG. 56.

Figure 59:
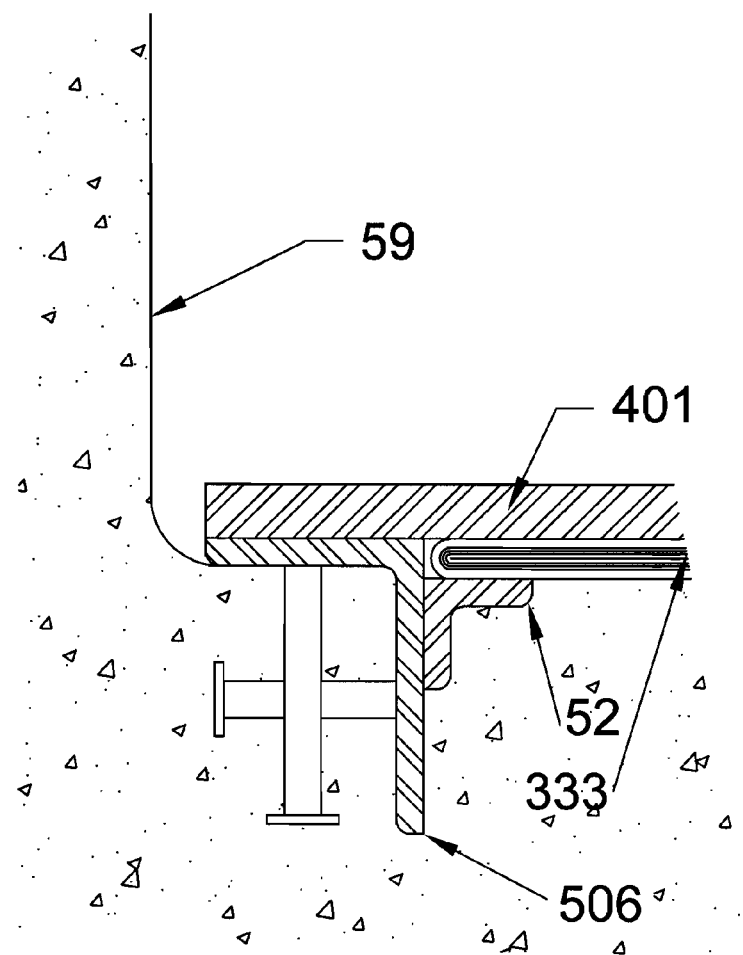

FIG. 59 is a sectional elevation 59-59 of FIG. 58.

Figure 60:
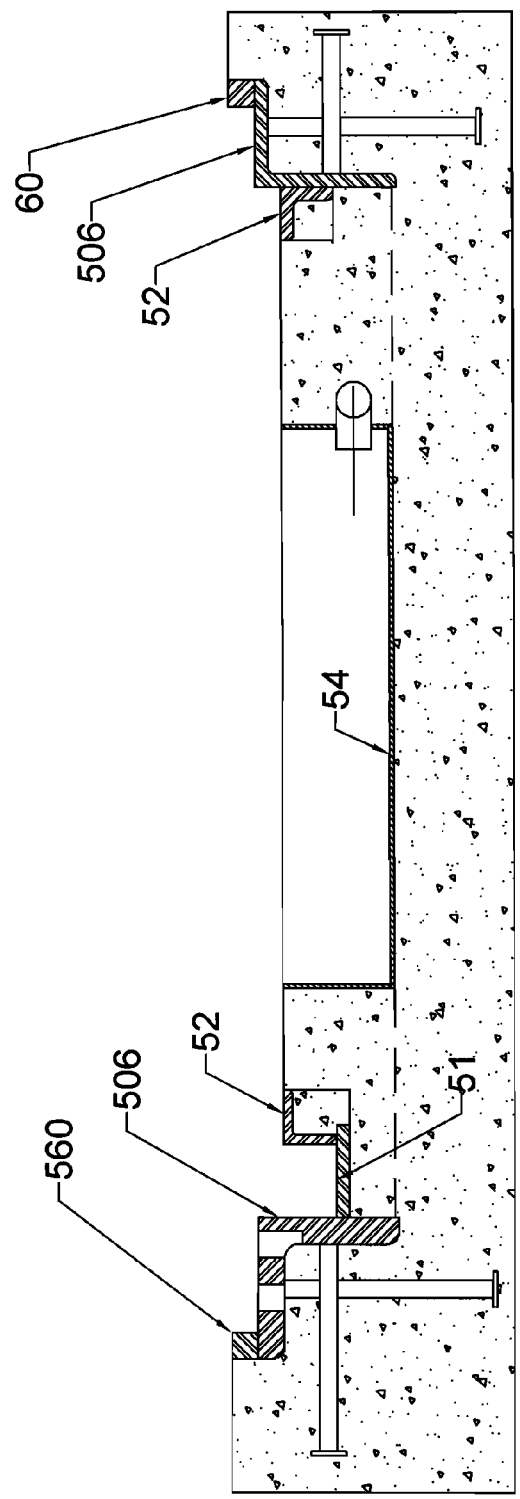

FIG. 60 is a plan view of the embedded frame for the gate system of FIG. 56.

Figure 61:
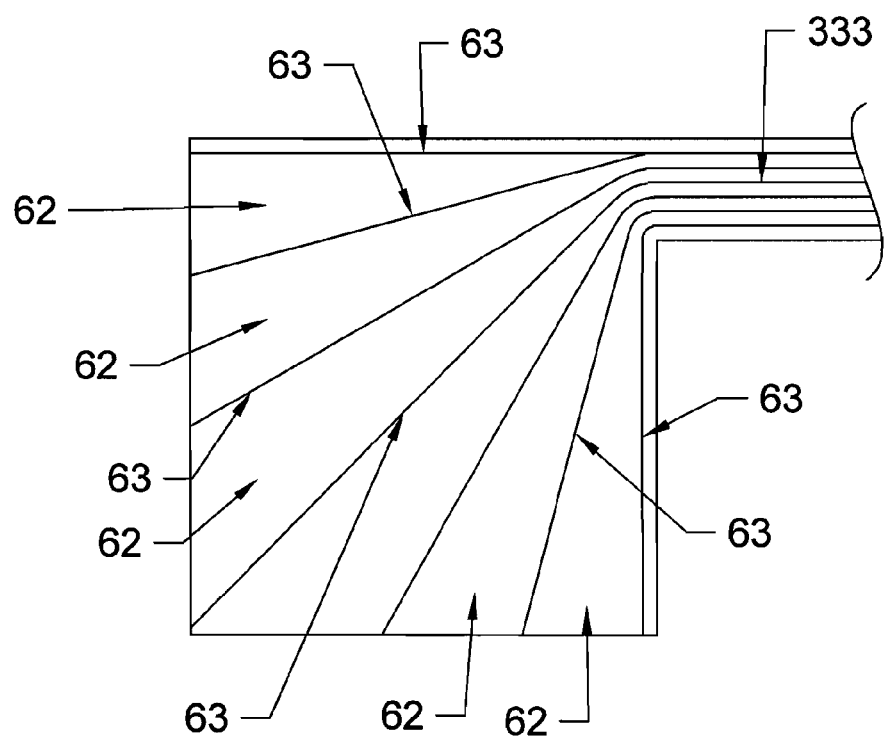

FIG. 61 is sectional view of an alternate air bladder connection configuration.

Figure 62:
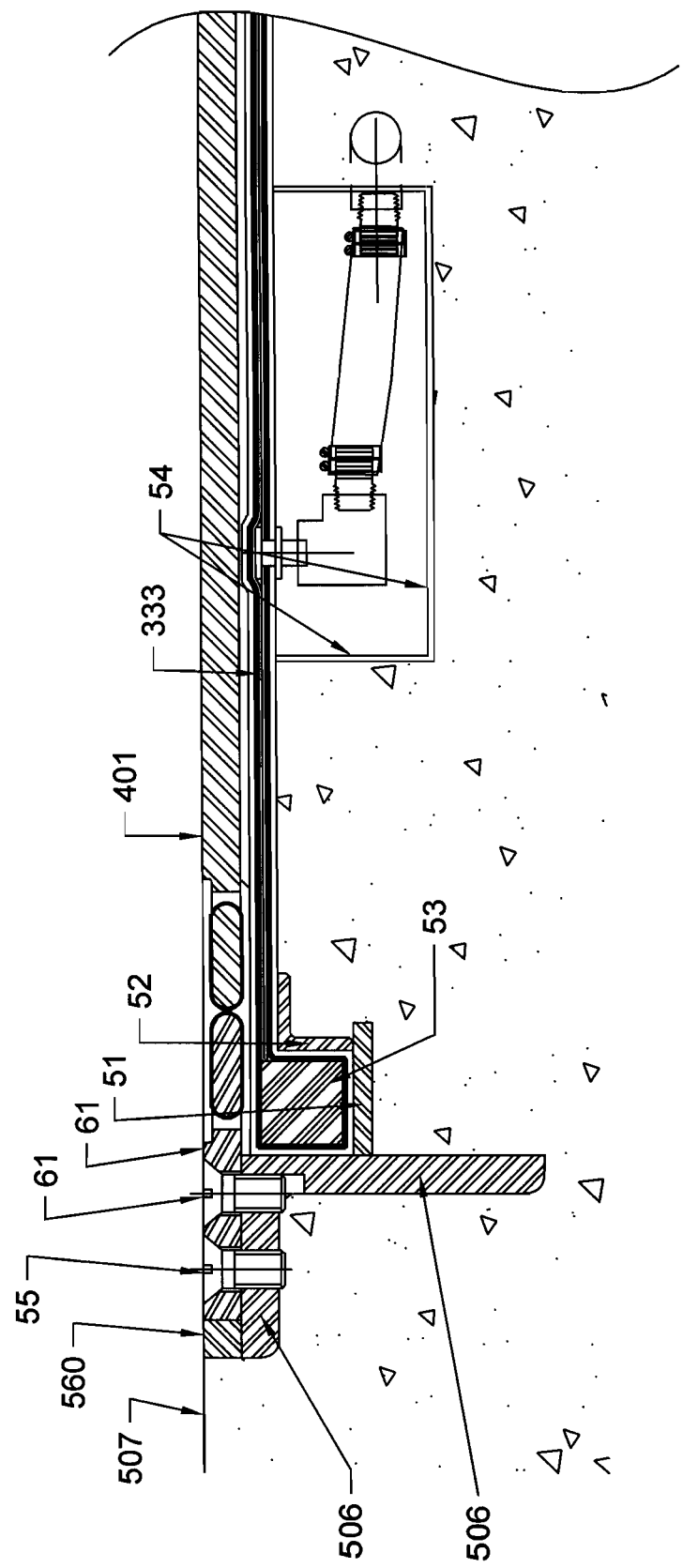

FIG. 62 is a detailed sectional elevation of the hinge area of FIG. 56, with the gate lowered.

Figure 63:
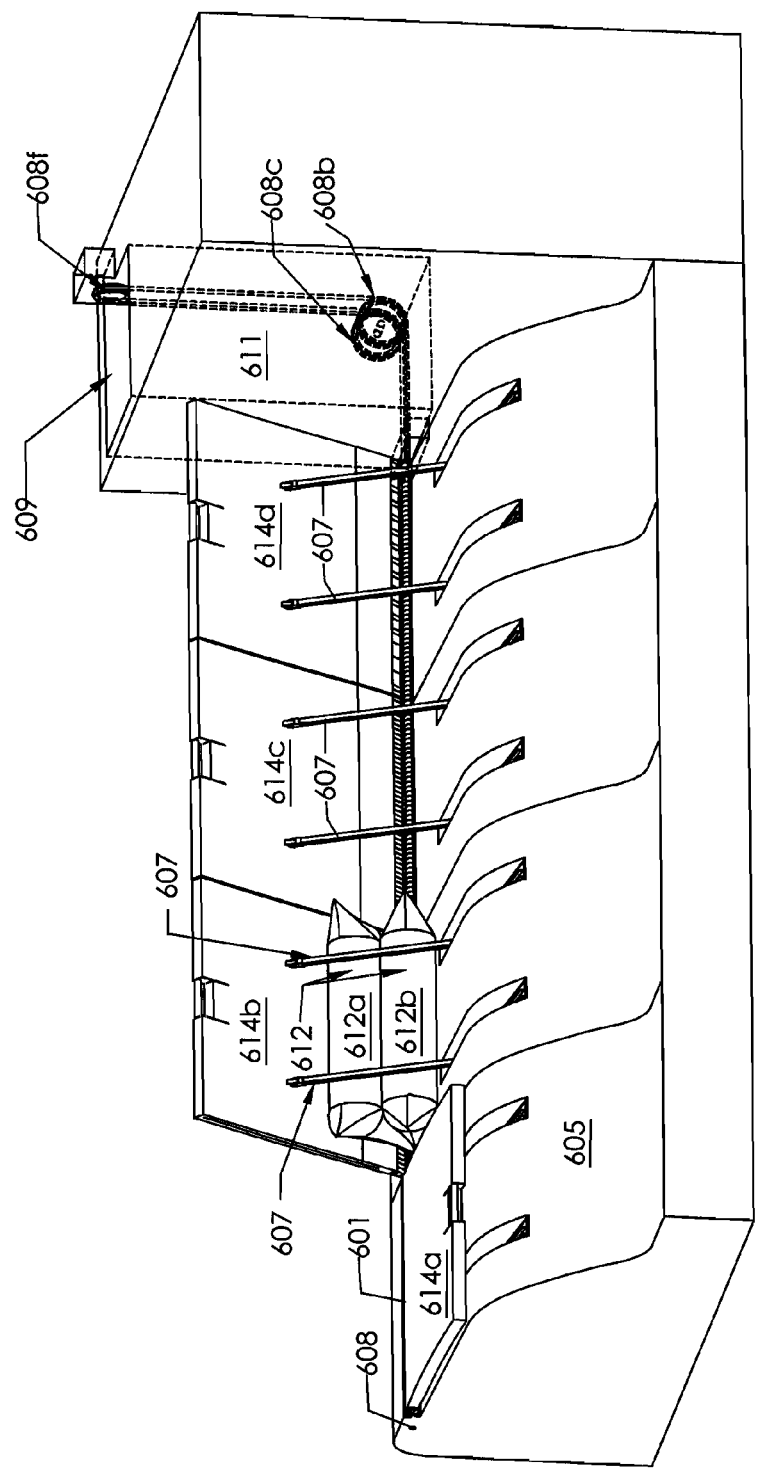
Figure 64:
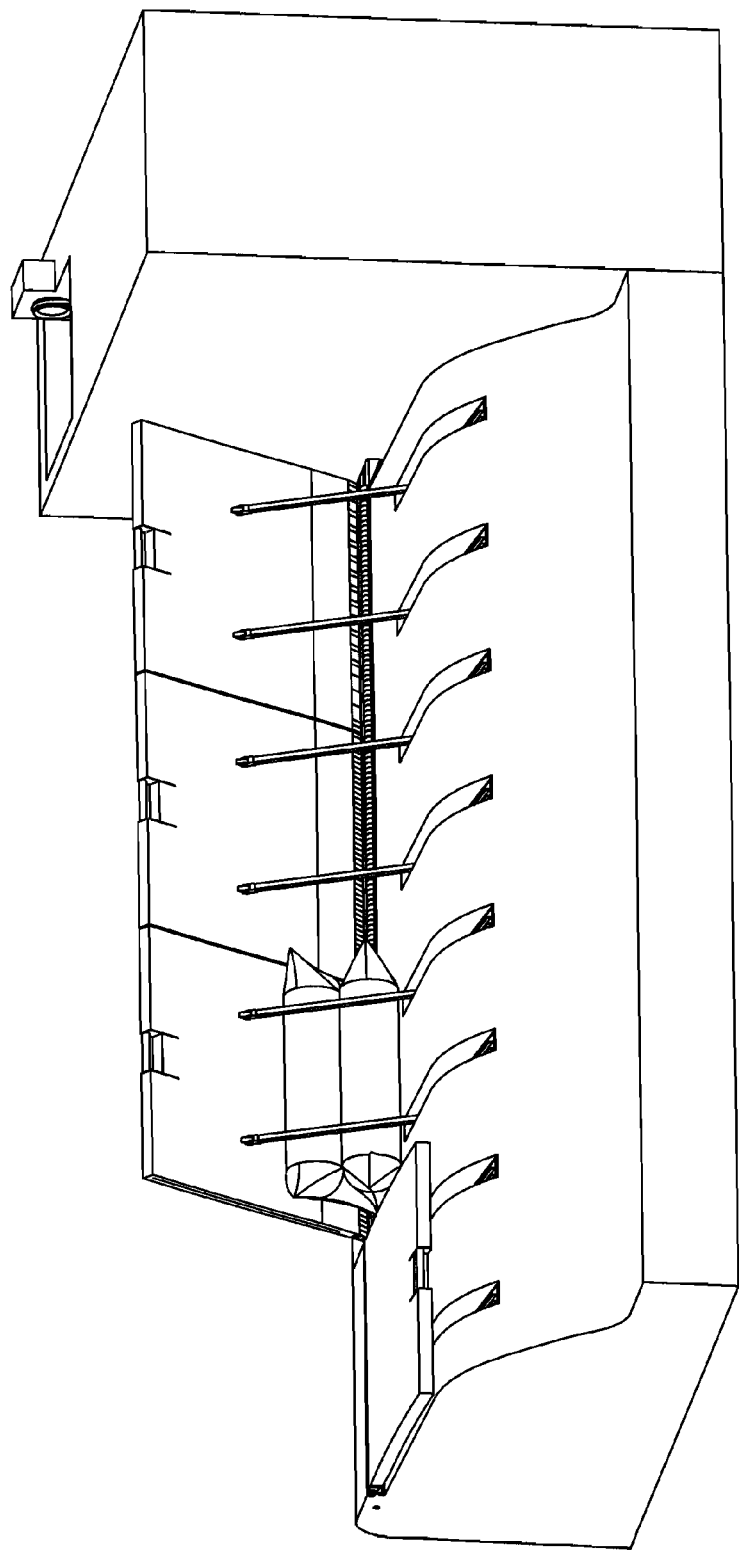
Figure 65:
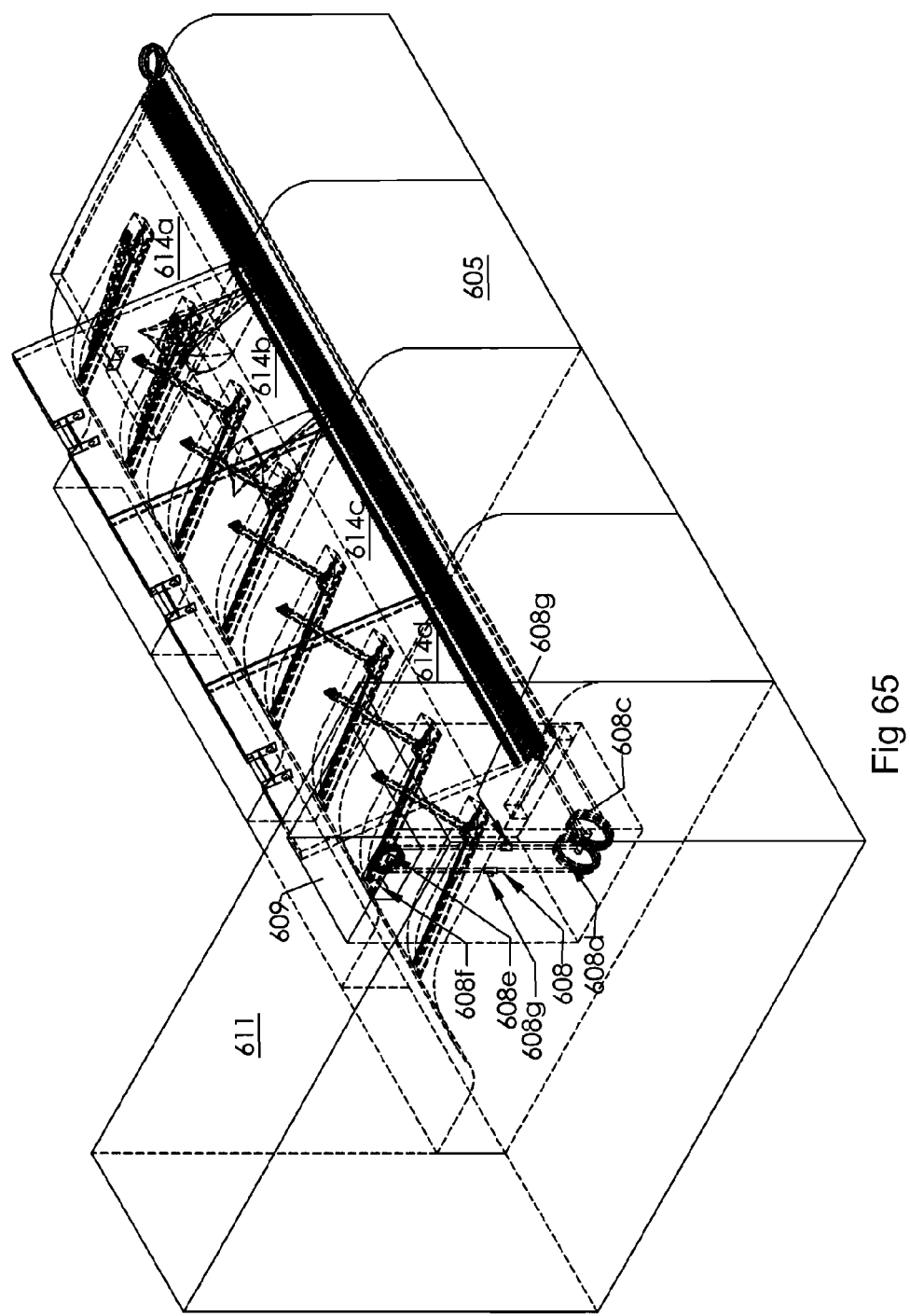

FIGS. 63, 64, and 65 are perspective views from the downstream side of at least one embodiment of the present invention as it might be installed on a dam spillway.

Figure 66:
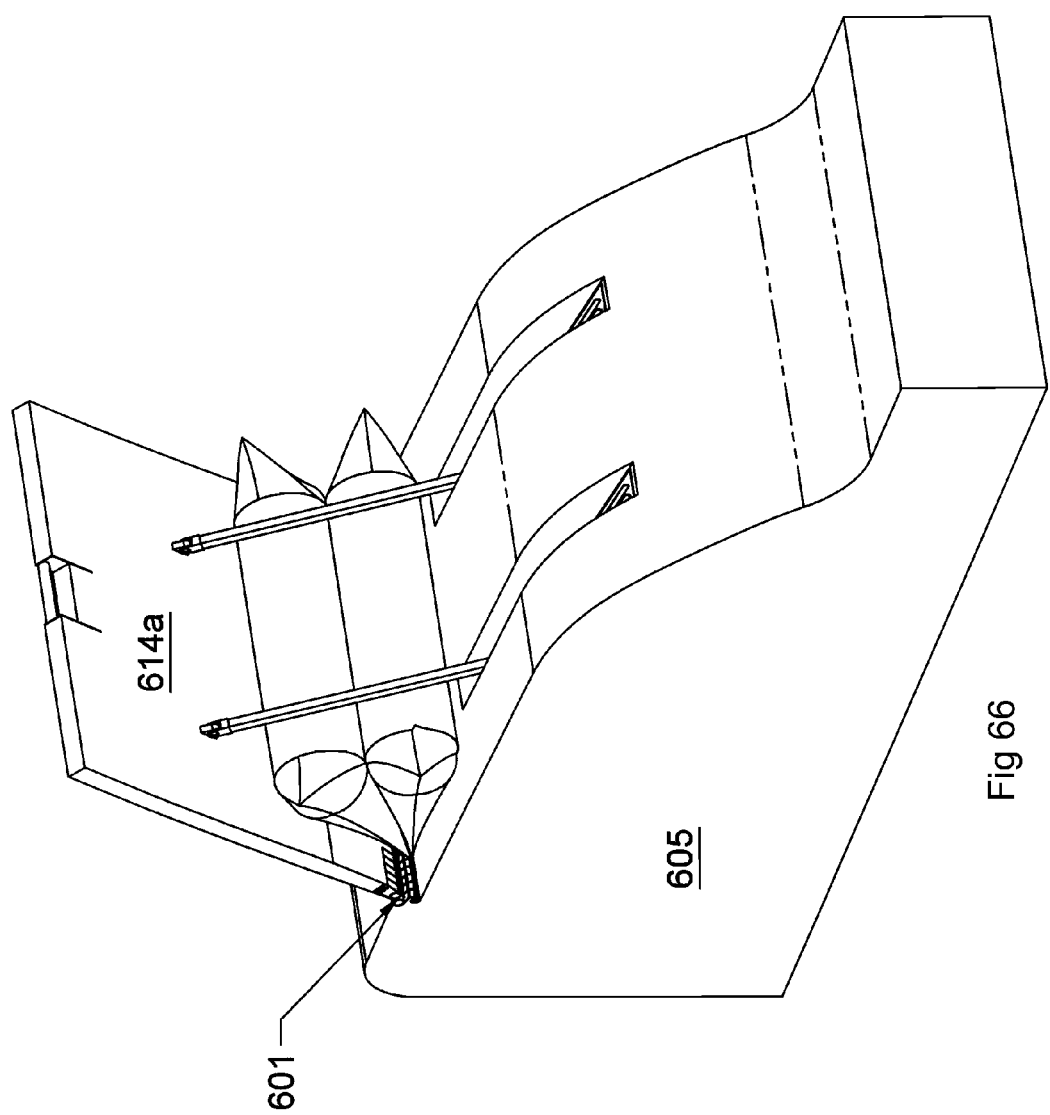

FIG. 66 is a close-up perspective view from the downstream side of the embodiment of the present invention of FIG. 63 as it might be installed on a dam spillway.

Figure 67:
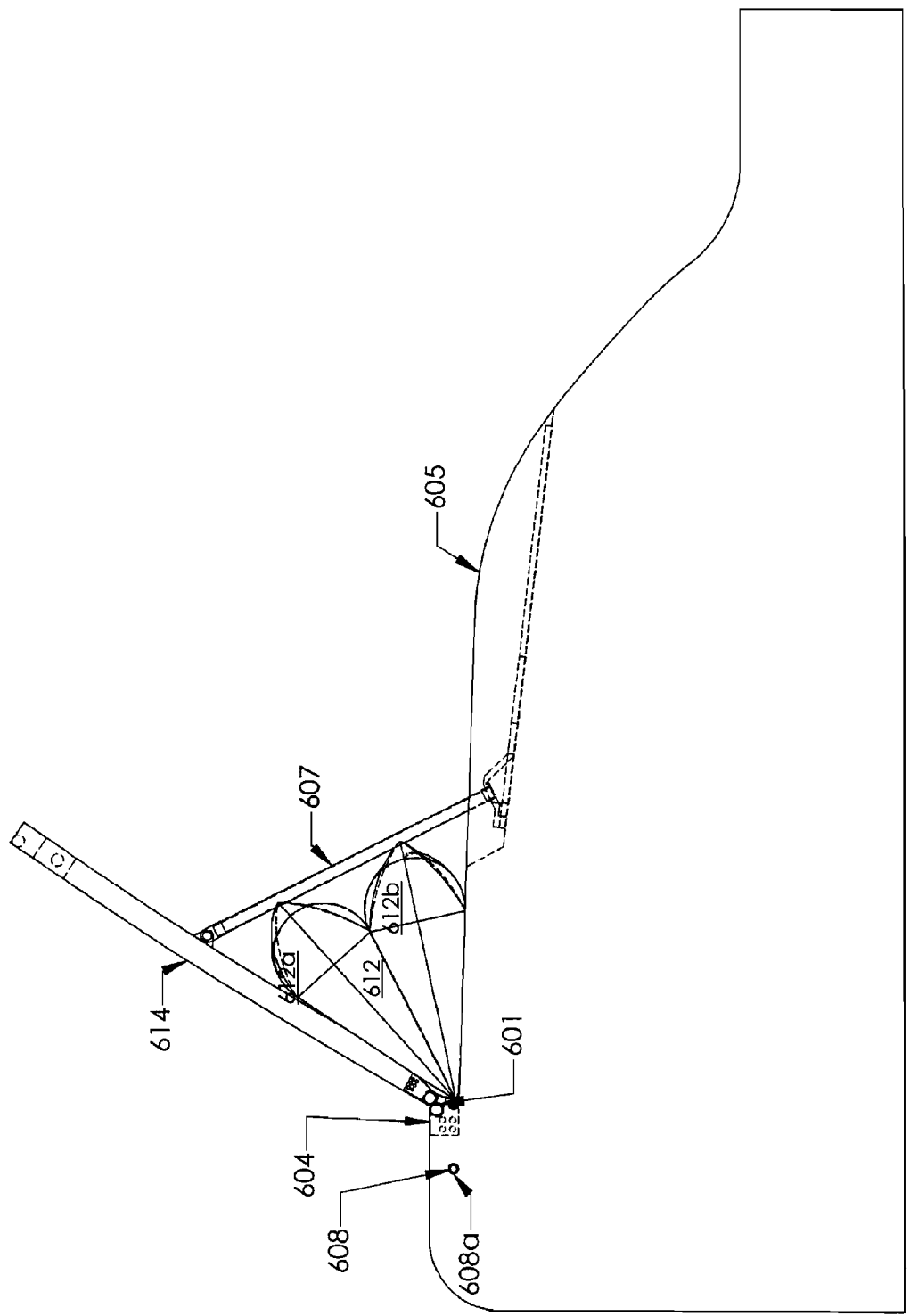

FIG. 67 is a sectional elevation of the embodiment of the present invention depicted in FIGS. 62 and 66, showing a gate in its raised position in association with the actuating air bladder inflated.

Figure 68:
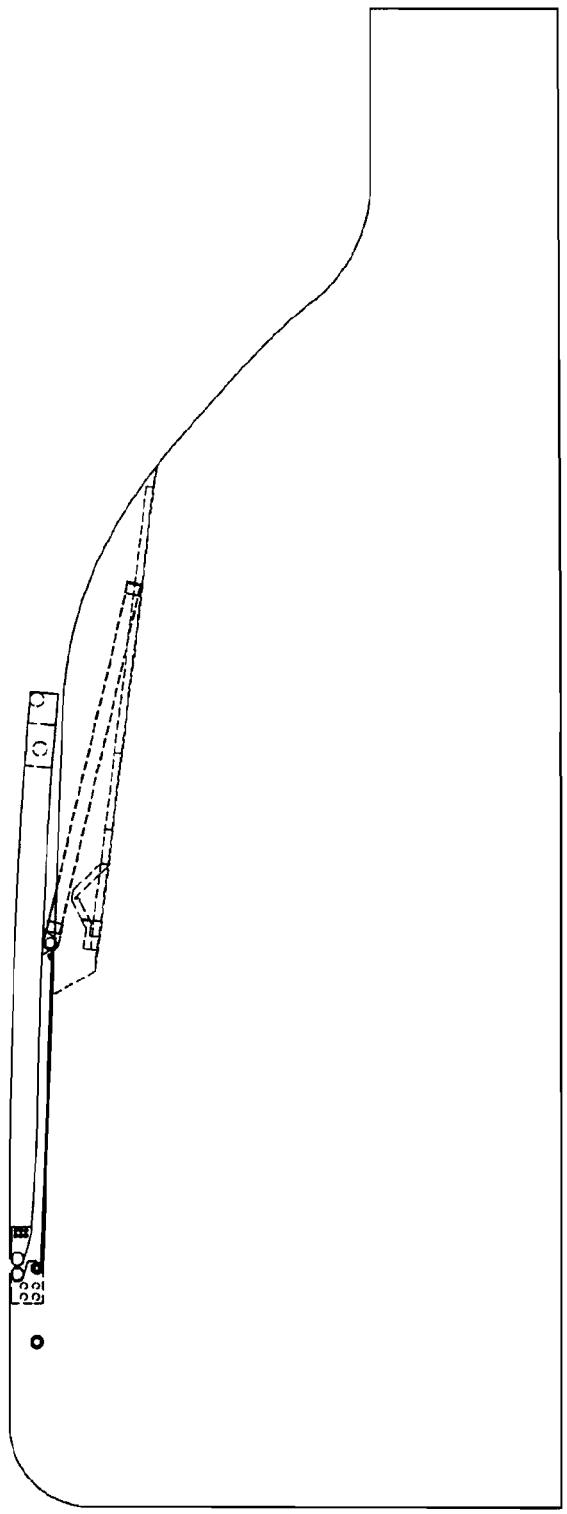

FIG. 68 is a perspective view of at least one embodiment of the present invention in the form of a flood protection barrier.

Figure 69:
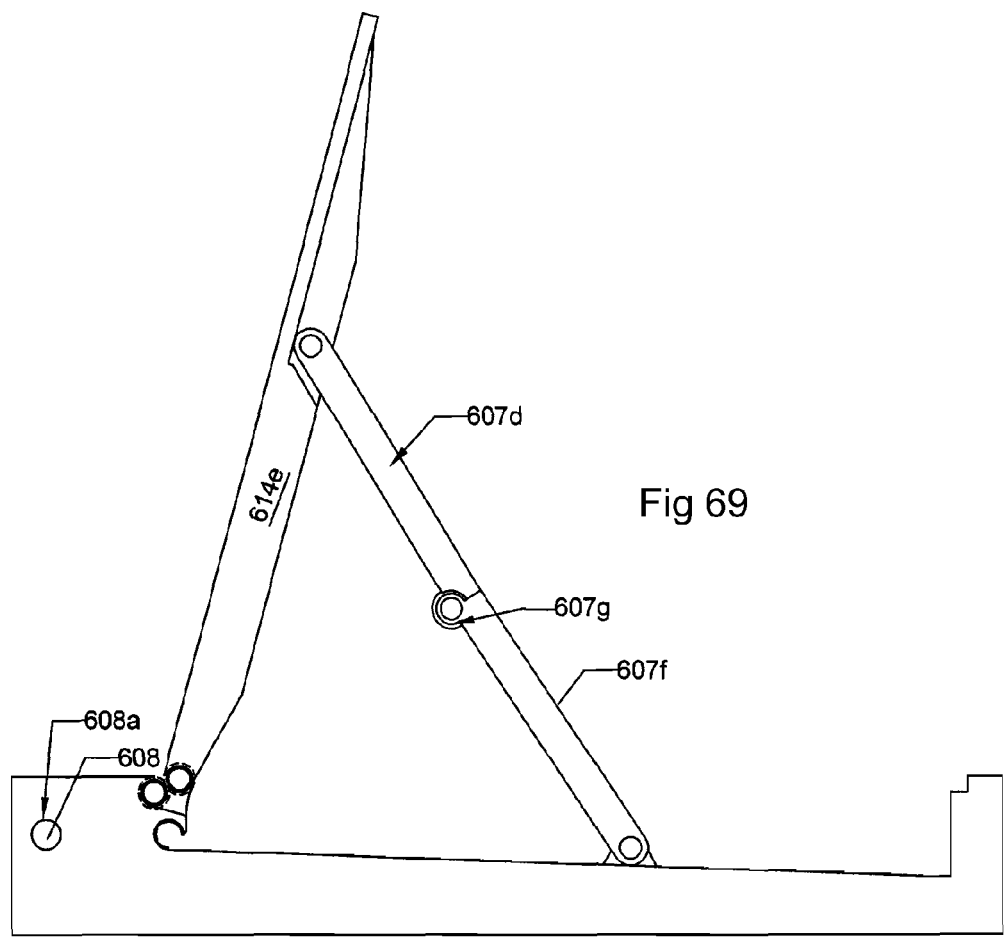

FIG. 69 is a sectional elevation view of at least one embodiment of FIG. 68 in its raised position.

Figure 70:
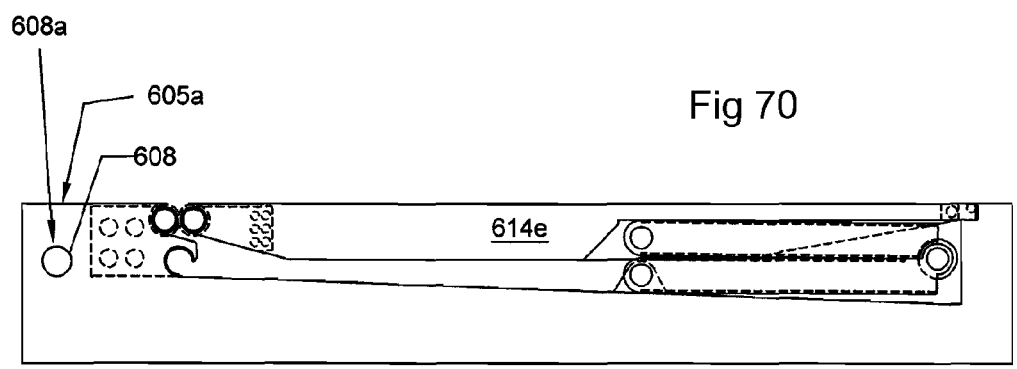

FIG. 70 is a sectional elevation view of at least one embodiment of FIGS. 68 and 69 with the gate panel in its lowered position.

Figure 71:
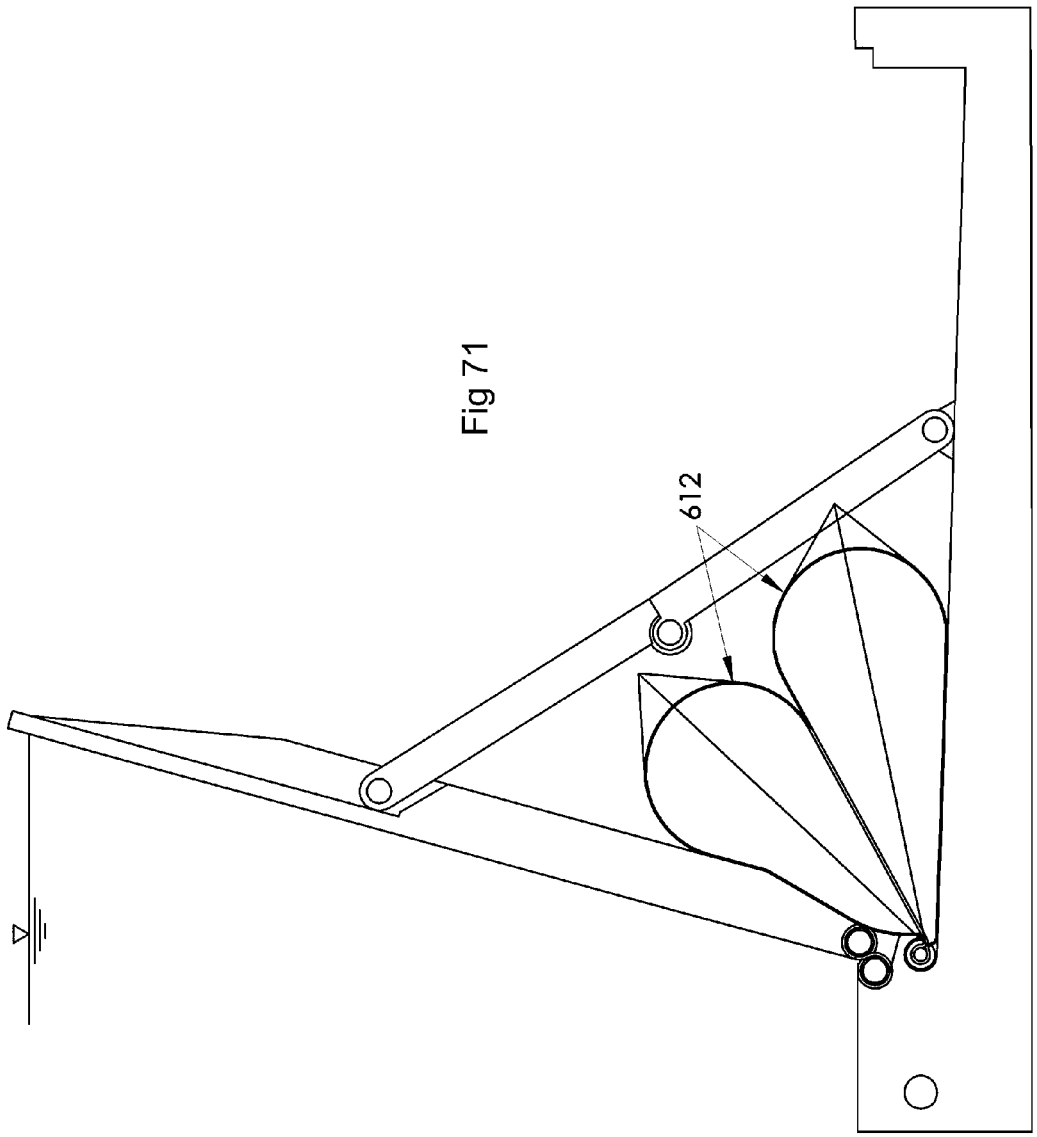

FIG. 71 is a view of at least one embodiment of FIG. 69 with an actuating air bladder in its inflated configuration.

Figure 72:
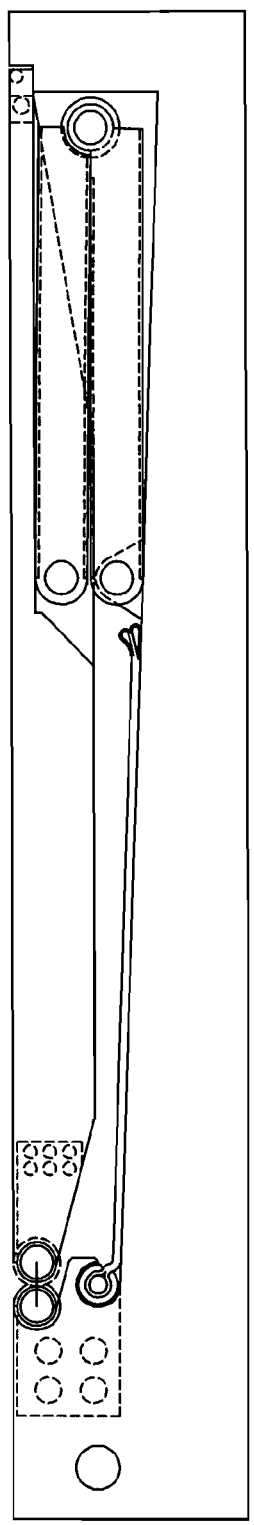

FIG. 72 is a view of at least one embodiment of FIG. 70 shown with air bladders in deflated configuration.

Figure 73:
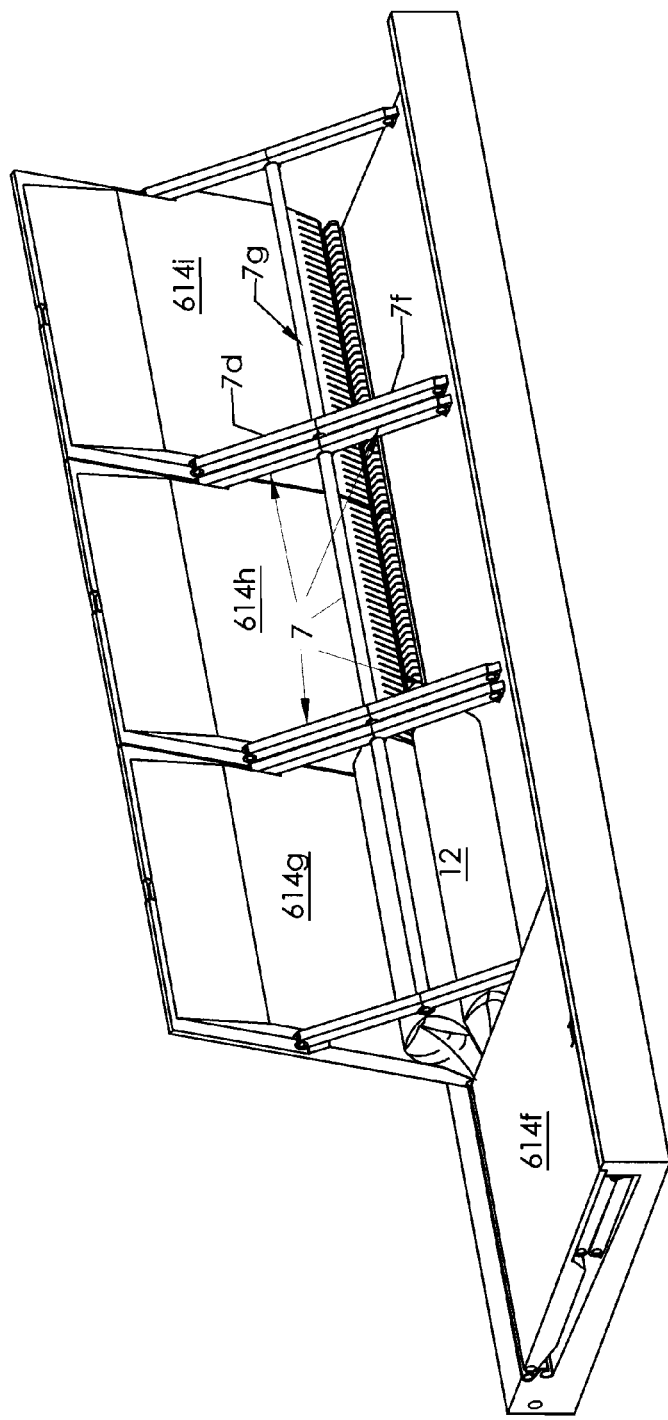
Figure 74:
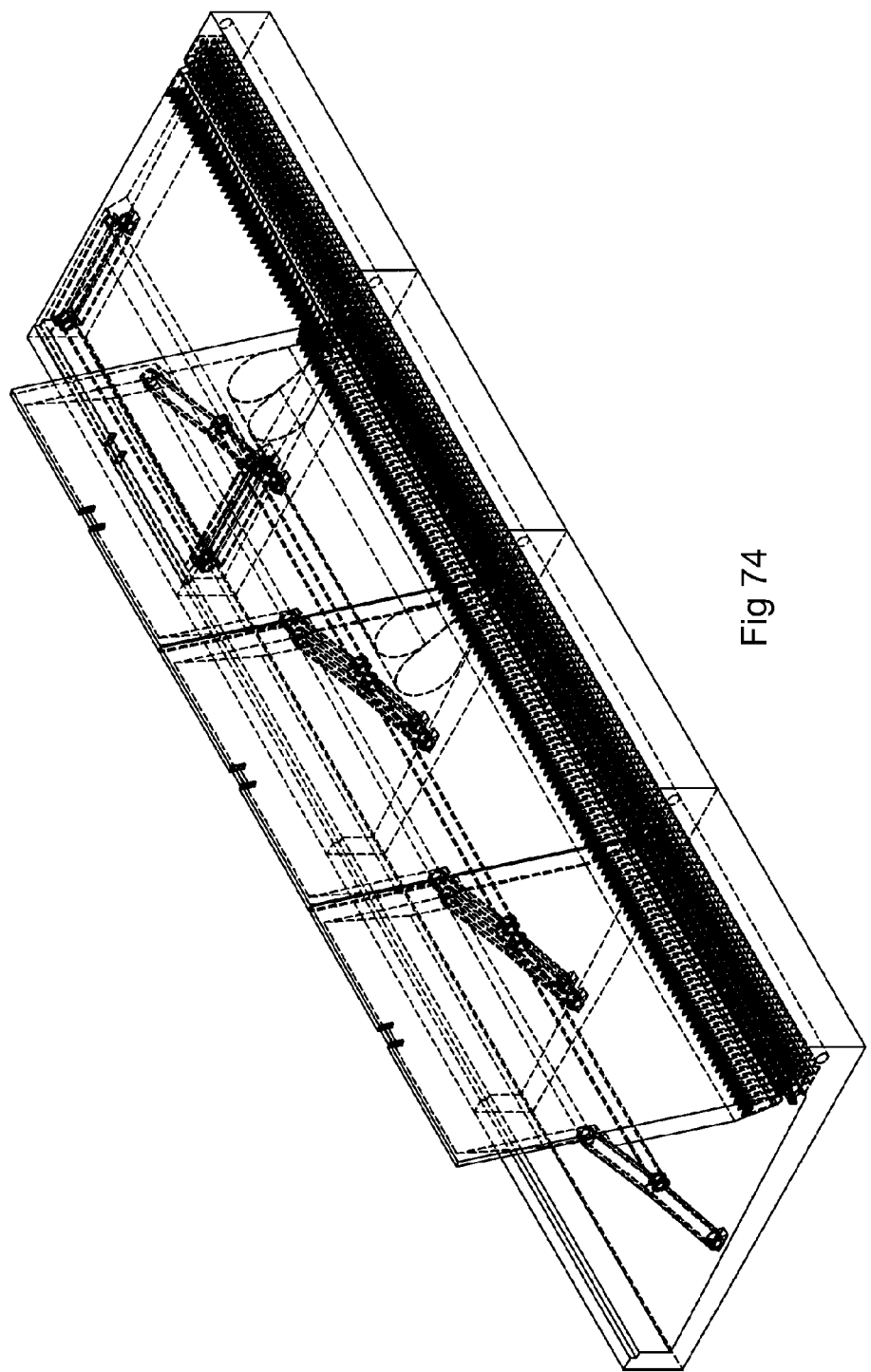
Figure 75:
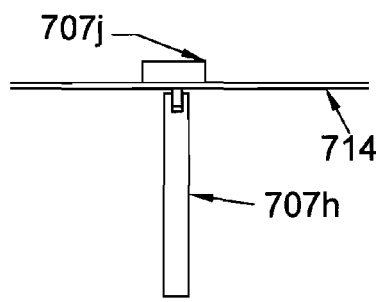
Figure 76:
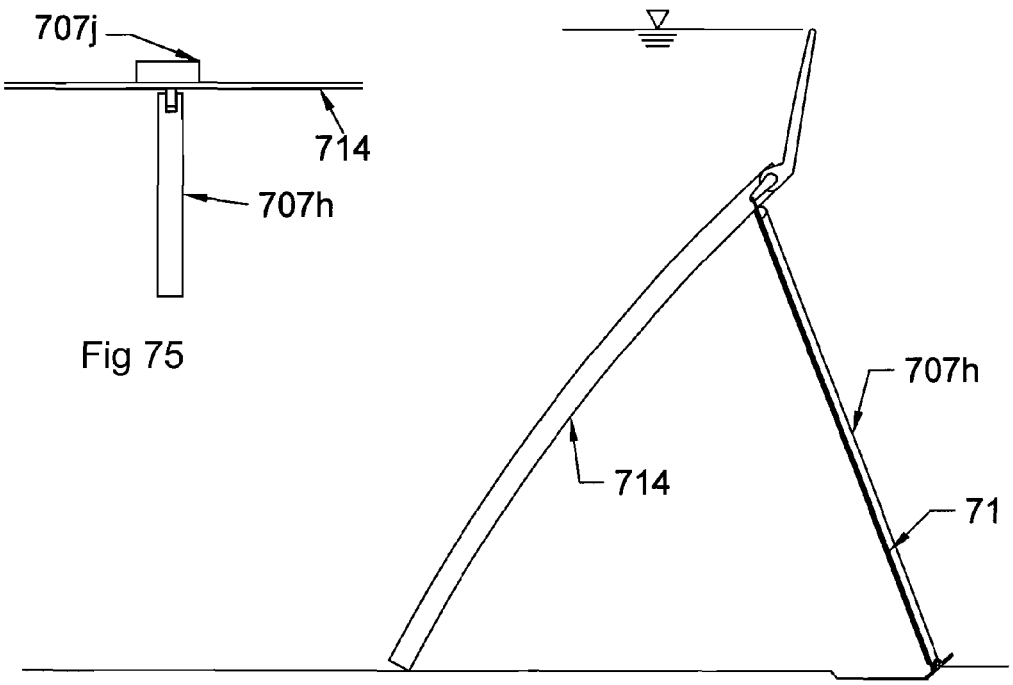
Figure 77:
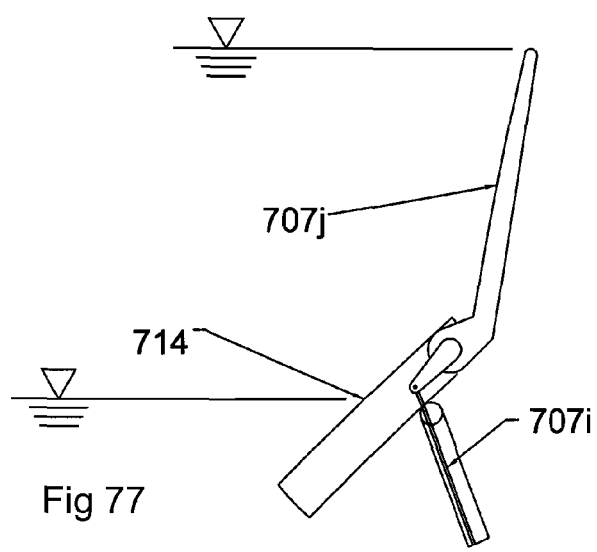
Figure 78:
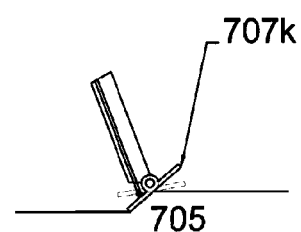

FIGS. 73 and 74 are sectional elevation views of at least one embodiment of the present invention featuring an automatic tripping mechanism.

FIGS. 75 through 78 are views of portions of FIGS. 73 and 74.

FIG. 64 is a perspective view of an example hinge portion of at least one embodiment of the present invention depicted in FIGS. 57 through 60.

Figure 79:
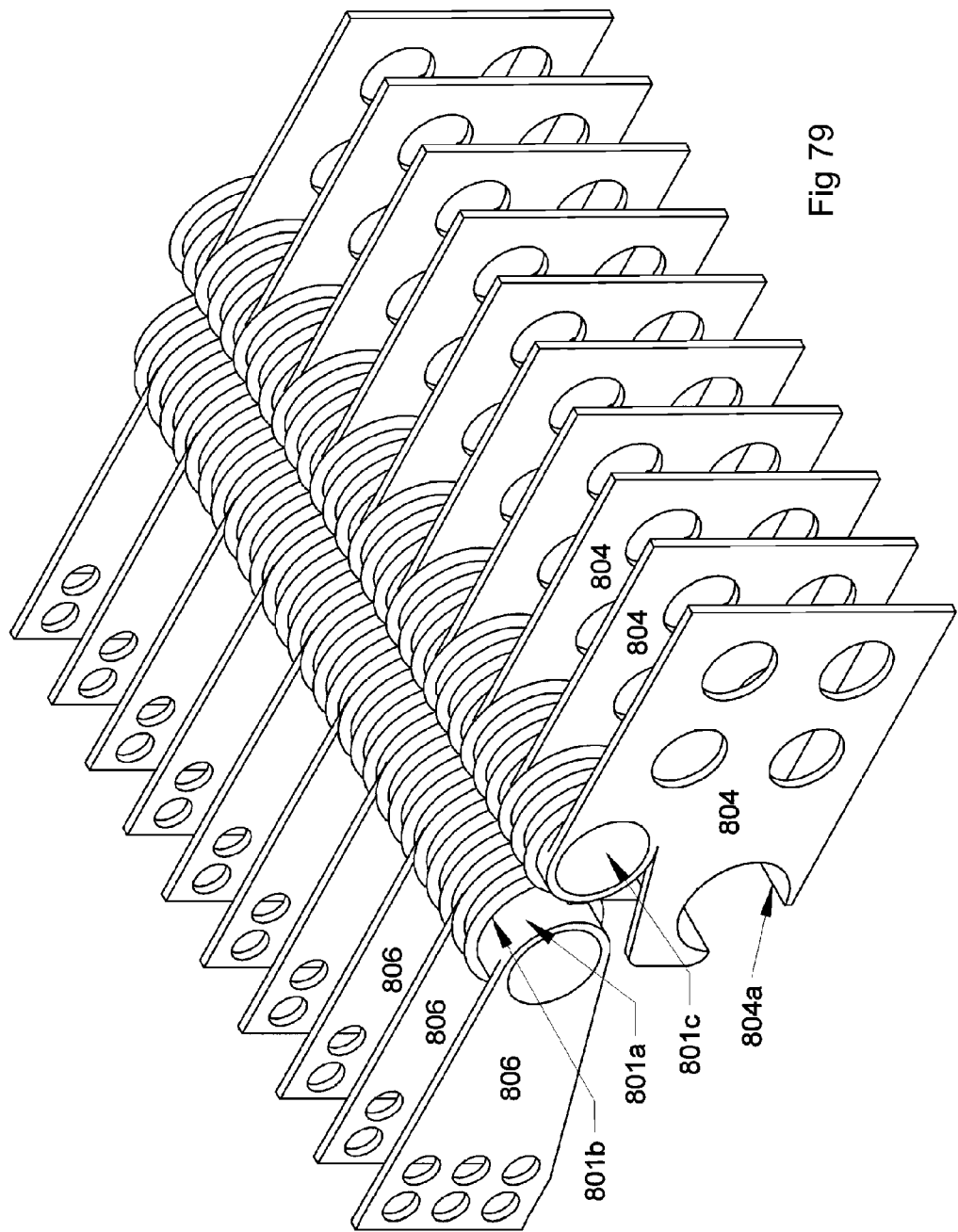
Figure 80:
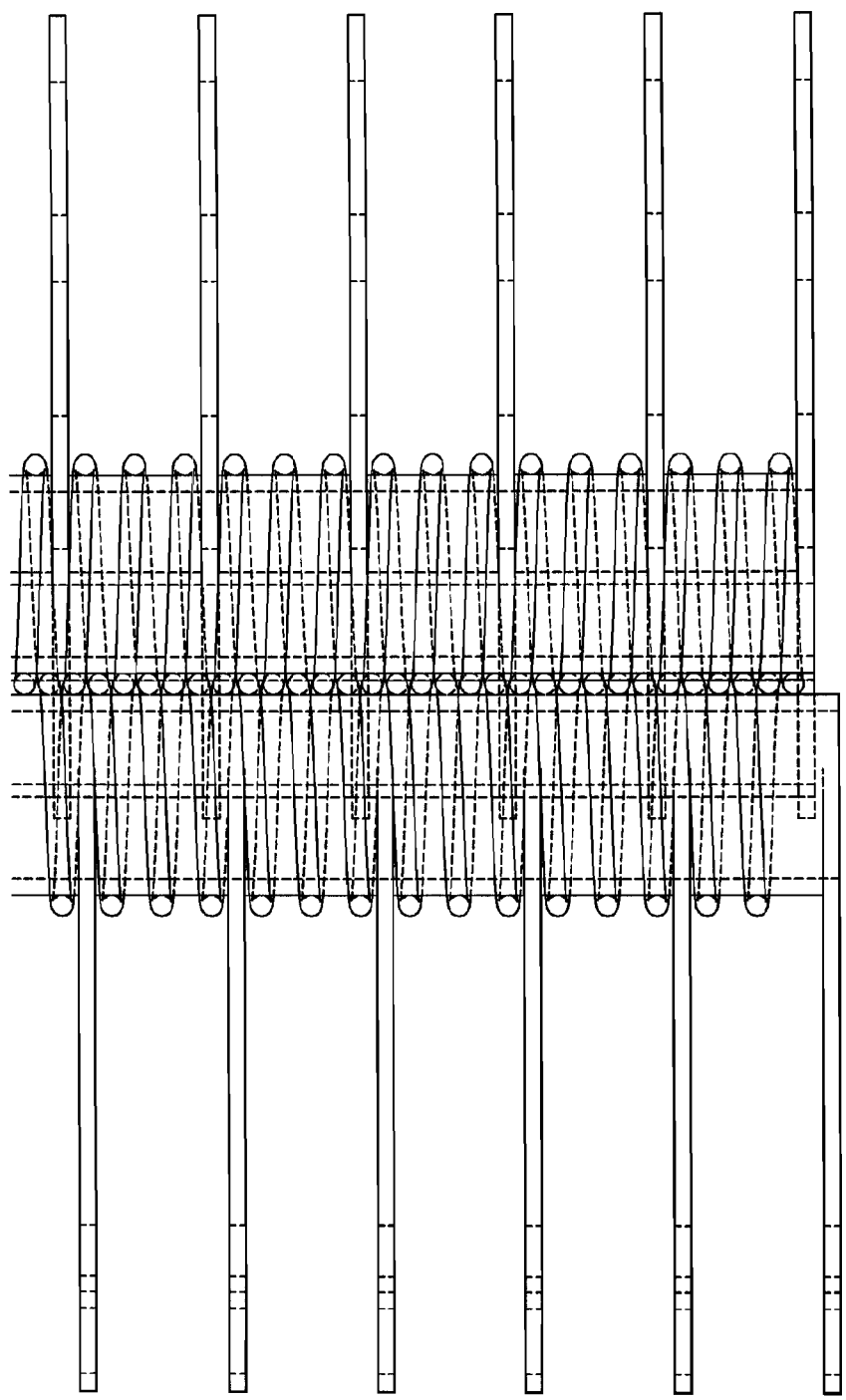

FIG. 80 is a plan view of the hinge portion of at least one embodiment of the present invention as depicted in FIGS. 68 through 72 and FIG. 79.

Figure 81:
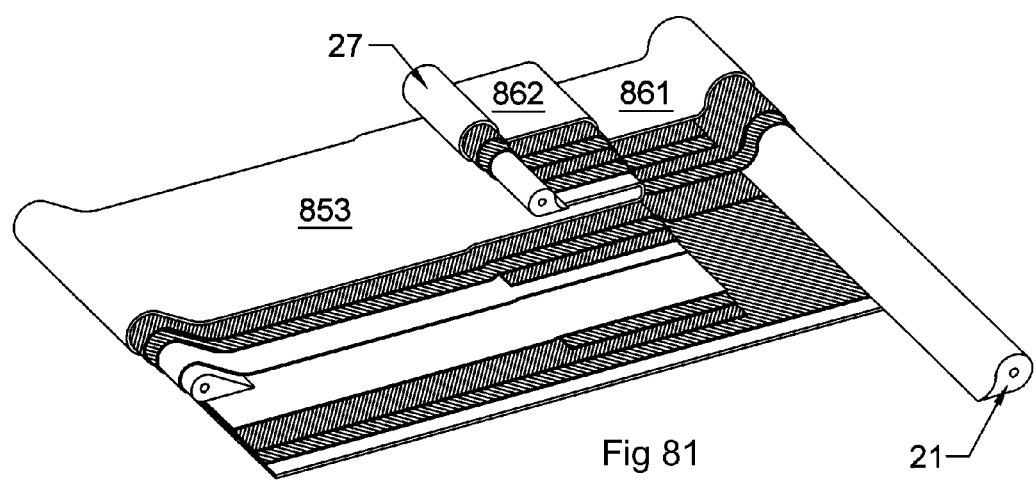
Figure 82:
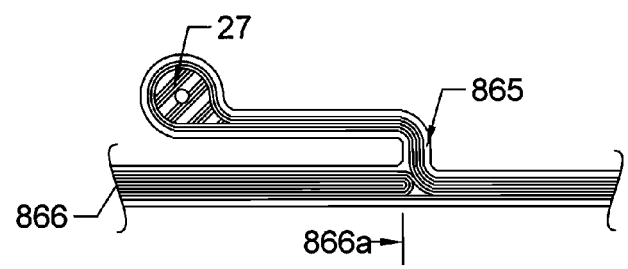
Figure 83:
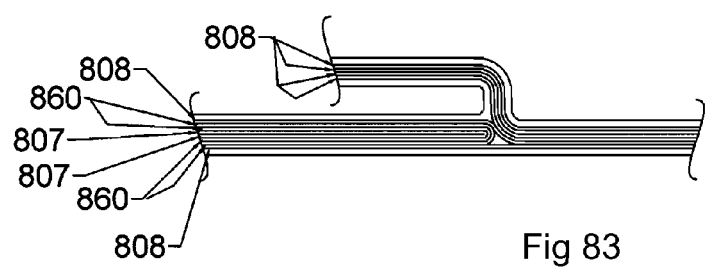

FIGS. 81, 82, and 83 show a cross section of an air bladder in accordance with an aspect of the present invention.

Figure 84:
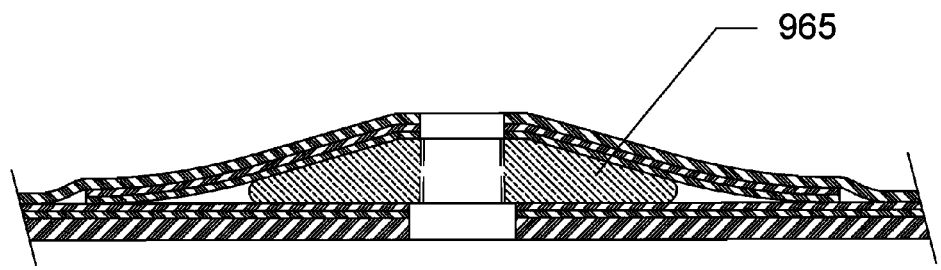
Figure 85:
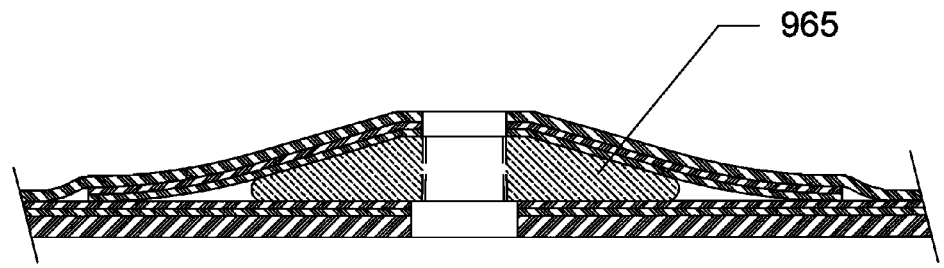
Figure 86:
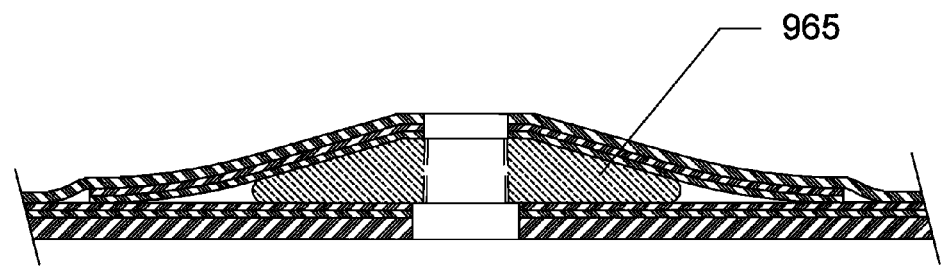

FIGS. 84, 85, and 86 show a cross section of an air fitting in accordance with an aspect of the present invention.

Figure 87:
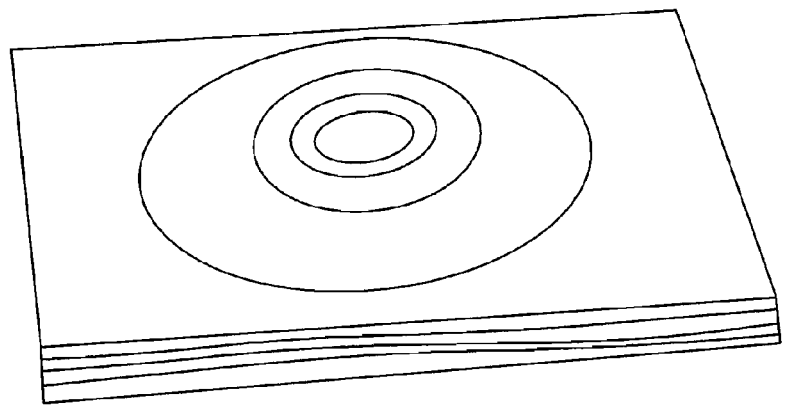
Figure 88:
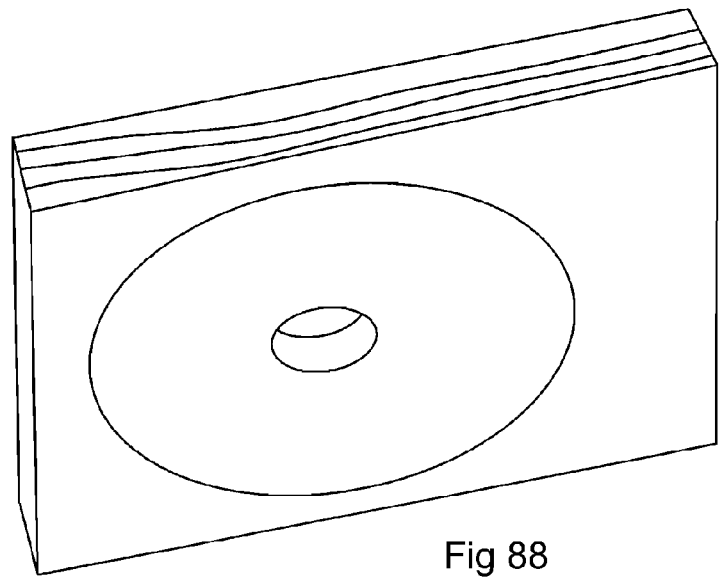

FIGS. 87 and 88 show a portion of an air bladder and its associated air fitting in accordance with an aspect of the present invention.

Figure 89:
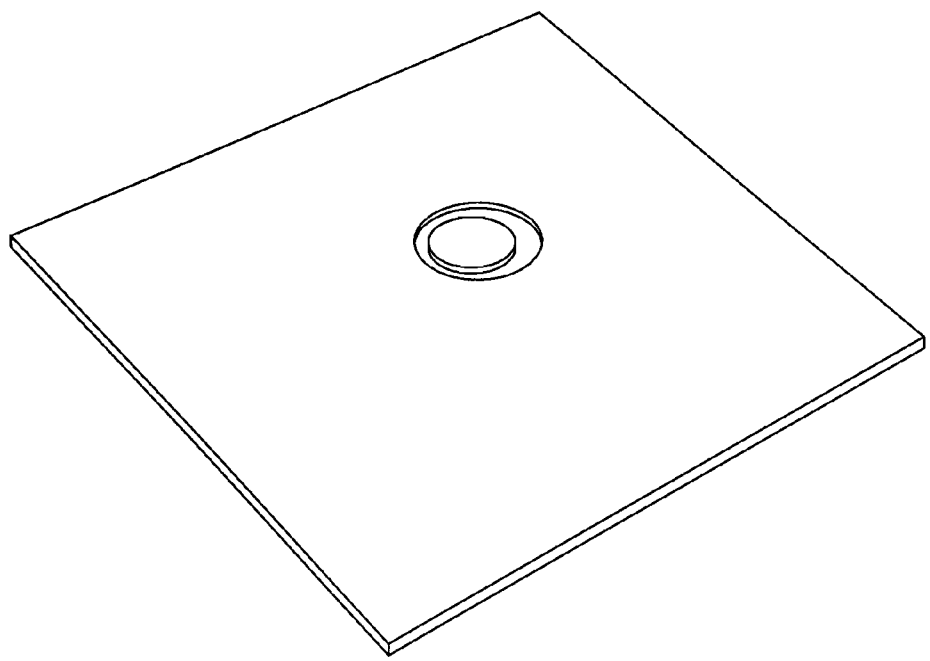

FIG. 89 shows of a portion of a partially constructed air bladder and its associated air fitting in accordance with an aspect of the present invention.

Figure 90:
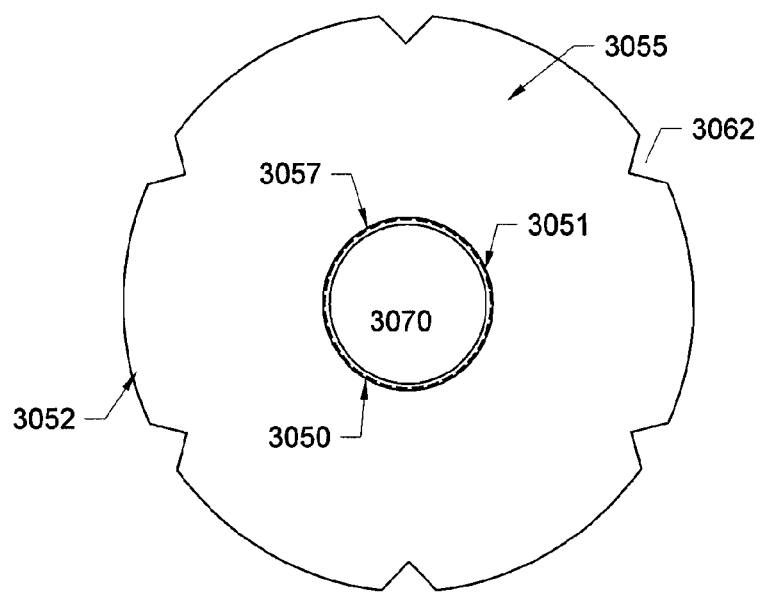

FIG. 90 is a plan view of an air fitting in accordance with an aspect of the present invention.

Figure 91:
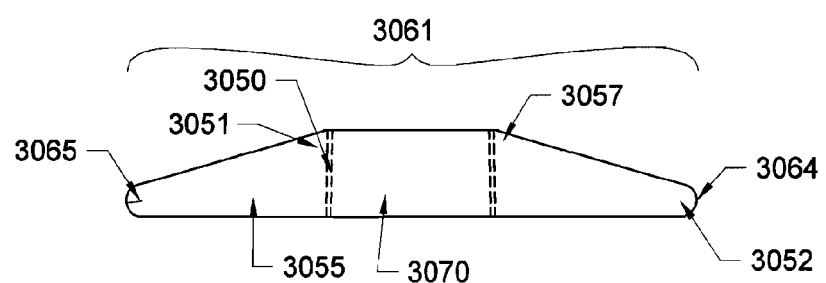

FIG. 91 is an elevation view of the air fitting of FIG. 90 in accordance with an aspect of the present invention.

Figure 92:
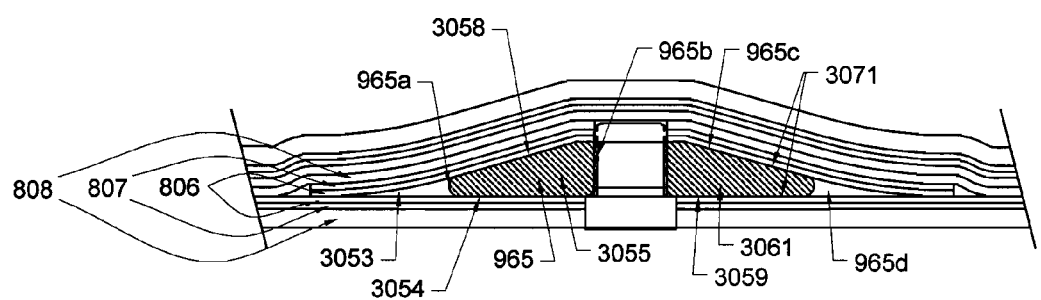

FIG. 92 is a cross section view of the air fitting of FIGS. 81 through 91 in accordance with an aspect of the present invention.

Figure 93:
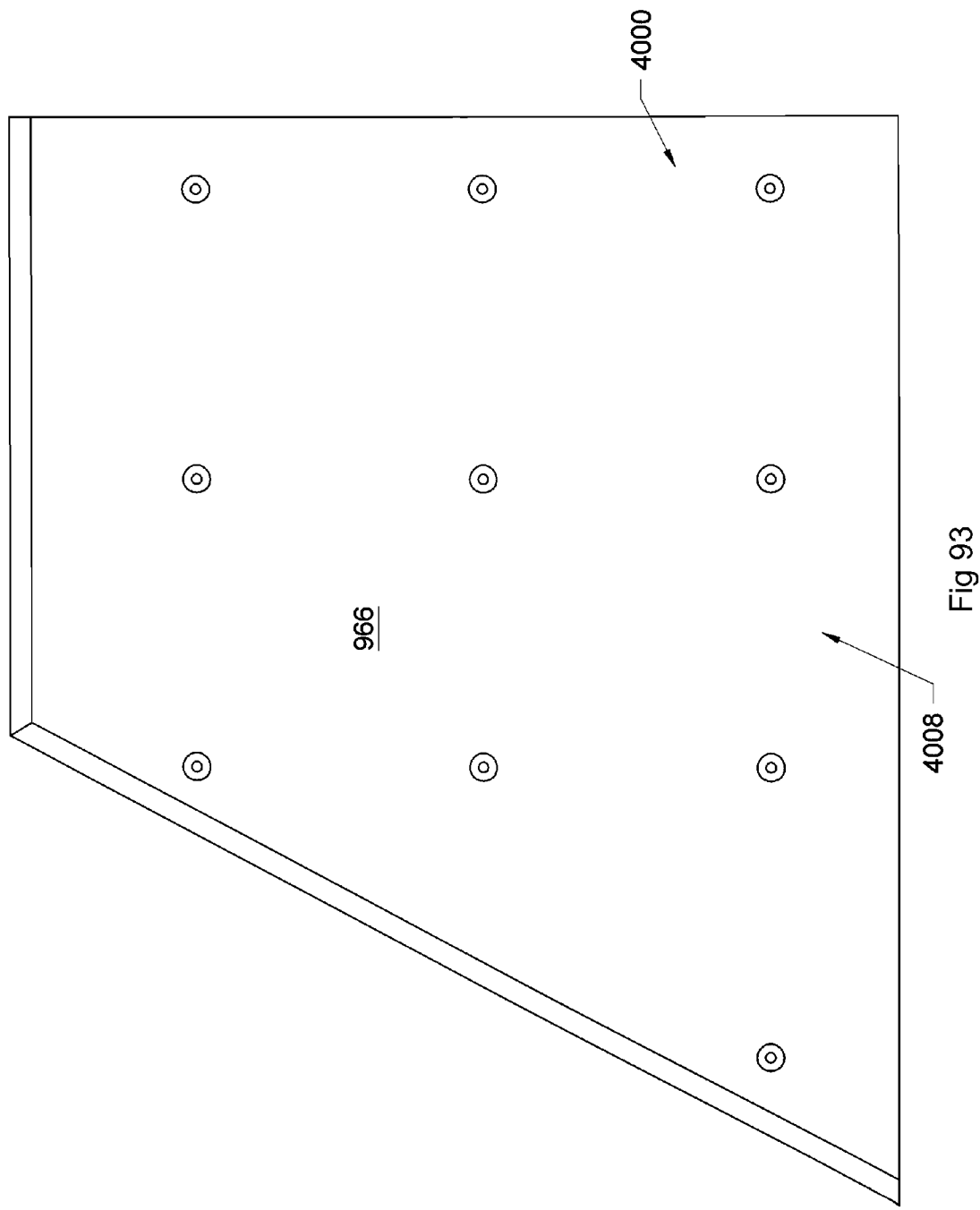

FIG. 93 is an elevation view of an abutment plate in accordance with an aspect of the present invention.

Figure 94:
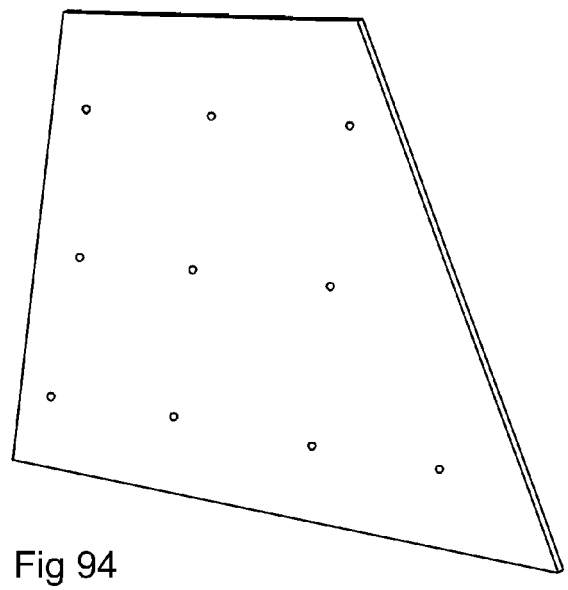

FIG. 94 shows the water and gate side of an abutment plate in accordance with an aspect of the present invention.

Figure 95:
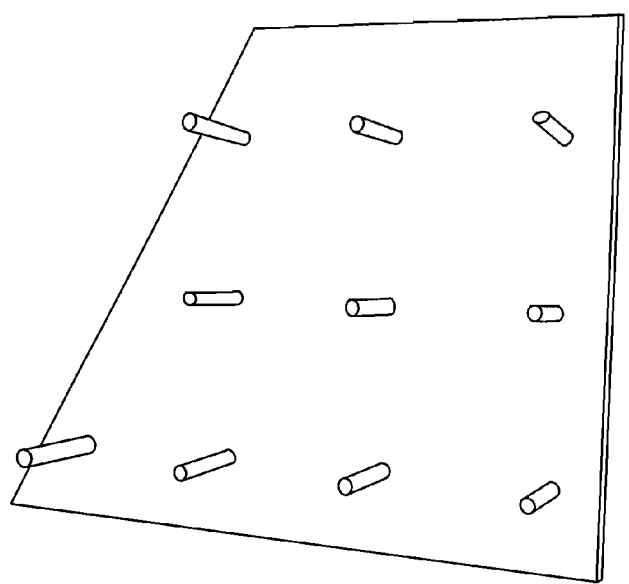

FIG. 95 shows the concrete side of an abutment plate in accordance with an aspect of the present invention.

Figure 96:
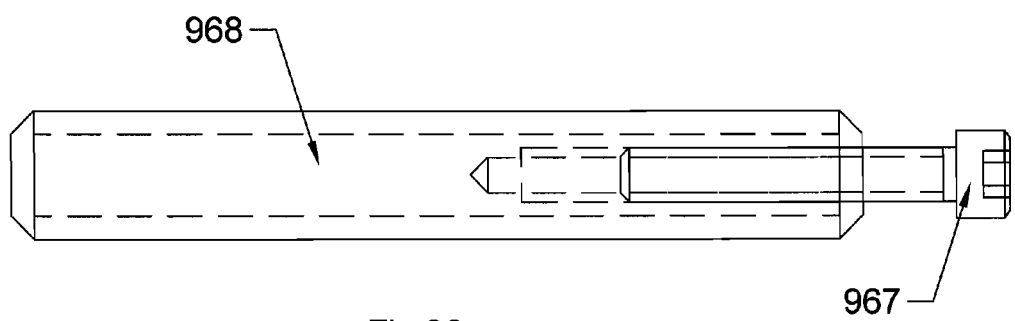

FIG. 96 shows the concrete anchor assembly associated with an abutment plate in accordance with an aspect of the present invention.

FIG. 97 is a plan view of the abutment plate of FIG. 93 in accordance with an aspect of the present invention.

FIG. 98 is a detail cross section of the abutment plate of FIGS. 93 and 97 in accordance with an aspect of the present invention.

Figure 99:
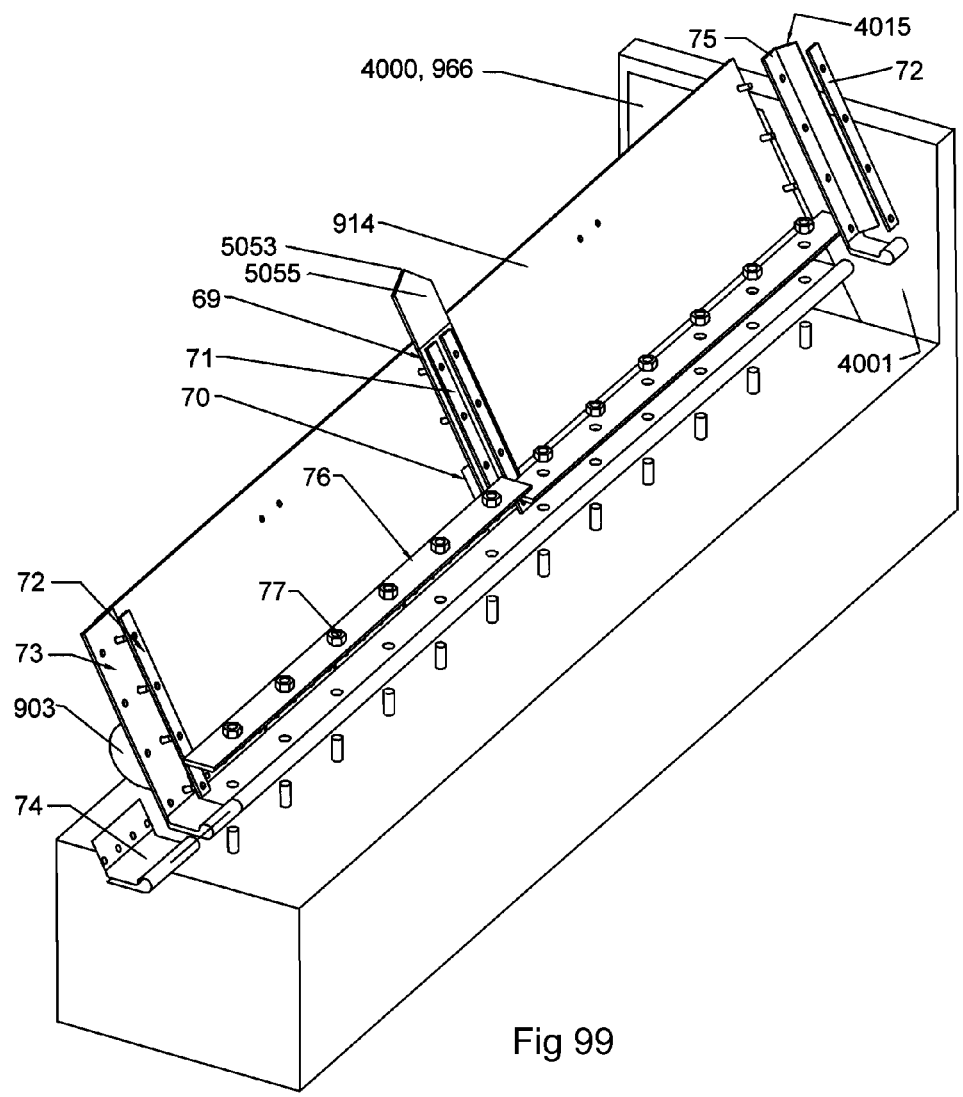

FIG. 99 is an exploded view of a spillway gate assembly in accordance with an aspect of the present invention.

Figure 100:
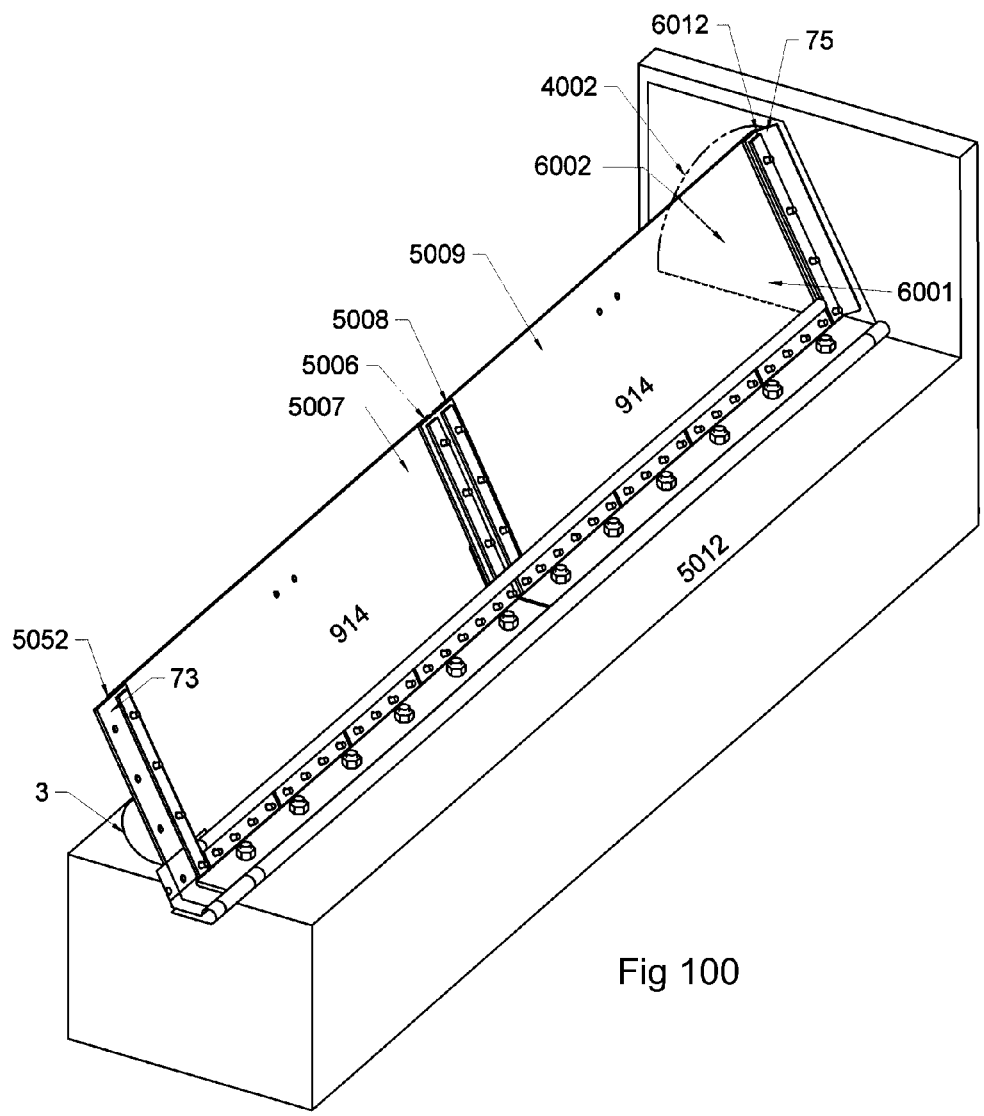

FIG. 100 is a perspective view of the spillway gate system in accordance with an aspect of the present invention.

Figure 101:
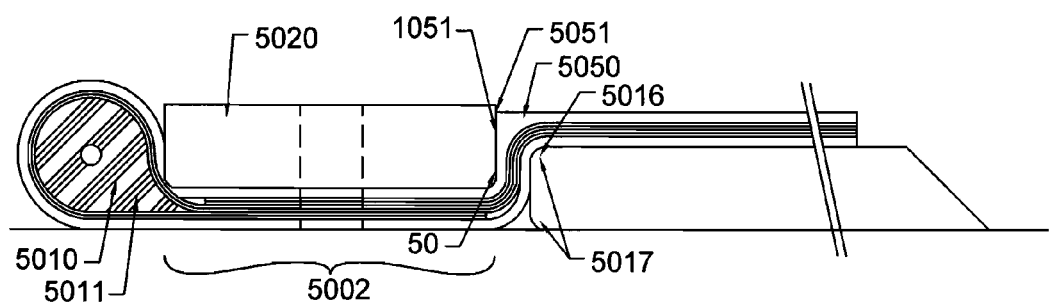

FIG. 101 is a cross section of an inter-panel seal in accordance with an aspect of the present invention.

Figure 102:
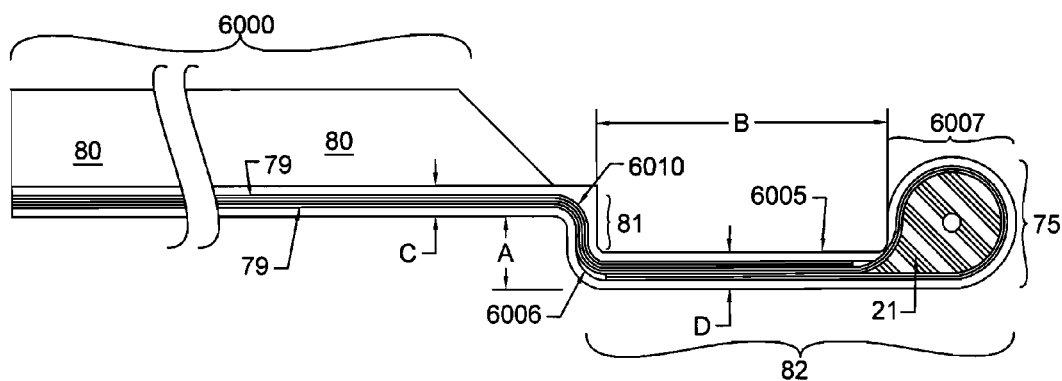

FIG. 102 is an elevation view of one embodiment of an abutment seal in accordance with an aspect of the present invention.

Figure 103:
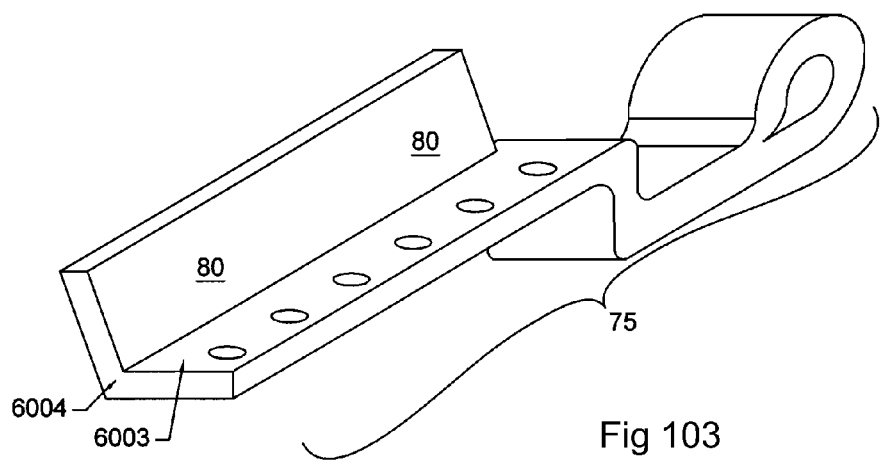

FIG. 103 is a perspective view of the seal of FIG. 102 in accordance with an aspect of the present invention.

Figure 104:
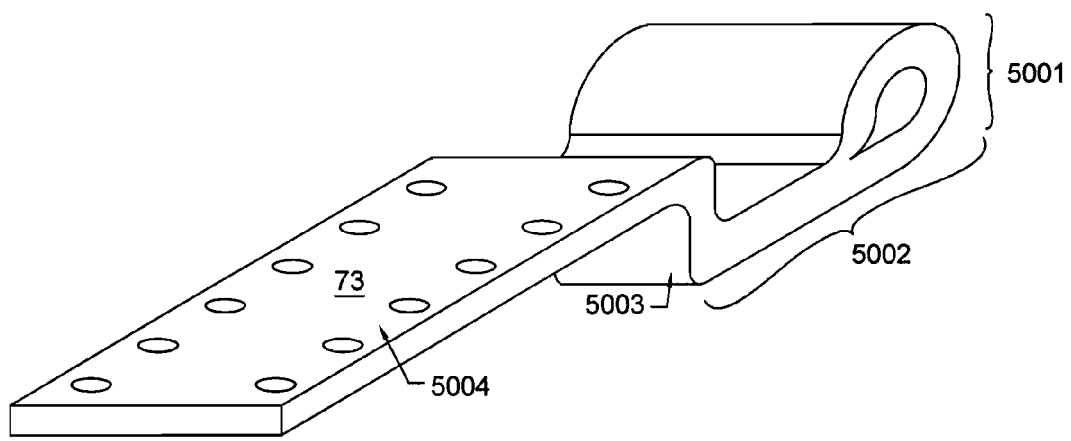

FIG. 104 is a perspective view of an interpanel seal in accordance with an aspect of the present invention.

Figure 105:
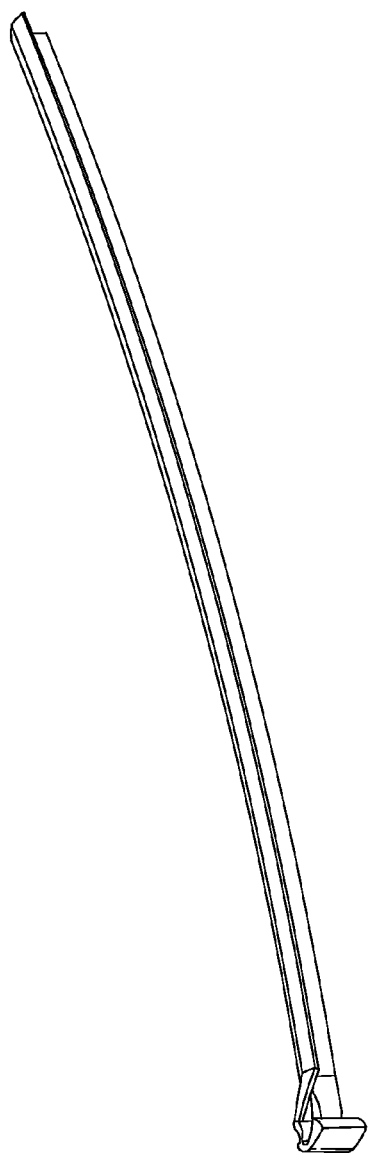

FIG. 105 is a perspective view of the abutment facing side of one embodiment of an abutment seal in accordance with an aspect of the present invention.

Figure 106:
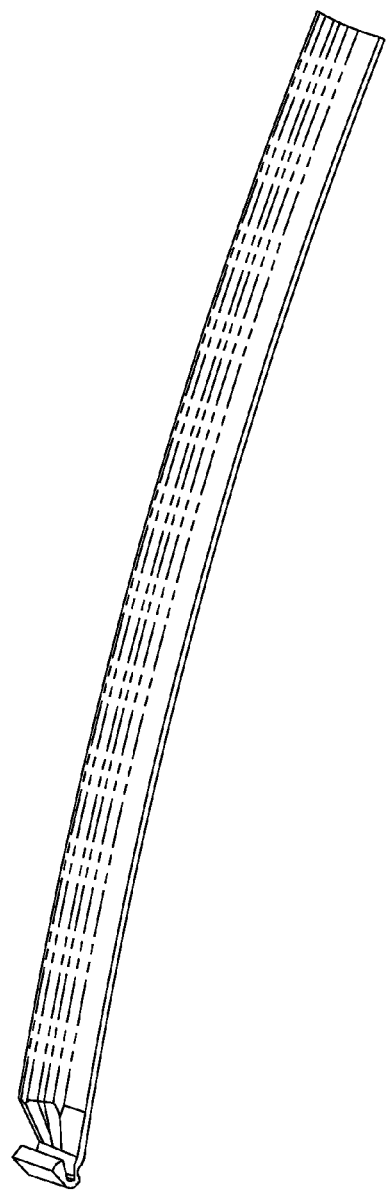

FIG. 106 is a perspective view of the water side of one embodiment of an abutment seal in accordance with an aspect of the present invention.

Figure 107:
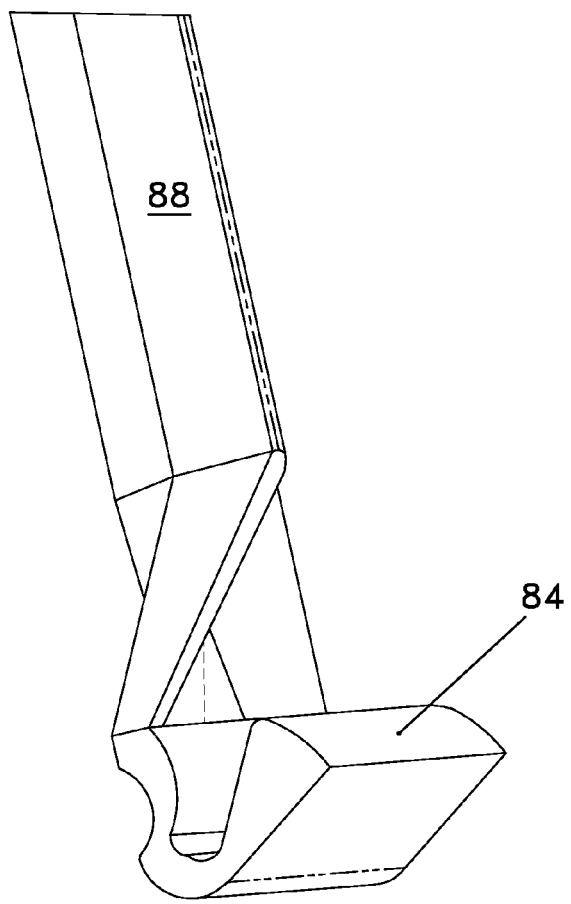

FIG. 107 is a close up view of a portion of FIG. 103.

Figure 108:
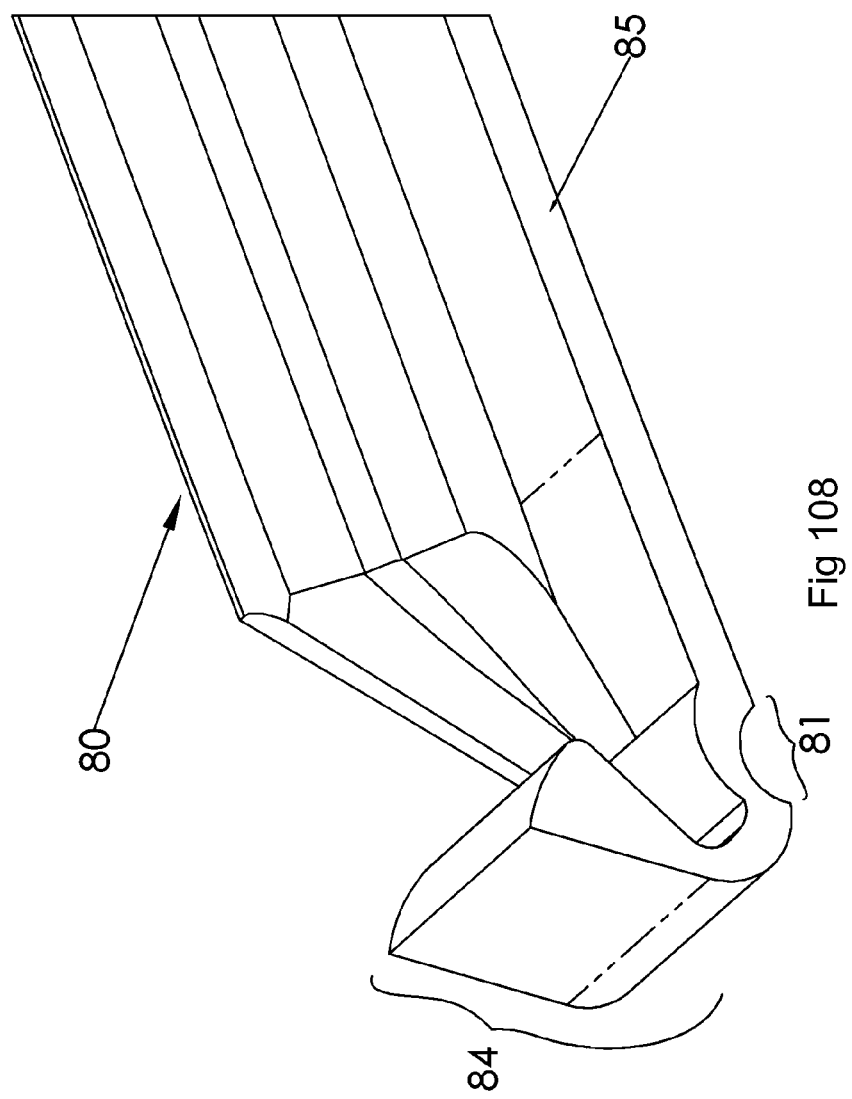

FIG. 108 is a close up view of a portion of FIG. 107.

Figure 109:
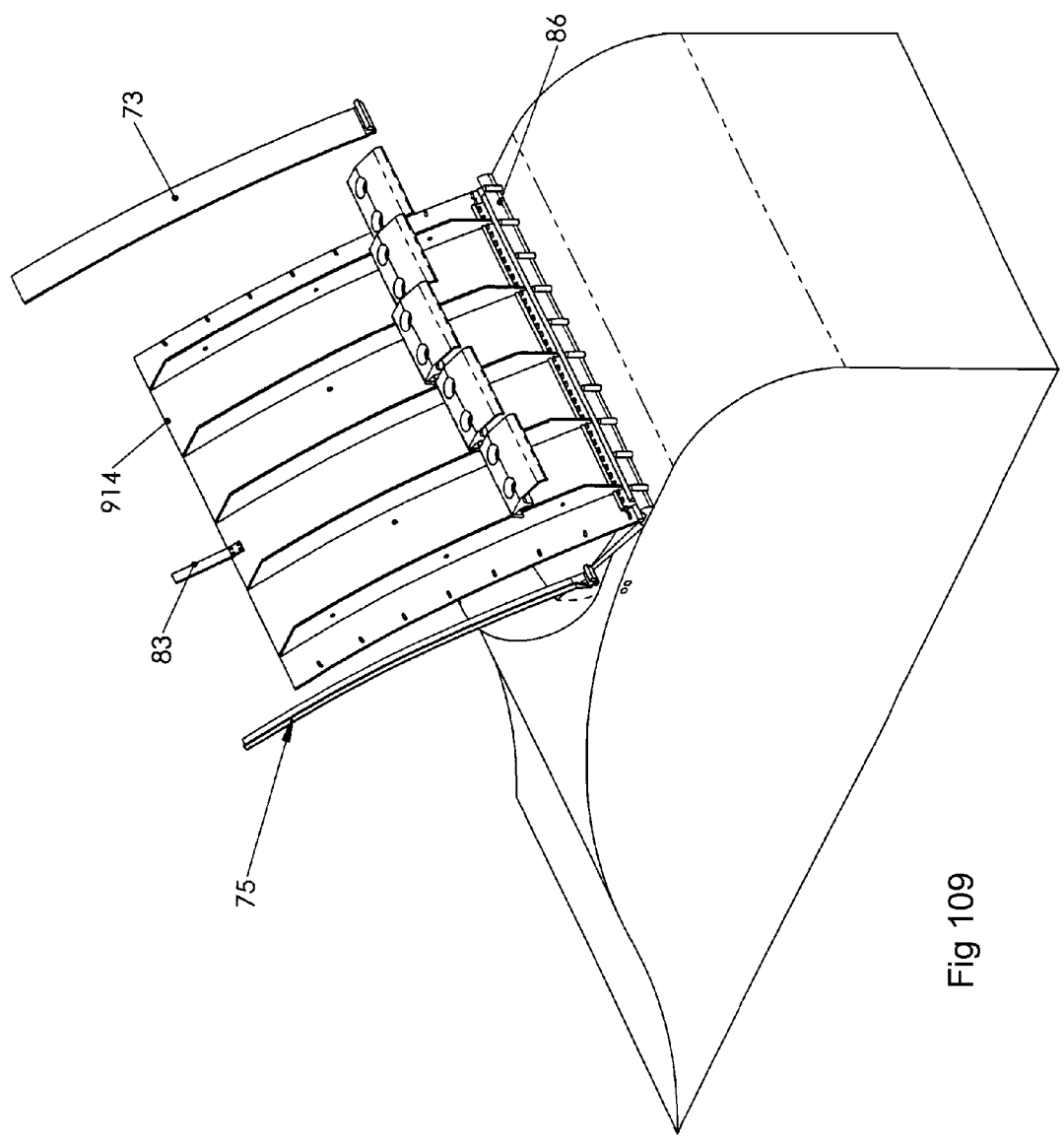

FIG. 109 is an exploded view of a gate system incorporating the abutment seal of FIGS. 105 through 108.

Figure 110:
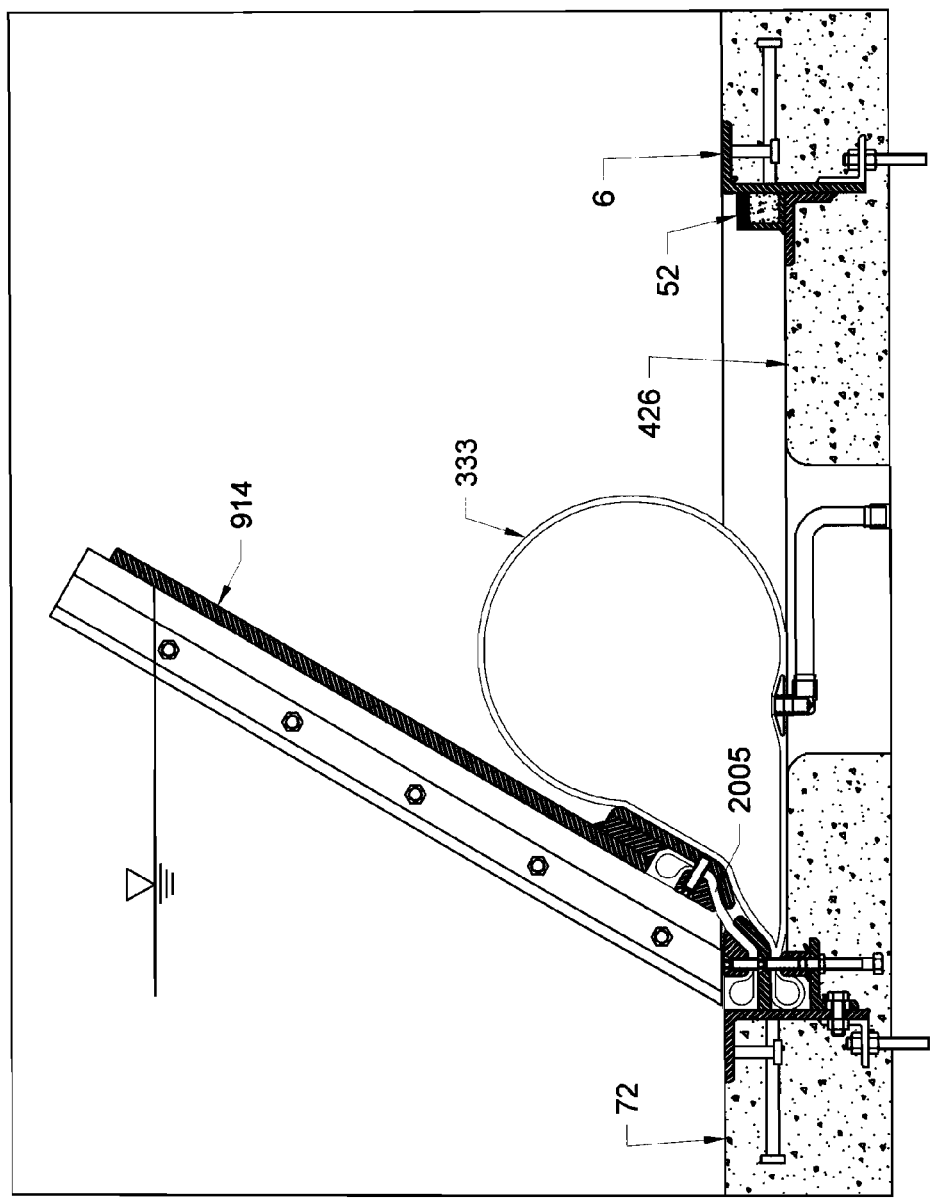

FIG. 110 is a cross section view of one embodiment of the present invention showing the gate in the raised position.

Figure 111:
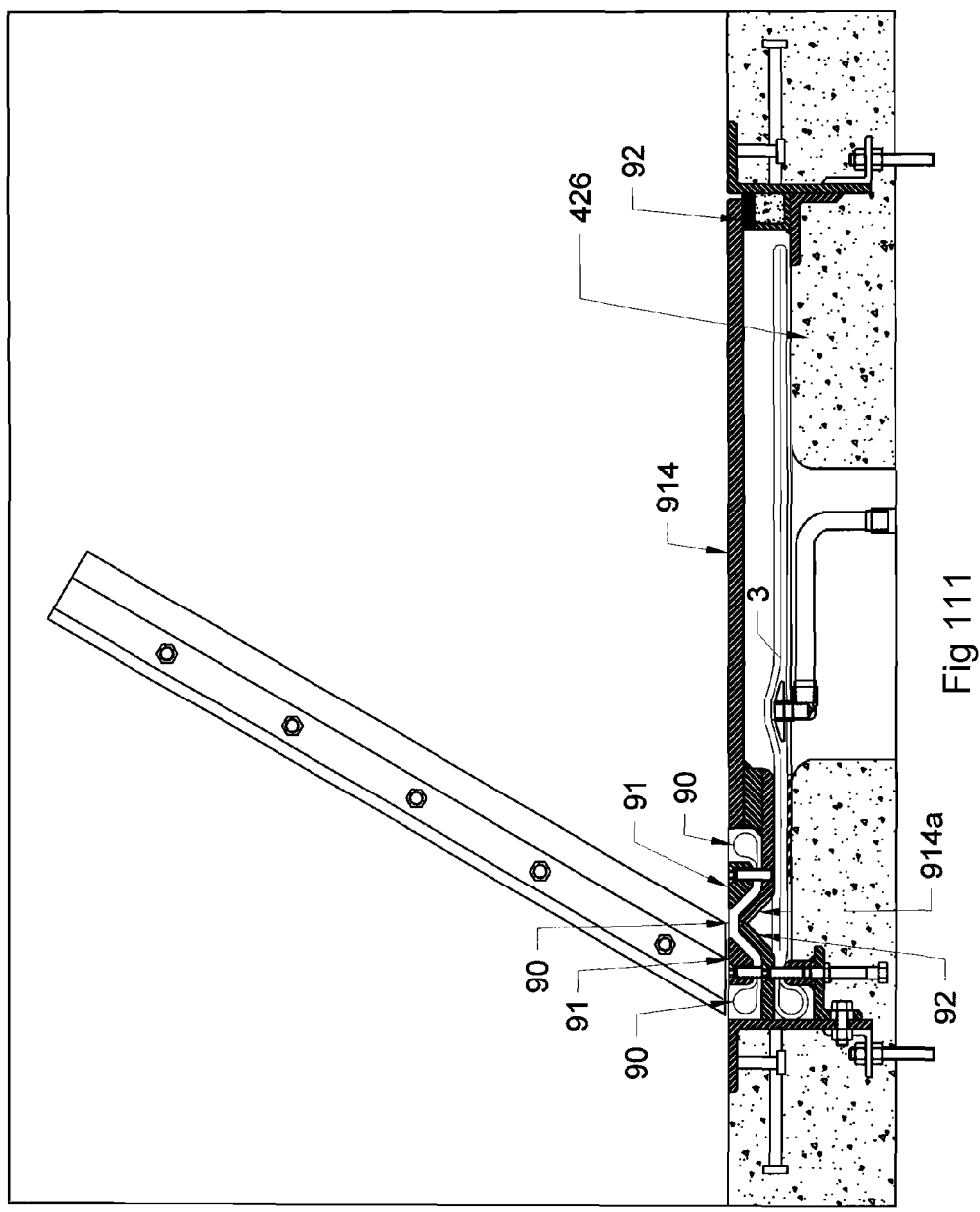

FIG. 111 is a cross section view of the gate of FIG. 110 showing the gate in the lowered position.

Figure 112:
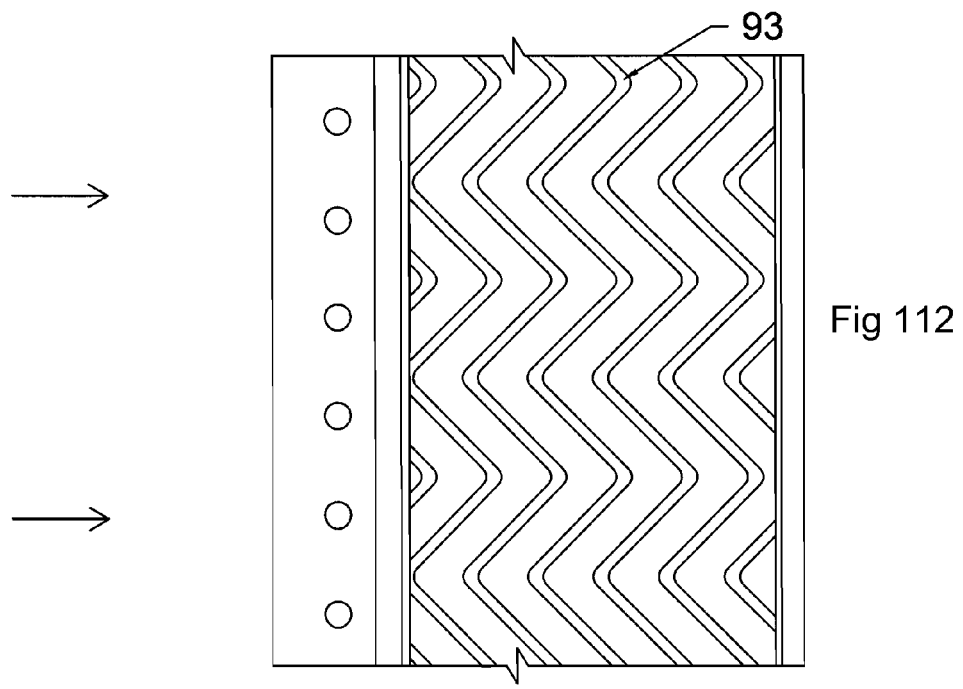

FIG. 112 is a plan view of an inflatable dam in its deflated position in accordance with one embodiment of the present invention.

Figure 113:
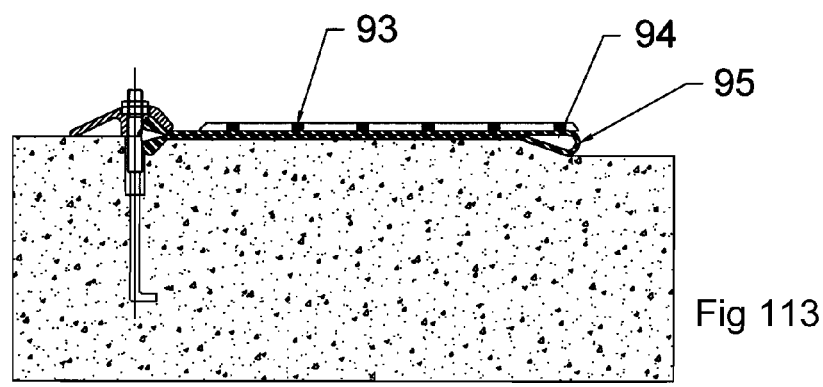

FIG. 113 is a sectional elevation view of the inflatable dam of FIG. 112 in its deflated position in accordance with one embodiment of the present invention.

Figure 114:
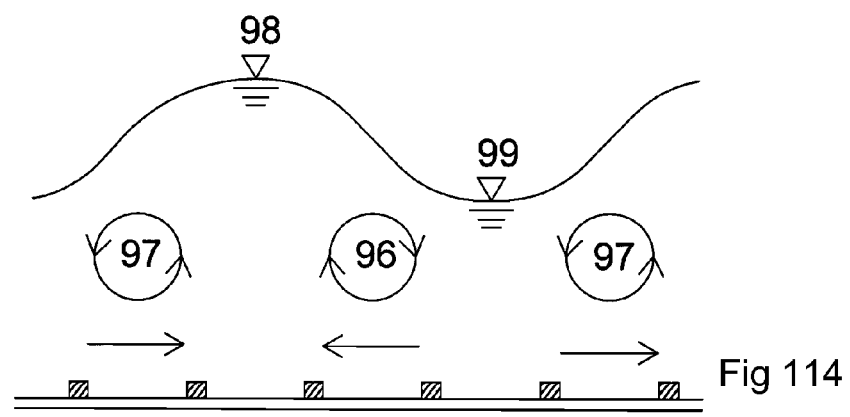

FIG. 114 is a cross section schematic of water flow over the inflatable dam of FIGS. 112 and 113 with said inflatable dam in its inflated position.

Figure 115:
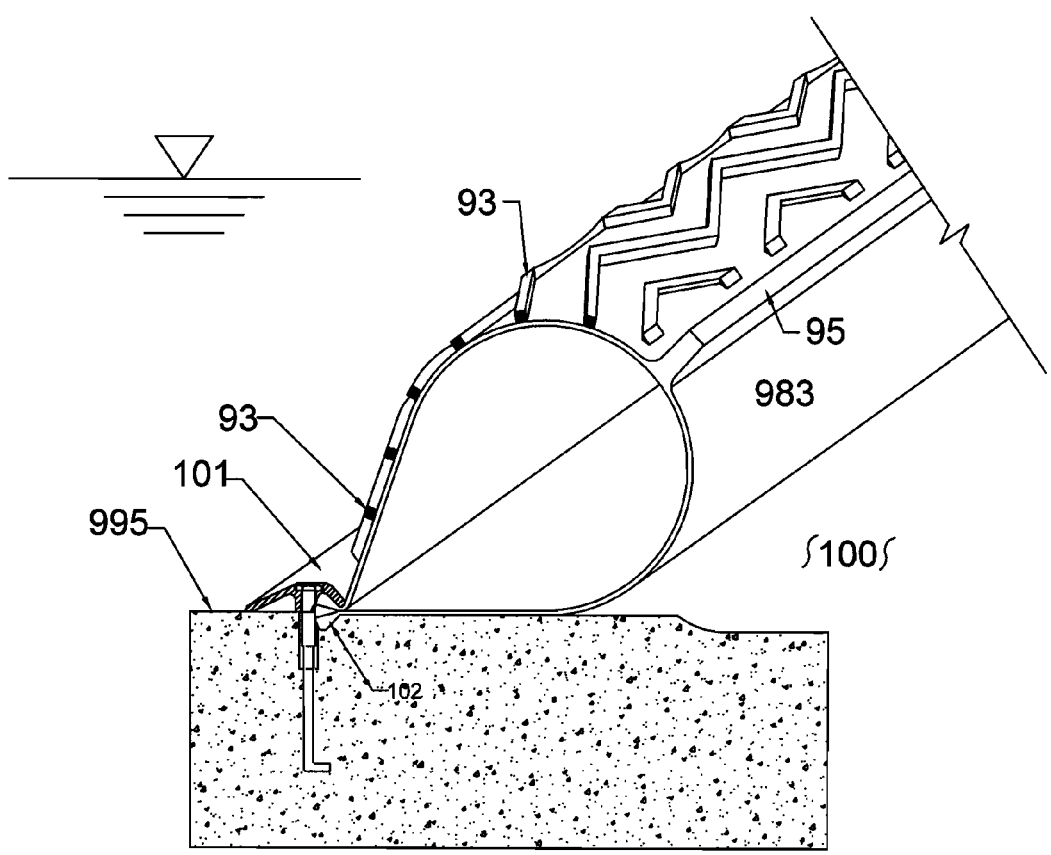

FIG. 115 is a perspective cutaway view of the inflatable dam of FIGS. 112 through 114 illustrating the effect of surface texture features on disbursement of the nappe.

Figure 116:
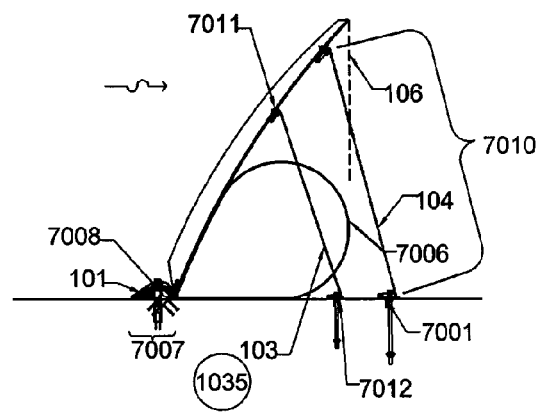

FIG. 116 is a sectional elevation view of one embodiment of the present invention shown in the raised position.

Figure 117:
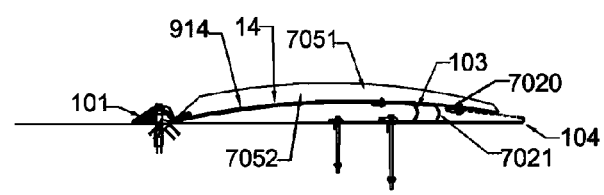

FIG. 117 is a sectional elevation of the embodiment of FIG. 116 shown in the lowered position.

Figure 118:
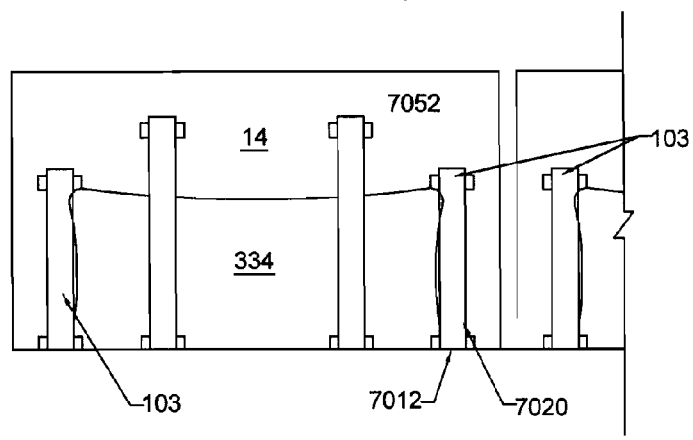

FIG. 118 is an elevation view facing upstream of the embodiment of FIGS. 116 and 117.

Figure 119:
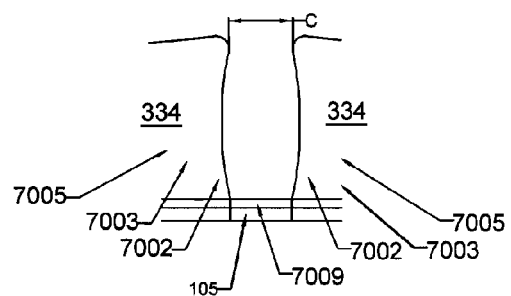

FIG. 119 is a plan view of a portion of the embodiment of FIGS. 116, 117, and 118.

Figure 120:
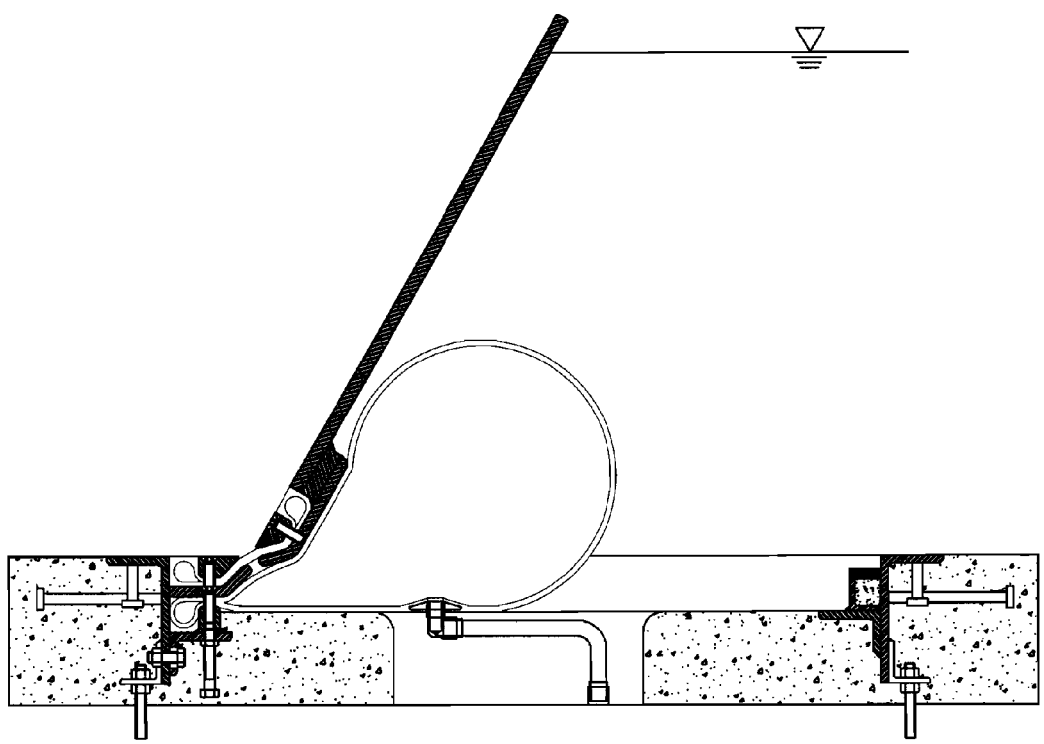
Figure 121:
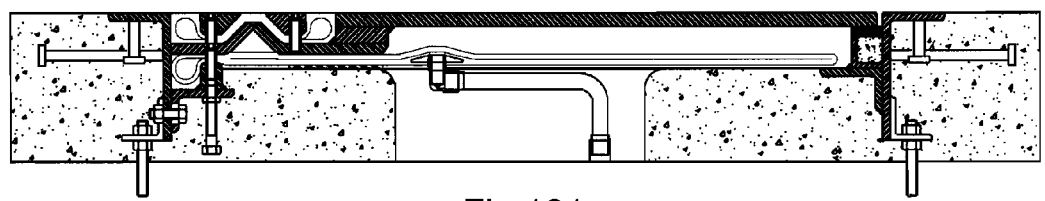

FIGs. 120 and 121 show an impounded water-side overtop trafficable (roadway, e.g.) inflatably actuated water impoundment apparatus. FIG. 120 shows a raised configuration. FIG. 121 shows a lowered configuration.

Figure 122:
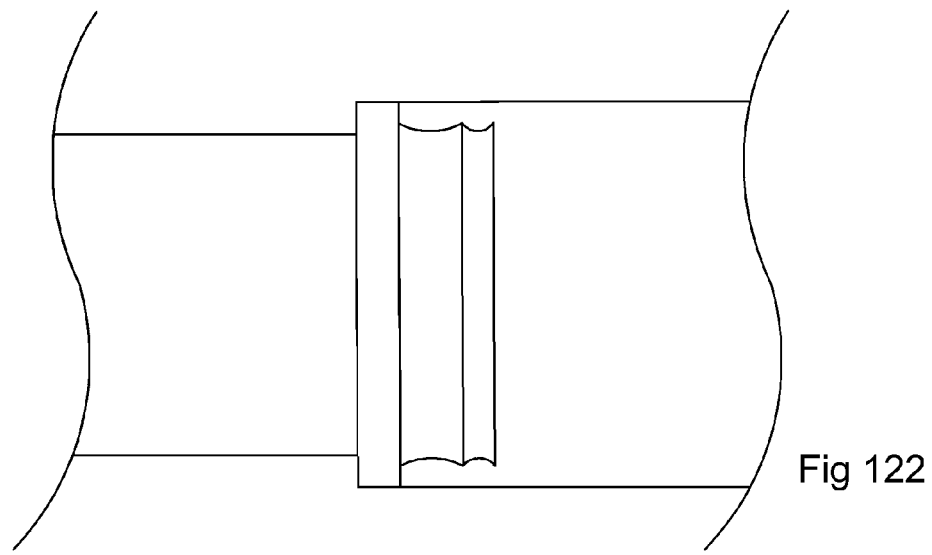
Figure 123:
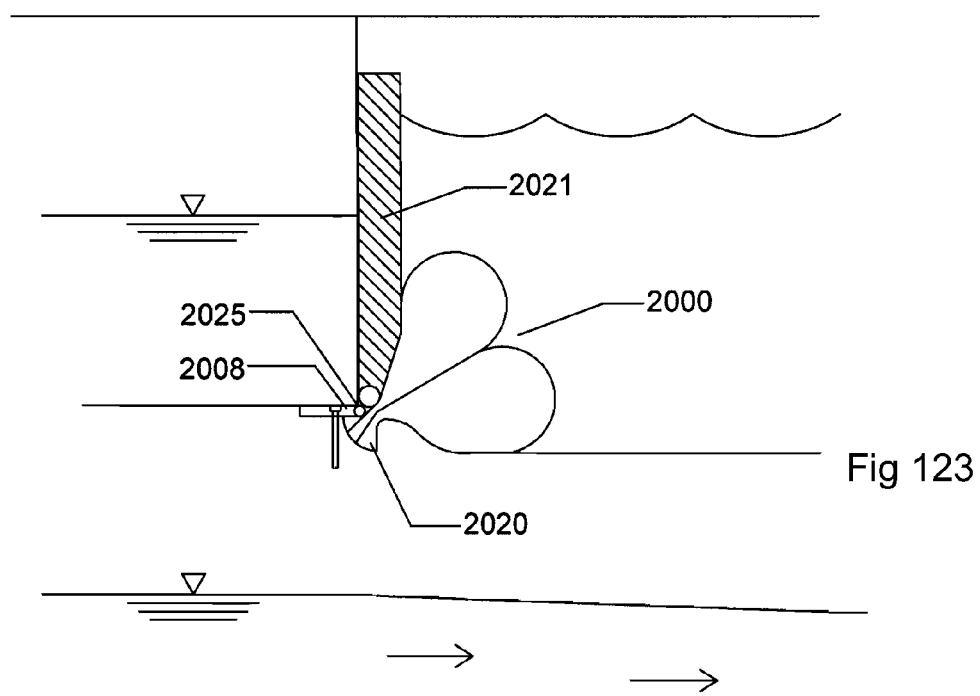
Figure 124:
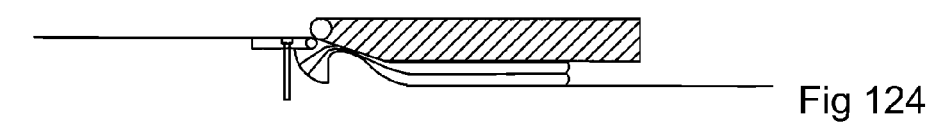

FIGs. 122, 123, and 124 show a sea (or storm) surge inflatably actuated water control apparatus. FIG. 122 shows a plan view. FIG. 123 shows a raised configuration. FIG. 124 shows a lowered configuration.

Figure 125:
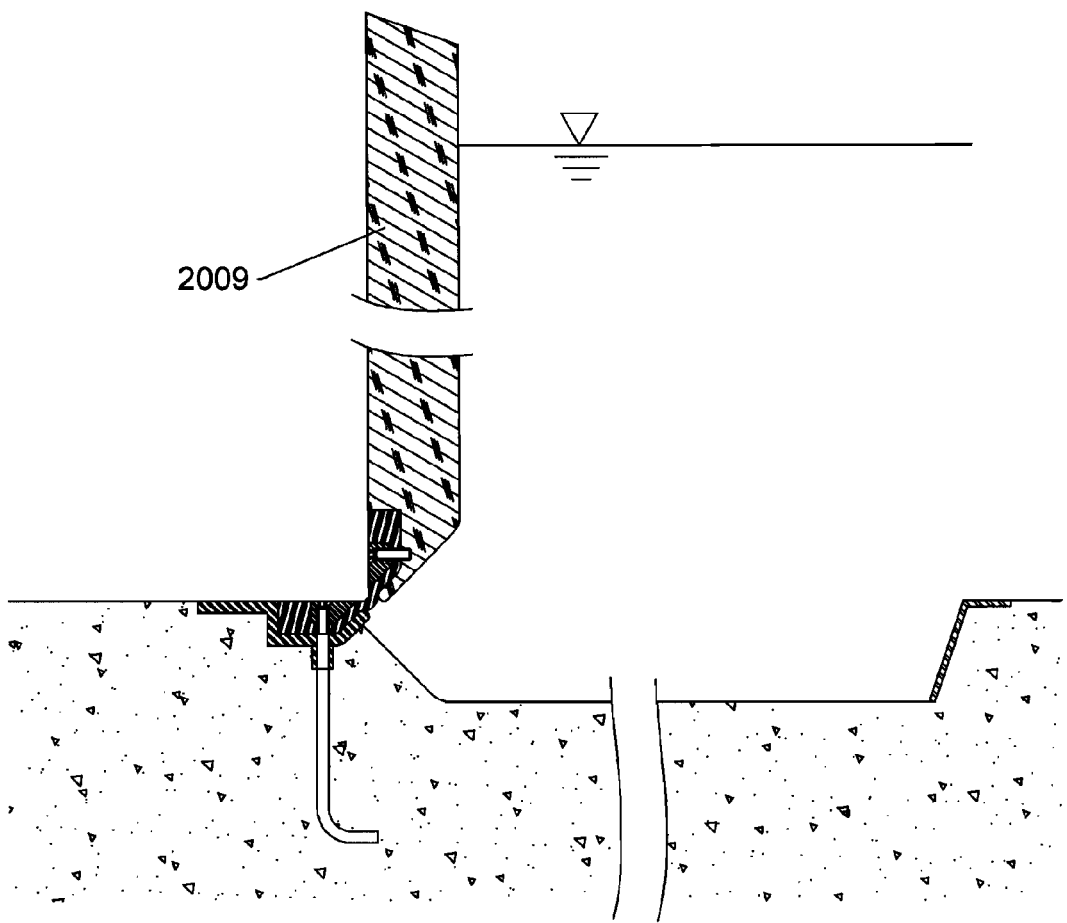
Figure 126:
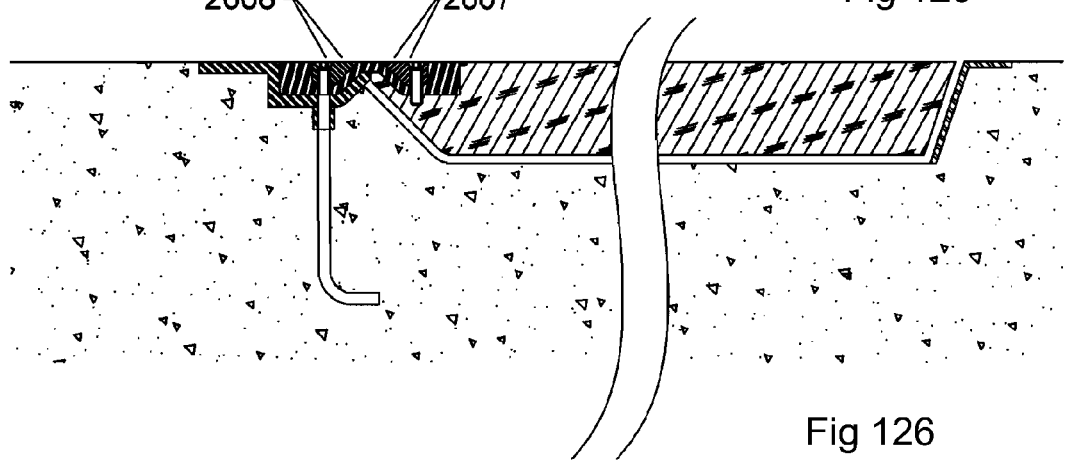

FIGS. 125 and 126 show a floatably raisable overtop trafficable water impoundment element. FIG. 125 shows a raised configuration. FIG. 126 shows a lowered configuration.

Figure 127:
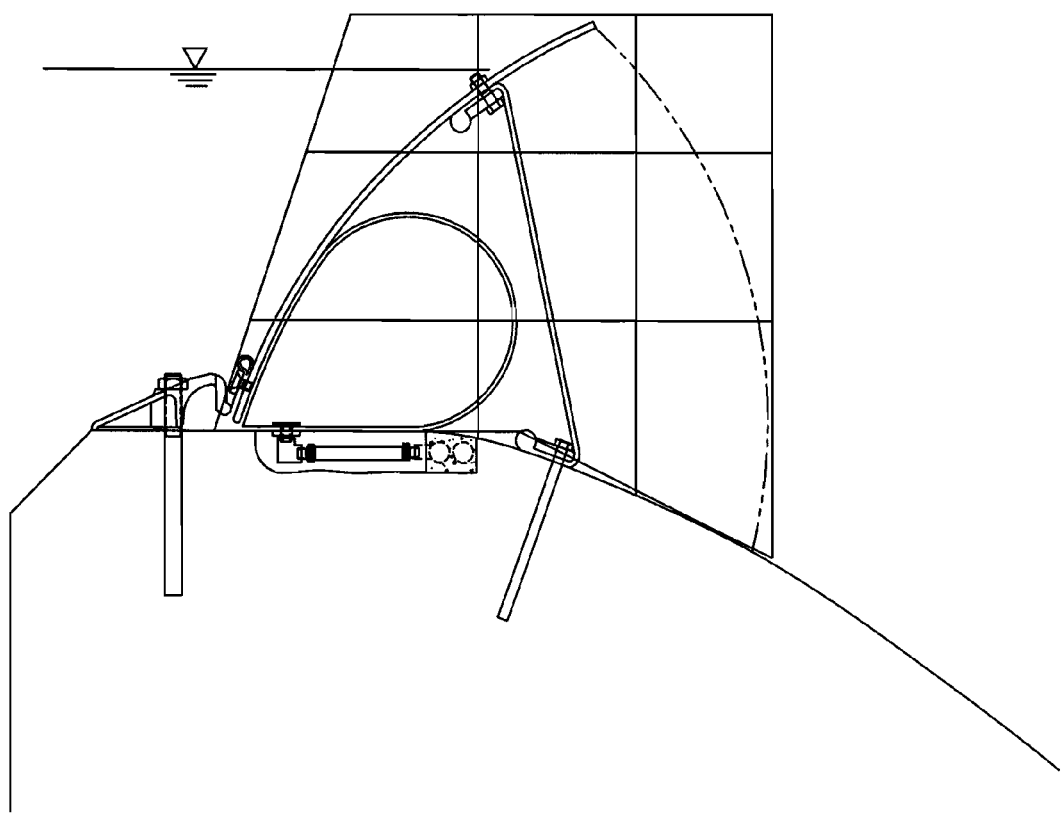

FIG. 127 shows a plurality of abutment plates (in this case a tiled arrangement) in an inflatably actuated spilling water gate panel apparatus (or system).

Figure 128:
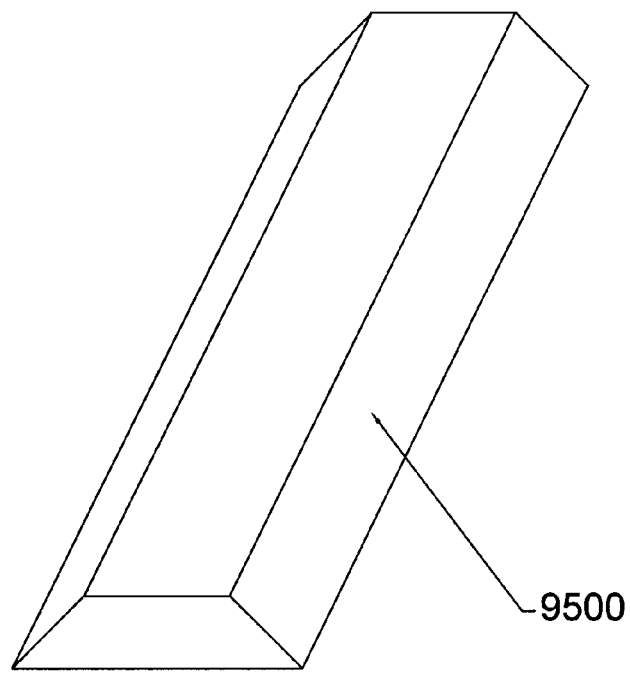
Figure 129:
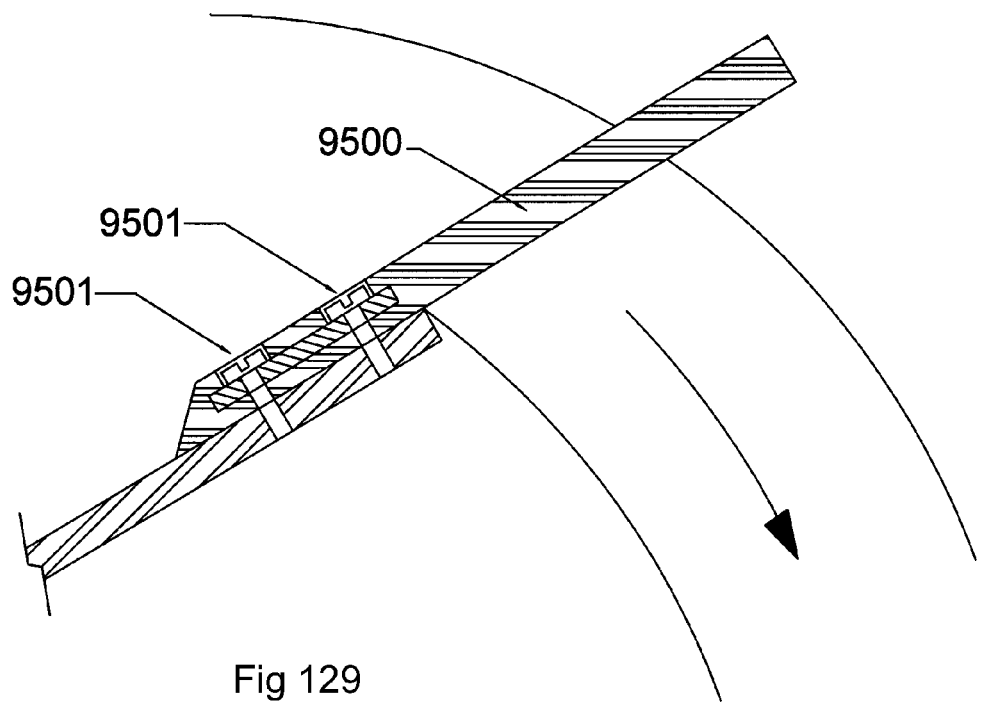

FIGS. 128 and 129 shows a nappe aeration apparatus whose flex is supplied by the material of which the nappe breaker is made. FIG. 128 shows an angled view as unattached. FIG. 129 shows a side view as attached.

Figure 130:
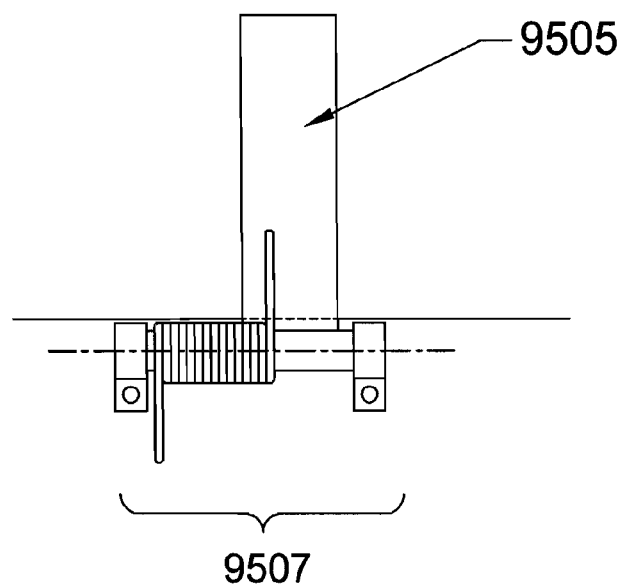
Figure 131:
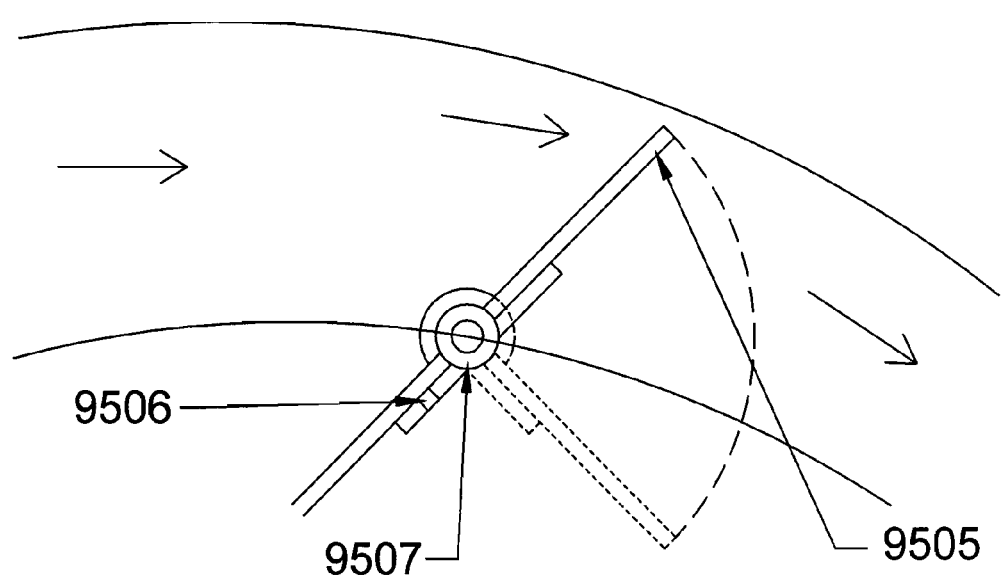

FIGS. 130 and 131 show a nappe aeration apparatus, from the front and side, respectively, whose flex is provided by an impact flexure element.

Figure 132:
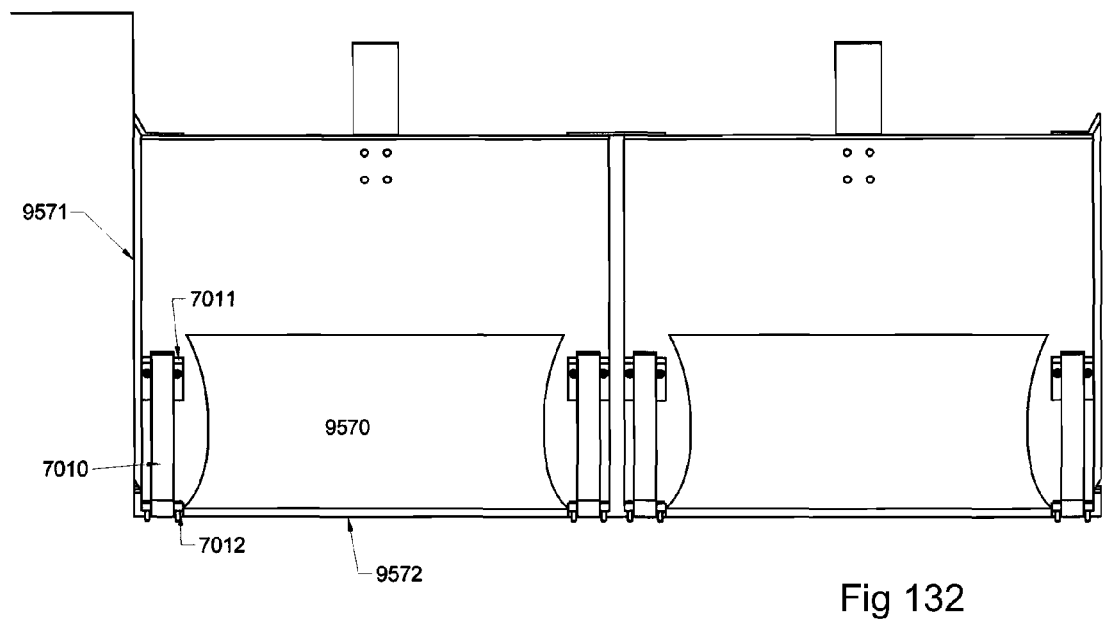
Figure 133:
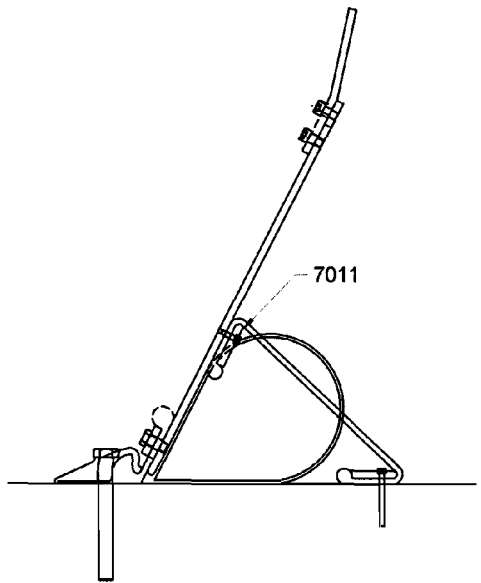

FIGS. 132 and 133 show rear and side views, respectively, of inconspicuous restraining straps located between an inflatable water gate panel actuator apparatus and a proximate foundation (in this case a dam abutment).

Figure 134:
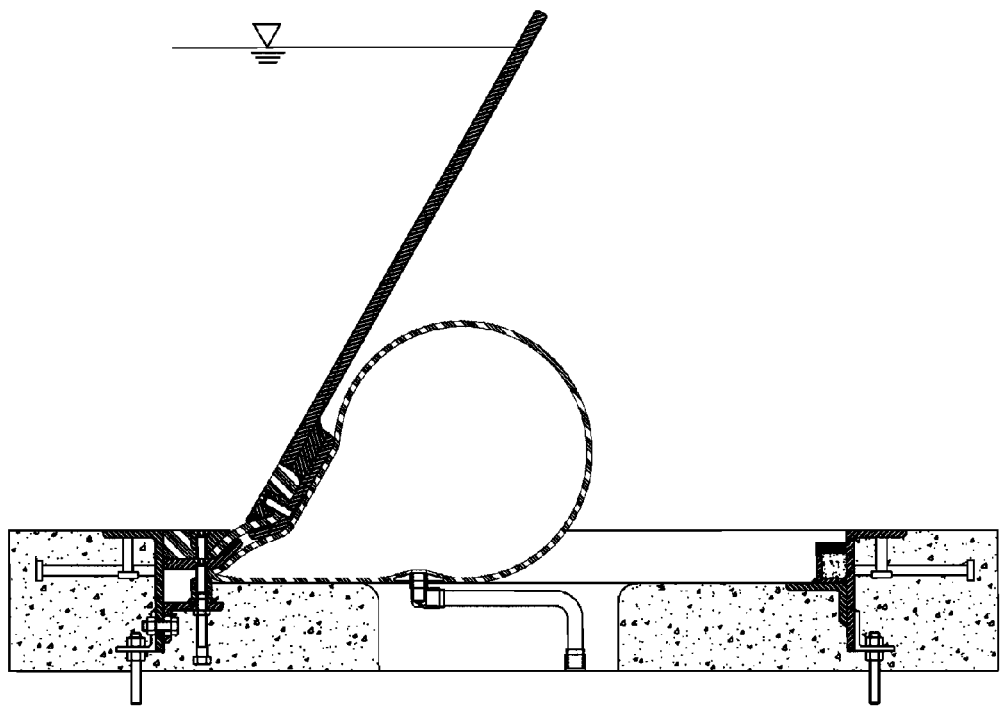
Figure 135:
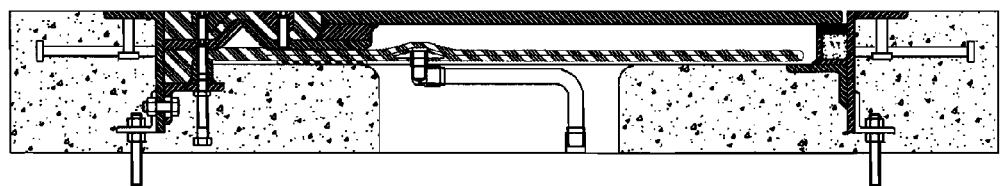
Figure 136:
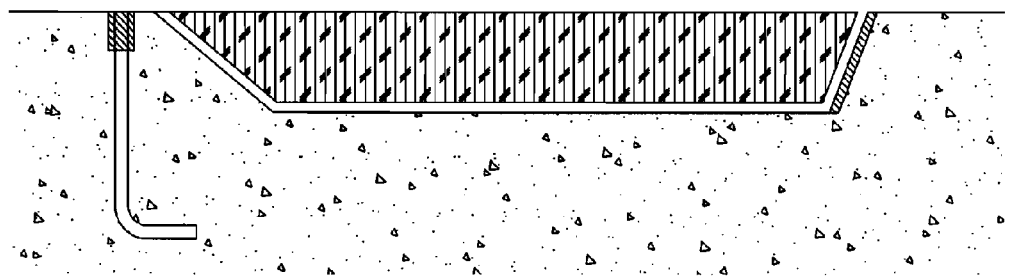

FIGS. 134 and 135 are cross section views of overtop trafficable embodiments of the present invention, showing the gate in the raised position and the lowered position, respectively. FIG. 136 shows a cross section view of a floatably raisable overtop trafficable water impoundment element.

IV. DETAILED DESCRIPTION OF THE PREFERRED EMBODIMENTS

At least one embodiment of the present invention may utilize an inflated bladder stress reduction apparatus such as an extruded profile or insert which may be elastomeric in at least one embodiment and which may remain secured to the interior surface of an inflatable article (a general term used to define any inflatable object, apparatus, structure or product) when the article is inflated. This configuration may eliminate the need to remove or dissolve a profiled tool or mandrel during the manufacturing process (but the insert may indeed be removable (as simply by force, or dissolvable) if such is desired—the fact that the element is termed an insert does not preclude its removal or dissolving from the inflatable apparatus because in all cases it serves as an insert, although when it is dissolved or removed it serves as an insert only temporarily). One face on a tear drop shaped extruded profile, which may be more generally referred to as a substantially elongated, substantially cross-sectionally drop-shaped, deflated bladder fold membrane insert element (which may be as indicated by part (2) in at least one embodiment) or an inflated stress relief insert (2) (or just stress relief insert, or longitudinal insert element) may remain bonded to a part of the interior surface (a part of the inner deflated bladder fold membrane surface) 1005 of the inflatable article, while the curved surface (9) and remaining face (7) (which may be flat) may be prevented from bonding during manufacturing by use of a release film, use of a release agent, or by omission of a bonding agent, as but a few examples. The term elastomeric as used herein and throughout this discussion is defined to have an elastic limit of greater than or equal to 10%, meaning that it has a reversible elongation of at least 10% (or, in other words, a less than 10% elongation will not cause plastic deformation). Relatedly, it is important to understand that the term bladder is intended to include any apparatus that substantially expands (i.e., expands beyond mere de minimus expansion of certain pressurizable but non-expanding articles such as metallic oxygen tank) upon internal pressurization. When an element is limited as elastomeric, it need not be elastomeric in every possible elongation direction, but merely at least one. Indeed, an elastomeric material can include materials that are not elastomeric, as long as the resultant product is elastomeric in at least one direction.

It is important to understand that every reference to a part of a figure (as 2 above) is intended only to indicate but one example of the part or element that the reference seeks to clarify. The reference is not intended to indicate that the referenced part or element is the only shape, size, type or configuration that would suffice to accomplish the desired function but instead is merely intended as an example of a part or element that would adequately perform the desired task or properly serve or function as that element. The substantially elongated, substantially cross-sectionally drop-shaped, deflated bladder fold membrane insert element (2) (or simply inflated stress relief insert element or stress relief insert element) may operate in the capacity of a minimum deflated bladder fold membrane curvature radius increase element. The term drop shaped (in cross-section) is intended to represent a wide variety of shapes, with the only requirement being that one portion is substantially curved while the opposite side of the drop is substantially an intersection of two lines (although that intersection need not be a point). Further, the term drop-shaped is intended to encompass drops that are not symmetric about any cross-sectional axis (in addition to those that are symmetric about one cross-sectional axis). The term substantially elongated is intended to include elements that, either alone or in combination with other similar adjacently positioned elements, are longer than they are cross-sectionally widest, and includes straight and curved elements. It is also important to note that the term element is intended to include not only one of the indicated type of structure or otherwise, but also a plurality of the indicated type of structure or otherwise. For example, the substantially elongated substantially cross-sectionally drop-shaped, deflated bladder fold membrane insert element may be one insert along one edge and a second insert along that edge, the two or more parts together forming the indicated element. This intended use of the term element applies throughout the application.

The deflated bladder fold is one of the possibly plural number of folds that may appear in the inflatable membrane when the inflatable article is deflated. The term is intended to refer to that portion of the inflatable membrane that folds in a deflated configuration and thus exists even in an inflated configuration, referring in that situation to the membrane portion that folds in a deflated configuration. This definitional approach is taken precisely because it is the cross-sectional shape and size of the deflated fold that governs the nature, magnitude and concentration of the stresses that the internally pressurized fluid imparts to the deflated fold membrane in an inflated configuration. Indeed, as one might expect, the smaller the radius of curvature of the deflated fold membrane, the greater the stresses at that membrane in an inflated configuration. Further, given that the deflated fold membrane exhibits perhaps the sharpest of all cross-sectional curves in the deflated configuration, and given that these bends represent the relaxed configuration shape that the pressurized internal fluid must reconfigure and from which the pressurized article must deviate, the deflated fold membrane is typically the most prone to an excessive internal pressure induced failure, one reason for this being that its eventual inflated shape represents the greatest deviation from its relaxed, deflation configuration shape. In at least one embodiment of the invention, a minimum deflated bladder fold membrane curvature radius increase element seeks to prevent or at least delay failure at the inflatable bladder's (or inflatable bladder element's) most vulnerable area—the deflated bladder fold membrane—by increasing the radius of curvature of the deflated fold membrane in its inflated configuration by increasing it in its deflated configuration. Relevantly, one cause of the tight cross sectional deflated bladder curve may be considered to be manufacturing methods that vulcanize the bladder in a deflated, substantially flat configuration that may necessarily (or intentionally) include tight folds, each with a small radius of curvature. Also, in a deflated configuration of at least one embodiment of the invention, the substantially elongated, substantially cross-sectionally drop-shaped, deflated bladder fold membrane insert element 2 may be viewed as a deflated bladder storage facilitation element because it may enable a deflated configuration manufacture of the bladder (that otherwise, without the insert 2, would not be possible because of the unacceptably tight, inflation failure inducing folds) that in turn results in a bladder that relaxes into deflated configuration and assumes a roughly similar, predictable deflated configuration. Further, the substantially elongated, substantially cross-sectionally drop-shaped, deflated bladder fold membrane insert element 2 may act to facilitate storage also in that it allows the expanded profile, deflated bladder fold (in a deflated configuration) to withstand pressures arising from abutting or adjacently stored deflated bladders (as in a coil), or that arise from the placement of any items proximately to the deflated bladder. Without insert 2, (or if the deflated fold membrane has not been positively conformed to have an increased minimum radius of curvature) the storage pressures (e.g., arising from a coil) may cause structural damage to the deflated fold membrane. It is important to realize that some manufacturing processes may create non-linear folds in order to create the desired inflatable article shape.

Again, any figures or description thereof appearing in this application are of at least one embodiment and are not to be read to limit in any way the invention or embodiments thereof or any claims that may appear or elements thereof. Referring now to FIG. 1, a cut-away view of an inflatable article is shown. Inflatable bladder membrane 3 wraps around the substantially elongated, substantially cross-sectionally drop-shaped, deflated bladder fold membrane insert element (which may be an extruded member or extrusion) 2. Air may be supplied through pre-molded shape 1 through hose (or more generally, pressurized fluid conveyer) 4. In at least one embodiment, the insert element 2 may be elastomeric, but other suitable materials (such as polymers, e.g.) are deemed within the ambit of the inventive subject matter.

Referring now to FIG. 2, a cut-away plan view of the inflatable article depicted in FIG. 1 is shown. Inflatable membrane 3 encloses extruded member 2. Extruded member 2 preferably extends around the perimeter of inflatable article 3a. Corner member (or, termed differently, substantially cross-sectionally drop-shaped, deflated bladder corner fold membrane insert element) 1 may act to relieve inflated stresses at the corners. Air or other fluid may be introduced through corner member 1 or by other means such as tubes, hoses or bulkhead type fittings or, alternatively, through an improved fitting hereinafter described.

The substantially elongated, substantially cross-sectionally drop-shaped, deflated bladder fold membrane insert element may be viewed as comprising several parts. Specifically, it may comprise a substantially elongated, smooth cross-sectionally curved, half-cylinder shaped, inner deflated bladder fold membrane surface contactable element (which is that surface part of the insert that can contact the half-circular inner fold membrane in a deflated configuration); two substantially opposing, substantially planar, inner deflated bladder fold adjacent membrane surface contactable elements 1006 that are responsive to the substantially elongated, smooth cross-sectionally curved, half-cylinder shaped, inner deflated bladder fold membrane surface contactable element; an inner deflated bladder fold adjacent membrane surface contactable element intersection vertex element that is responsive to said two substantially opposing, substantially planar, inner deflated bladder fold adjacent membrane surface contactable elements; and a deflated bladder fold membrane insert element body element established internally of each said substantially elongated, smooth cross-sectionally curved, half-cylinder shaped, inner deflated bladder fold membrane surface contactable element, said two substantially opposing, substantially planar, inner deflated bladder fold adjacent membrane surface contactable elements, and said inner deflated bladder fold adjacent membrane surface contactable element intersection vertex element. The substantially elongated, smooth cross-sectionally curved, half-cylinder shaped, inner deflated bladder fold membrane surface contactable element 9 is a part that contacts the inner deflated fold membrane surface and that is half-cylinder shaped (where such cylinder is not restricted merely to circular cross-sections). It also has a smooth cross-sectional curve that the inner deflated bladder fold membrane surface may contact, at least in a deflated configuration. The two substantially opposing, substantially planar, inner deflated bladder fold adjacent membrane surface contactable elements 1006 are each configured to contact a surface(s) of the inner deflated bladder membrane that is adjacent 1008 to the inner deflated fold membrane 1007 (typically these surfaces would run alongside the deflated bladder fold membrane). Even an undulating surface may be substantially planar, as long as all curves are smooth in cross-section (also note that each of the elements is substantially planar—it is not necessarily the case that the two elements are substantially of the same plane). The two elements may be substantially opposing even though their planes are tilted with respect to one another. The inner deflated bladder fold adjacent membrane surface contactable element intersection vertex element is the intersection of the two inner deflated bladder fold adjacent membrane surface contactable elements at a vertex several of which together may be substantially linear (possibly even curved). Note that all surface contactable elements refer to the part of the insert that is located at the surface of the insert. The deflated bladder fold membrane insert element body element may be established internally of the other above-mentioned insert parts. The deflated bladder fold membrane insert element is intended to cover not only the case where there is clearly a structure internal of the surface contactable elements (and the intersection vertex element, which may contact an inner membrane surface or not), but also the case where the required structural rigidity of the insert element is provided by, e.g., strong material surface contactable elements (and the intersection vertex element) of a hollow insert. In such a case, the surface contactable elements would be the very surface of the strong material. The deflated bladder fold membrane insert element body element would, in the case of a hollow insert, be the sub-surface material.

Cross section 3-3 identified in FIG. 2 is shown in FIG. 3. Extruded shape 2 (at majority surficial portion of one of the two substantially opposing, substantially planar, inner deflated bladder fold adjacent membrane surface contactable elements) is bonded (or adhered) along surface 8 to a portion 1005 of inner deflated bladder fold membrane surface 3 (that portion being a deflated bladder fold adjacent membrane surface), but is not bonded along surface 7, nor along the possibly circular arc surface 9. Note that a majority surficial portion of one of the two substantially opposing, substantially planar, inner deflated bladder fold adjacent membrane surface contactable elements may also be adhereable to a deflated bladder fold membrane surface (i.e., the inner membrane of the fold bend itself). Hole 5, more generally a longitudinal spatial void may be used to allow transmission of inflation gas or fluid around the periphery of the inflatable article via a longitudinal spatial void enclosing deflated bladder fold membrane insert element 1009. Thus, the insert element may be a compressed fluid conveyable, longitudinal spatial void enclosing deflated bladder fold membrane insert element. Said gas or fluid may pass from continuous hole 5 out through vent holes 6, or what may be termed a bladder interior-to-longitudinal spatial void fluid conveyance hole that is fluidicly responsive to the longitudinal spatial void that may be found in insert element 1009.

Different types of inflatable articles may have stress relief insert(s) along different numbers and configurations of deflated bladder fold membranes. For example, inflatable bladders of each of the following: fluid conveyance or expansion hose 1010; inflatable elastomeric dam 1011; inflatable jack (a type of apparatus used in elevate an item upon inflation); dock bumper; inflatable water gate panel (perhaps inflatable bottom-hinged water gate panel) actuator apparatus 1012; dunnage bag; and the inflatable seal (some type of apparatus that seals upon inflation) may each have stress relief inserts along two longitudinal, substantially parallel deflated bladder fold membranes, or along four rectangularly situated deflated bladder fold membranes, or along one smooth continuous (a circle, or oval, as but two examples) deflated bladder fold membrane; or along one deflated bladder end fold membrane and two parallel, deflated bladder fold membranes orthogonal to the one end fold membrane, as but a few examples. The inflatable elastomeric dam and the inflatable water gate panel (perhaps inflatable bottom-hinged water gate panel) actuator apparatus may further (in alternate embodiments) have stress relief insert(s) along the following: one overflow orthogonal, longitudinal (meaning having a length) deflated bladder fold membrane; one overflow orthogonal, longitudinal deflated bladder fold membrane and two parallel, overflow aligned deflated bladder end fold membranes. The term overflow orthogonal (or overflow aligned) is defined to indicate an orientation that is orthogonal to (or aligned with) the direction of overflow if it were to occur. An inflatable water gate panel actuator membrane 1013 may be configured to rotate a water gate panel about an upstream leading edge of the gate panel (see FIG. 14) or a downstream leading edge of the gate panel (see FIG. 101).

Referring now to FIGS. 4, 5, 6, and 7, an optional pre-molded elastomeric fitting 1, which adapts an external hose to the internal stress relief profile, is shown.

Referring now to FIG. 8, a cross section of an inflatable article 3a in a deflated condition is shown, illustrating the position of stress relief profile 2 relative to inflatable article 3a.

Referring now to FIG. 9, said inflatable article 3a is shown in the inflated configuration with the stress relief profile 2 secured to the inside of said inflated article.

As for definitions of certain terms the dock bumper element may merely be the expandable portion of the dock bumper; an inflatable seal element may merely be the expandable portion of the inflatable seal; the inflatable jack element (may be smooth perimeter or substantially rectangular, e.g.) may merely be the expandable portion of the inflatable jack.

FIG. 14 is a cross section of a pneumatic spillway gate in accordance with the present invention. Relief groove 23 may be provided to connect air fitting 24 to hollow stress relief extrusion 2. Gate panel 444 may be secured to hinge flap 25 by means of hinge retainer 26.

It is important to understand that the stress relief insert 2 may be removable (such as a removable, deflated bladder fold membrane insert element) as by force or by dissolution (i.e., a dissolvable, deflated bladder fold membrane insert element) after a manufacturing process (such as vulcanization) so that it does not remain in the final inflatable product, but instead is used to positively conform the deflated bladder fold during the manufacturing process (such as vulcanization), with the intent that such shape will be retained after manufacture and the minimum curvature radius of the deflated fold membrane in a deflated configuration will be greater than what it would be without use of a positively conforming insert, and thus the inflated stresses at the deflated fold membrane will be less than what they otherwise would be during inflation. Such a positively conformed inflatable bladder apparatus may be termed a strength enhanced inflatable bladder apparatus and may include at least one positively conformed, inflated stress reduced (or distributed) deflated bladder fold membrane element 1016 that is positively conformed to have an inflated bladder stress reduction significant increase in a minimum curvature radius 1017 and where a deflated bladder fold proximate membrane profile (the profile of the bladder membrane that is near the deflated bladder fold) 1018 exhibits an approximately thirty degree or greater deflation configuration spatial void profile point angle 1020. The deflated bladder fold membrane element 1016 that is positively conformed to have an inflated bladder stress reduction significant increase in a minimum curvature radius 1017 may be positively conformed using a dissolvable or removable insert so that the minimum curvature radius 1017 of the deflated bladder fold membrane 1016 is increased to the point where there is a noticeable or functionally significant increase in the inflation pressure that causes failure at the deflated bladder fold. The bladder structure is such that an increase in the minimum curvature radius of the deflated bladder fold membrane may result in an increase in what is termed the deflation configuration spatial void profile point angle 1020 of the deflated bladder fold proximate membrane profile 1018, and that the use of a removable or dissolvable stress relief insert to positively conform the deflated bladder fold membrane may cause this point angle 1020 to be approximately thirty degrees or greater. Importantly, the strength enhanced inflatable bladder apparatus may be manufactured during a single stage vulcanization. Manufacturing processes related to a positively conformed deflated bladder fold may be termed inflatable bladder failure resistance enhancement methods and may include the step of dissolvedly removing (or simply removing) a longitudinal relief element, which, in order to facilitate dissolution, may be a eutectic salt stress relief element or an aluminum stress relief element, as but two examples. Methods related to the stress relief insert may be termed inflatable bladder failure resistance enhancement methods, regardless of whether the stress relief insert is removed or dissolved. Note that the term inflatable water gate panel actuator element (or inflatable gate panel actuator element) may be used to refer to an inflatable bladder used to actuate water gate panel (s). A water gate panel actuator element (or a gate panel actuator element) refers to any type of actuator (pneumatic, hydraulic, etc.) that actuates water gate panels (which may include overtop trafficable gates in addition to other water control gates such as spillway gates or canal or weir gates).

Referring now to FIG. 10, an inflatable elastomeric dam is shown in the deflated condition. Inflatable elastomeric dam bladder 3 is secured by an inflatable dam-to-foundation attachment element (or inflatable membrane-to-foundation attachment element) that may include a wedge-shaped clamp retention element 1021 (or wedge-shaped inflatable membrane (or bladder)-to-foundation clamp retention element) that may consist of parts 11a, 11b, 11c, 11d, and 11e at upstream end 10) or an attachment element that alternatively may comprise an inflatable membrane-to-foundation clampable retention element (see FIG. 12) 1022 that may be substantially flat and an inflatable membrane-to-foundation clamp retention enhancement element 1023 that may include a comma-type insert 21. Further, a pressurized fluid inlet element 24 may be added to render the item activatable. Insert plies 12 may prevent tearing or leaking if the envelope is inflated with zero or insufficient external clamping force. Fin (or termed differently, inflatable elastomeric dam overtop flow-deflection fin, or an overflow deflection fin) 14 is any protrusion that may divert the overtop flow away from the elastomeric dam and may include a fin insert 15 that is established co-radially (radius of the inflated bladder) and internally of reinforcement layer 16. Note that any reinforcement layer (in any inflatable article) may also be referred to as reinforced bladder ply, or reinforced layer, e.g., and may include a fibrous or fabric material such as kevlar, nylon, polyester, as but a few examples, or any type of twisted cord, wire rope, braided rope, knitted fabric, or woven fabric, each of which may be embedded in or covered with an elastomeric material. Reinforcement 16 of fin 14 increases the strength and stiffness of fin 14. The fin may be established such that a minimum bladder fold membrane curvature radius occurs co-radially and internally of the inflatable elastomeric dam overtop flow deflection fin (indeed, it may be termed an overtop flow deflection fin proximate bladder fold membrane). The inflatable membrane to which the stress relief insert may be attached, or which may be positively conformed to have an increased minimum curvature radius, may be termed a flow deflection fin proximate inner bladder section, and may exhibit not only an approximately thirty degree or greater void profile point angle, but also a substantially circular arc inner bladder curvature 1024 and a rounded, inwardly pointing curvature 1017 (see FIG. 33).

This represents an improvement over those designs that, for example, had such a sharp fold that the deflated bladder fold appeared to have a bracket (}) shape 1025, with extreme stress concentrations arising at the right point of the } 1026. Related methods may be termed inflatable elastomeric dam failure resistance enhancement methods.

FIG. 11 shows the inflatable dam of FIG. 10 in the inflated configuration. Inflatable membrane 3 holds fin insert 15 and stress relief extrusion 2 in position. Clamp 17 holds the inflatable dam to spillway 18. The interior surface of the bladder membrane 3 may be designed to stay within safe stress and strain limits by virtue of lack of stress concentrations which might be present were the deflated membrane 3 not shaped to conform to stress relief insert 2. Recess 22 in foundation or spillway 18 allows the thickened downstream portion of said inflatable dam including inserts 2 and 15 to lie flat against foundation 18 in the deflated configuration.

Referring now to FIG. 12, another embodiment of an inflatable dam, using a simple rectangular clamp 118 in conjunction with "comma" insert 21 and anti-tear reinforcement 12 is shown. The thickened portion of the inflatable membrane 3 containing stress relief shape 2 and fin insert 15 lies within a recess or step in the spillway 22. Nut 20 holds clamp 118 onto anchor bolt 19. The air connection 24 to the inflatable dam may be connected to hollow extrusion 2 by means of a molded groove 23 that provides a clearance space for air between the upper and lower portions of deflated membrane 3. The inflatable dam may be rendered less prone to flow induced vibration damage when deflated by lowering the internal pressure to below atmospheric pressure by means of a vacuum system connected to air supply fitting 24. This causes tight adherence of membrane 3 to insert 2, resulting in a stiffer structure at a location known for damage problems with conventional designs.

FIG. 13 is an inflatable dam similar to that shown in FIG. 12 in the inflated configuration. Insert 21 provides positive engagement to clamp 118. Step 22 can be seen on spillway 118. Said step 22 may allow the inflatable dam to be continuously supported from the underside while a level profile of the upper surface of said inflatable dam may be maintained.

As to manufacturing processes, the term extrudedly manufacturing indicates using a type of extrusion manufacturing process, while the term moldedly manufacturing indicates using a type of mold manufacturing process.

FIG. 15 shows the deflated air bladder (or deflated inflatable water control bladder element) of the spillway gate shown in FIG. 14. Insert member 21 is located upstream of flat portion 28. Holes 29 through flat portion 28 permit assembly with the clamp 118 of FIG. 14. The enlarged portion 27 of the water gate panel hinge flap (or gate pane hinge flap element) 25 may prevent the hinge flap from pulling out from under the hinge retainer 26 of FIG. 14. Circumferentially continuous, integrally adjoined inner bladder layer 12 is an anti-tearing layer and may prevent rupture of inflatable actuator bladder 203 under unclamped or loosely clamped conditions in that, instead of following the path of external bladder layers that perhaps loop 1030 to provide support to the attachment element, anti-tearing layer 12 traverses the abutment joint 1031 between the upper and lower installed configuration bladder layers that form an extended loop to provide support for the attachment element 1032 (which includes, e.g. 21). The circumferentially continuous, integrally adjoined inner bladder layer may comprise a layer 12 that is continuous (i.e., does not form an abutment joint 1031 as it continues on to loop around another part as do layers 1030) along a circumference (which need not be circular) located within a plane that is parallel to a bladder expansion axis (the axis of primary expansion and usually vertical as installed) and whose normal vector is substantially perpendicular to a retained water horizontal force component (the overflow direction). The layer(s) 12 may include an innermost reinforced bladder ply 1033 and/or may be at least one overflow orthogonal (or upstream or downstream), deflated bladder joint traversing ply 1034 (perhaps at least one reinforcement ply, and/or perhaps an overflow orthogonal deflated bladder joint traversing ply, meaning upstream or downstream). The integrally adjoined inner bladder layer may have a longitudinal central axis in an installed configuration (i.e., an installed inflated configuration longitudinal central axis) 1035 that is horizontal and normal to an impending flow direction. The water control bladder element may be adapted for attachment to a water control gate panel bottom edge as installed, which merely means that the water control bladder element can be attached to a water control gate panel edge (that, in an installed configuration, is the bottom edge). Gate panel actuator-to-foundation attachment element 1032 (or inflatable membrane-to-foundation attachment element, or inflatable bladder-to-foundation attachment element) is shown in FIG. 15 as having a gate panel actuator-to-foundation clampable retention element (or perhaps inflatable bladder-to-foundation clampable retention element) 1022, which may be a flat clampable section as shown in FIG. 12, and a gate panel actuator-to-foundation clamp retention enhancement element (or perhaps inflatable bladder-to-foundation clamp retention enhancement element) 1023, which may be a comma-type clamp retention enhancement element 21 in at least one embodiment, but the gate panel actuator-to-foundation attachment element 1032 may also be a wedge-shaped gate panel-to-actuator clamp retention element (or wedge-shaped bladder-to-foundation clamp retention element) 1021 as shown in FIG. 10. As its name suggests, the gate panel actuator-to-foundation attachment element serves to attach the entire water gate panel actuator apparatus to a foundation such as a spillway 18 (1035 of FIG. 116) or roadway foundation, or watercourse foundation, or floodpath foundation, as but a few examples. The gate pane actuator apparatus may further comprise a pressurized fluid inlet element. Together with at least one water gate panel, and perhaps an excessive water gate panel rotation prevention element, the inflatable water gate panel actuator apparatus (which may be bottom hinged) comprises an inflatably actuated water gate panel system.

Inflatable article strength enhancement methods are also considered within the ambit of the inventive technology. One such method may comprise the step of establishing at least one reinforced expandable inner layer (a flexible fiber reinforced elastomeric layer, e.g) 1036 to have a continuously adjoined vertically planar perimeter (another manner of describing the integrally adjoined inner bladder layer) (see e.g., FIG. 15); establishing an inflatable article end section (that may form the end of the longitudinal bladder section); establishing only a portion of at least one reinforced expandable outer layer 1037 (where outer layer is defined as all layers other than the innermost layer) externally of and in direct contact with the reinforced expandable inner layer 1036; establishing a pressurized fluid inlet element 24 to create a fluid travel port through the at least one reinforced expandable inner layer 1036 and the portion of the at least one reinforced expandable outer layer 1037; diverging a remaining portion of the at least one reinforced expandable outer layer 1039 from the at least one reinforced expandable inner layer 1036 along a layer divergence line 1039 (which comports with the above mentioned abutment joint); and establishing an inflatable bladder-to-foundation attachment element 1032 with at least the remaining portion of the at least one reinforced expandable outer layer 1037.

The stress relief insert 2 may be used with or without an air supply hole through the center. The portions of the inflatable envelope which must separate from stress relief insert 2 during inflation may be prevented from bonding during vulcanization by such means as water soluble paper, silicone coated nylon release film or fabric, or by omission of bonding agent, for example.

Referring to FIG. 21, stress relief insert 2 containing hole 5 is bonded at location 8 to release ply 206 which is in turn bonded to inner liner 207. Bonded to inner liner 207 are reinforced plies 208 and 209, followed by outer cover 210. The stress relief insert 2 remains un-bonded except in region 8.

Referring to FIG. 22, the cross section of FIG. 21 is shown in the inflated configuration.

Referring now to FIG. 24, depicting a deflated air bladder of the spillway gate shown in FIG. 25, insert member 21 is located upstream of flat portion 28. Holes 29 through flat portion 28 permit assembly with the clamp 118 of FIG. 25.

The enlarged portion 27 of the hinge flap (or water gate-to-inflatable water gate actuator attachment element) 25 prevents the hinge flap from pulling out from under the hinge retainer 26 of FIG. 25. Holes 5 through extruded shapes 2, 21, and 27 accommodate locating wires used to position said extruded shapes during the assembly phase of the manufacturing process.

Referring now to FIG. 25, a cross section of a pneumatic spillway gate system is depicted, mounted to a dam spillway 18, utilizing an inflatable actuator bladder 203 manufactured in accordance with an aspect of the present invention. Relief groove 23 connects air fitting 24 to hollow stress relief extrusion 2. Gate panel 444 is secured to hinge flap 25 by means of hinge retainer 26. The inflatable actuator bladder 203 is clamped to the dam spillway 18 by clamp 118.

Referring to FIG. 26, section 26 of FIG. 25, shows an air supply groove 23 molded into the interior surface 119 of the inflatable article membrane 3.

FIG. 16 shows an air supply groove 23 molded into inflatable membrane 3 at section 16 of FIG. 14.

Referring to FIGS. 81, 82, and 83, a cross section of an air bladder in accordance with at least one embodiment of the present invention is shown. Clamped portion 861 may be fixed to a dam spillway with a simple rectangular steel clamp bar, for example. The vertical face 865 of air bladder 853 may be molded to conform tightly to said clamp bar throughout the range of motion of hinge flap 862. In this manner the trapping of sand and gravel between said clamp bar and hinge flap 862 may be avoided thus prolonging the life of said air bladder 853. Inflatable cavity 866 may extend upstream to approximately position 866a. Reinforcement may preferably be oriented at approximately 54 degrees and 44 minutes from the axis of the air bladder. With said cord angle there is no significant tendency for said air bladder to either elongate or contract during pressurization. Said reinforcing cord plies are preferably used in pairs of one left hand and one right hand. The inflatable portion of said air bladder preferably has continuous reinforcement, including sufficient overlap at any splices, at approximately the aforementioned angles in both the right hand and left hand orientations around the full circumference of said air bladder. In the configuration depicted, a total of three plies of said reinforcement act together to meet this requirement. Ply 807 serves to reinforce said air bladder in a first direction. Ply 807 simply encircles inflatable cavity 866 and overlaps itself to form a spliced tubular shape. Ply 808 serves to reinforce said air bladder in a second direction. The upper and lower portions of ply 808 may also extend across clamped portion 861, hence around upstream insert 21, hence back downstream across flat clamped portion 861, hence across hinge flap 862, hence around hinge flap insert 27, hence back upstream across hinge flap 862, hence further upstream across clamped portion 861, terminating near insert 21. Plies 807 and 808 together provide for continuous reinforcement around inflatable cavity 866 except for a discontinuity where ply 808 extends upstream under clamped portion 861. Said plies 807 and 808 might sufficiently reinforce inflatable cavity 866 when clamped portion 861 is tightly clamped. In order to provide sufficient reinforcing during unclamped or loosely clamped conditions, ply 860 may be added to provide continuous reinforcement in the same ply direction as ply 808 at the upstream end of inflatable cavity 866. In this manner said air bladder may be safely inflated without being clamped and may not be subject to premature failure due to being loosely clamped to a dam spillway.

FIG. 17 and FIG. 18 show an inflatable hose in accordance with the present invention. Stress relief insert 2 may be used to facilitate manufacture of said hose and may be used to prevent complete collapse of said hose under high external pressure conditions such as during deep sea immersion. Said complete collapse may impart damaging stress to a flat hose of prior art lacking stress relief insert 2. Note that the term inflatable hose is defined to include not only expansion hoses (whose inflatable character allows them to serve as mechanical pressure imparting apparatus), but also fluid conveyance hoses, whose primary function is to convey fluid and as to whom inflation may be merely incidental, but nonetheless does occur (albeit usually not to the extent of, e.g., expansion hoses) and justifies their inclusion as among the group of inflatable hoses. Both types of hoses, and all inflatable articles for that matter, can be termed as pressurizable articles.

The fluid conveyance hose 1010 includes as a part a fluid conveyance element 1042 that serves to directionally and pressurizedly convey the pressurized fluid, a pressurized fluid inlet element; and a discrete (meaning different from the inlet element at a given point in time) pressurized fluid outlet element that allows exit of the conveyed pressurized fluid. The expansion hose (or inflation hose) may comprise an expansion hose element 1042 (that, when sufficiently pressurized, expands the hose to impart external pressure or outer inflatable membrane displacement) and a pressurized fluid inlet element that may also serve as a pressurized fluid outlet element.

Another aspect of the inventive technology is an integral water gate panel hinge flap 1050 (of the inflatable water gate panel actuator apparatus) that is configured to conform tightly to an abutting face 1051 of the inflatable bladder-to-foundation clamp 118 (clamps the clampable retention element 1022 of the inflatable bladder-to-foundation attachment element 1040). Preliminarily, the integral water gate hinge flap is a flap that is integral with the water gate panel actuator apparatus and that serves as an attachment element for the gate panel to the water gate panel actuator apparatus; it may be termed an integral water gate panel hinge flap attachment element. Essentially, the integral water gate panel hinge flap 1050 may comprise an overflow orthogonal, vertical, inflatable bladder-to-foundation clamp face abutting, corner-augmented edge element 1052 which is a edge element that is augmented to have a corner 1053 that abuts an overflow orthogonal (e.g., downstream) vertical face 1051 of an inflatable bladder-to-foundation clamp 118. This edge element may be configured to abut substantially all proximate portions of the overflow orthogonal, vertical inflatable bladder-to-foundation clamp face 1051. An associated method may comprise the step of corner-augmenting an upper edge of the integral water gate panel hinge flap attachment element 1050 to conform to an overflow orthogonal, vertical, inflatable bladder-to-foundation clamp face 1051.

An inflatable article manufacturing method may comprise the steps of establishing a bend resistant deflated bladder fold creation facilitation element 201 (which serves as a firm support around which to bend an elastomeric material layer in order to create a deflated bladder fold) responsive to an inflatable bladder manufacture frame 211; folding at least a portion of at least one elastomeric layer 207 around the bend resistant deflated bladder fold creation facilitation element 201 to create at least one inner-most bladder layer 207 (contact between the facilitation element and the layer is not required); creating an oppositely facing inner most layer 1060 (see FIG. 20); preventing adjoining of the oppositely facing inner-most bladder layer 1060 (as by insertion between the innermost layers of a cotton or other non-adherable sheet 206, as but one example, so that the inflow of pressurized fluid has a cavity to expand); and removing the bend resistant deflated bladder fold creation facilitation element 201 from at least one created elastomeric fold. Note that the term bend resistant indicates a resistance to bending that might occur orthogonally to the length of the bend resistant deflated bladder fold creation facilitation element (as might be caused by the pressure of the manufacturing process (perhaps a manual process) that may seek to tightly bend the elastomeric layer around the bend resistant deflated bladder fold creation facilitation element). To be bend resistant, as defined, the bend resistant deflated bladder fold creation facilitation element need not be able to resist all deflection or displacement associated with bending, but rather only that amount which impairs the integrity and shape of the finished bladder product.

The bend resistant deflated bladder fold creation facilitation element may be a substantially straight, bend resistant deflated bladder fold creation facilitation element 201; it may be a tensionable wire (or cable), bend resistant deflated bladder fold creation facilitation element 201; it may be a tensionable rod, bend resistant deflated bladder fold creation facilitation element 1061; it may be a metal bend resistant deflated bladder fold creation facilitation element 201. The step of tensioning a bend resistant deflated bladder fold creation facilitation element may include the step of tensioning the deflated bladder fold creation facilitation element either manually or automatically. The tensioning may also be accomplished hydraulically (either automatically or not), either alone or in addition to another mode of tension creation. The step of establishing at least two bend resistant deflated bladder fold creation facilitators may comprise the step of establishing at least two parallel bend resistant deflated bladder fold creation facilitators 1062 (see FIG. 28), which step itself may comprise the steps of establishing a substantially elongated, substantially cross-sectionally drop-shaped, deflated bladder fold membrane insert element 2 around at least one of the at least two parallel, bend resistant deflated bladder fold creation facilitation elements 1062; and establishing a bladder-to-foundation clamp retention enhancement insert 1023 (which is any insert that serves to enhance the clamp retention of the bladder to the foundation) around a different at least one of the at least two parallel bend resistant deflated bladder fold creation facilitators 1062. This method may further comprise the step of establishing a panel-to-actuator element clamp retention enhancement insert 1065 (which is any insert that serves to enhance the clamp retention of a water gate panel to its actuator element, which may be inflatable) around a different at least one of said at least two parallel bend resistant deflated bladder fold creation facilitators 1062. The step of establishing at least two parallel bend resistant deflated bladder fold creation facilitators 1062 may comprise the step of establishing at least four rectangularly arranged bend resistant deflated bladder fold creation facilitators 1067 (note that this step does not preclude an addition of steps that create more parallel (or other oriented) bend resistant deflated bladder fold creation facilitators). The general method may further comprise the step of establishing a substantially elongated, substantially cross-sectionally drop-shaped, deflated bladder fold membrane insert element 2 around at least a portion of the bend resistant deflated bladder fold creation facilitation element, which step may be performed before the step of folding at least a portion of at least one elastomeric layer 207 around the bend resistant deflated bladder fold creation facilitation element 201. The general method may further comprise the step of establishing a clamp retention facilitation insert element 1068 (which is any insert that serves to enhance the clamp retention or any element by providing some sort of obstruction that counteracts forces that the clamped part may be subjected to) around at least a portion of the bend resistant deflated bladder fold creation facilitation element 201. This step may be performed before the step of folding at least a portion of at least one elastomeric layer 207 around the bend resistant deflated bladder fold creation facilitation element 201.

Referring to FIG. 19, rigid frame 211 positions wires 201, which are tensioned by tightening element 204. A release ply 206, which bonds to an inner liner 207, is shown secured to wires 201. An opening 212 is left in each of the four corners of release ply 206 to allow the inner liner 207 to bond to itself and form a seal at each corner of the inflatable article. First reinforcement ply 208 is later wrapped around inner liner 207, followed by second reinforcement ply 209, followed by outer cover 210.

Referring now to FIG. 20 stress relief inserts 2 are positioned on wires 201. Inflatable membrane 3 is wrapped tightly around stress relief inserts 2.

Referring now to FIG. 23, wires 201 position release ply 206 which in turn defines a rectangular box shape to which subsequent plies may be added. Note that the release ply 206 does not extend into corner areas 212 so that said corner areas 212 may bond closed and provide a permanent seal during the vulcanization process.

Referring to FIG. 27, edge defining wires 212 may be attached to edge defining wires 201 and may be configured to limit the deflection of edge defining wires 201.

Referring to FIG. 28, support frame 211 positions wires 201 secured by tightening means 204. The set 229 of three parallel wires 201 provide for locating an auxiliary feature such as the hinge flap insert 27 depicted in FIG. 24.

Referring to FIG. 29, a single wire rope 228 may be used to provide location control of all four edges of inflatable article 218. Tightening means (or, perhaps even, tension element) 304, such as an air cylinder, in combination with fixed attachments 214 may be used to keep the wire rope 228 tensioned. Rings 223 may be used to connect the adjacent runs of wire rope 228 at the corners of the inflatable article 218.

Referring to FIG. 30, inflatable article 318 is positioned within mold 314. Grooves 315 in mold 314 may be used to help keep stress relief insert 2 in position in mold after positioning wires 201 (in other figures) are withdrawn from holes 5. Alternatively, a groove similar to groove 315 may be provided on only one side of such a mold. Alternatively a flat tool in more or less continuous contact with the flat surface of inflatable article 318 with a beveled edge may be used.

Referring to FIG. 31, bias ply reinforcement layer 222 is shown in position relative to wires 201 before said reinforcement layer 222 is folded around said wires 201.

Referring to FIG. 32, air fitting 216, such as a standard double ended barbed hose nipple, may be located on tube 217 which is in turn located on wire 201. This may be used to secure the air fitting 216 in its correct position relative to inflatable article 318.

A water impoundment apparatus that may accommodate overtop traffic may comprise an inflatable water impoundment element actuator element 2000 (e.g. an inflatable actuator); an inflatable actuator-to-foundation attachment element 1032 to which the inflatable water impoundment element actuator element is responsive and that comprises a cross-sectionally-enlarged, inflatable actuator-to-foundation clamp retention improvement element 2001 (which may be a wedge-shaped inflatable actuator-to-foundation clamp retention element 1021 or include a circular cross-sectional shaped (such as a comma-type), inflatable actuator-to-foundation clamp retention enhancement element insert 21, as but a few examples); an overtop trafficable water impoundment element 401 (such as a water control gate that when lowered can support overhead traffic of at least one of a variety of types)

responsive to the inflatable water impoundment element actuator element 2000; a flexible fiber reinforced hinge element (which may be an S-type flexible hinge 2002, an integrated figure eight flexible hinge 2003, a modular figure eight flexible hinge 2004, a W-type flexible hinge 2005, and a compression hinge 2006) to which the overtop trafficable water impoundment element is responsive; a hinge-to-impoundment element attachment element 2007 (which is any element that serves to enable attachment of the flexible fiber reinforced hinge to the impoundment element) responsive to the flexible fiber reinforced hinge element; and a hinge-to-foundation attachment element 2008 (which is any element that serves to attach the opposite side of the hinge to the foundation, which may be an abutting roadway, walkway, railway track support, as but a few examples) to which the flexible fiber reinforced hinge element is responsive, wherein an axis of rotation of the overtop trafficable water impoundment element 401 (which may precisely coincide with that of the hinge) is substantially at an overtop trafficable water impoundment element end 2011, and wherein the overtop trafficable water impoundment element 401 has a flush upper trafficable surface 2012 (meaning that the overtop trafficable water impoundment element is not only flush along its trafficed length, but also that its traffic direction orthogonal ends 2013 are flush with the proximate non-impoundment structure surfaces). Note that the attachment element may include a clamp. Flush need not mean entirely without gaps, ridges and/or valleys, but merely that those that may exist are not substantial enough to impair or render unsafe the passage of traffic along that surface. The apparatus may further comprise an elastomeric hinge cover which may substantially surround at least the upper half of the hinge (such as the integrated figure eight flexible hinge). The flexible fiber of the flexible fiber reinforced hinge element may be a flexible fiber selected from the group of flexible fibers consisting of twisted cord, wire rope, braided rope, knitted fabric, woven fabric, twisted cord embedded in an elastomer, wire rope embedded in an elastomer, braided rope embedded in an elastomer, knitted fabric embedded in an elastomer, woven fabric embedded in an elastomer, twisted cord covered with an elastomer, wire rope covered with an elastomer, braided rope covered with an elastomer, knitted fabric covered with an elastomer, and woven fabric covered with an elastomer, each of which may be further covered in or embedded by or layered with an elastomer, as but a few examples. The apparatus may further comprise a surface hinge cover 422 that is pivotally responsive to the overtop trafficable water impoundment element and that may serve to provide a flush surface above the hinge and that may pivot in order to not obstruct rotation of the impoundment element 401. The overtop trafficable water impoundment element 401 may be an overtop vehicularly trafficable water impoundment element 2015 (meaning that it can support vehicular traffic), an overtop pedestrian trafficable water impoundment element (meaning that it can support pedestrian traffic), and an overtop railway trafficable water impoundment element (meaning that it can support railroad traffic). The inflatable water impoundment element actuator element 2000 may be a downflow-side positioned 2017 or an impounded water-side (or upflow) positioned (with respect to the impoundment element) inflatable water impoundment element actuator element (see FIGS. 120 and 121). Further, an excessive impoundment element rotation prevention element, or raised water impoundment element position maintenance element 421 (which acts to prevent undesired excessive rotation of impoundment element) may be at least one stationary excessive rotation obstruction stop (as shown in FIG. 122), which may be any impoundment element rotation obstructing part, perhaps located on foundation parts (such as an abutments) adjacent the impoundment structure in a raised position. In the configuration where the inflatable water impoundment element actuator element is an impounded water-side positioned inflatable water impoundment element actuator element (see FIGS. 120 and 121), the overtop trafficable water impoundment may be a floatable overtop trafficable water impoundment element, or the apparatus may further comprise a floatable water impoundment element actuator element to which the overtop trafficable water impoundment element is floatably responsive (meaning the buoyancy of the floatable actuator element causes the water impoundment element to raise. This floatable water impoundment element actuator element may be established substantially beneath the overtop trafficable water impoundment element and/or it may form a part of the overtop trafficable water impoundment element.

Another water impoundment element apparatus may comprise a floatably raisable overtop trafficable water impoundment element (see FIGS. 125 and 126) (which, e.g., is a water impoundment element such as a gate that can support overhead traffic in a lowered configuration and which can be raised by a floatable element); a flexible fiber reinforced hinge element to which the floatably raisable, overtop trafficable water impoundment element is responsive; a hinge-to-impoundment element attachment element 2007 responsive to the flexible fiber reinforced hinge element; a float element 2009 (which may form a part of overtop trafficable water impoundment element or which may be located externally of the overtop trafficable water impoundment element) and a hinge-to-foundation attachment element 2008 to which the flexible fiber reinforced hinge element is responsive, wherein the floatably raisable, overtop trafficable water impoundment element has a flush upper surface. The axis of rotation of the floatably raisable overtop trafficable water impoundment element (which may coincide precisely with that of the hinge) may be substantially at a water impoundment element end 2010. Further, the floatably raisable, overtop trafficable water impoundment element may be a floatably raisable, overtop vehicularly trafficable water impoundment element, a floatably raisable, overtop pedestrian trafficable water impoundment element, and/or a floatably raisable, overtop railway trafficable water impoundment element. The hinge-to-impoundment element attachment element 2007 may comprise a cross-sectionally enlarged clamp retention improvement element 2001 (which may be a wedge-shaped clamp retention element 1021 or include a circular cross-sectional shaped 21, such as a comma-type clamp retention enhancement element insert 21, as but a few examples). Similarly, the hinge-to-foundation attachment element 2008 may comprise a cross-sectionally enlarged clamp retention improvement element 2001. The flat element may form a part of the overtop trafficable water impoundment element or it may be located externally to it.

Another water impoundment apparatus, one which may be particularly adapted for protection from sea-surge flooding, may comprise an inflatable water impoundment element actuator element (see FIGS. 122 through 124); an inflatable actuator-to-foundation attachment element to which the inflatable water impoundment element actuator element is responsive and that comprises a cross-sectionally-enlarged, inflatable actuator-to-foundation clamp retention improvement element 2020; a water impoundment element 2021 responsive to the inflatable water impoundment element actuator element 2000; a flexible fiber reinforced hinge element to which the water impoundment element 2021 is responsive; a hinge-to-impoundment element attachment element 2007 responsive to the flexible fiber reinforced hinge element and a hinge-to-foundation attachment element 2008 to which the flexible fiber reinforced hinge element 2025 is responsive, wherein an axis of rotation of the water impoundment element (which may coincide precisely with an axis of rotation of the hinge) is substantially at a water impoundment element end. The inflatable water impoundment element actuator element may be a seaward positioned inflatable water impoundment element actuator element, or a riverward positioned inflatable water impoundment element actuator element.

It is important to note that the overtop trafficable gate can be made of numerous and various composite materials such as fiberglass, trusses, resins, and/or concrete with composite resin as but a few examples, in order to reduce weight and road salt effects and to improve strength, e.g.

Referring now to FIG. 36, gate panel 401 may be fixed by hinge means 48 to a fixed frame 406 which may be embedded in roadway 407. Actuator element such as air bladder 333 may support gate panel 401 in the raised position against the pressure of water 492.

Referring now to FIG. 37 a detailed cross section is shown, in the gate-lowered position, of the hinge shown in the gate assembly of FIG. 36. Gate panel 401 may incorporate slots 402 through which cord 45 may pass in a "FIG. 8" pattern, thereby connecting the gate panel 401 to a fixed element 49. Fixed element 49 may have rounded edges so as to not cut cord 45 and may be fixed to embedded frame 406 by mounting bolts 416.

Referring now to FIG. 39, gate panel 401 is filled with concrete 415 and is shown in its lowered position. The outer perimeter of the gate panel 401 may be defined by frame members 413 and 414 as well as corresponding similar members on the ends of the gate panel not shown. Fixed hinge element 409 may be connected to movable hinge element 412 by flexible cords identified in FIG. 41.

Referring now to FIG. 38, gate panel 401 is shown in its raised position. Low friction surface 427 is shown secured to the concrete by anchor assemblies 450. Anchor bolt 416 may secure clamp bar 417, which may in turn secure air bladder 333 by its enlarged end 418.

Referring now to FIGS. 40 and 41, FIG. 40 shows a plan view of a gate assembly hinge; FIG. 41 shows an edge on side view of a gate assembly hinge. Fixed structural member 409 may be connected to movable structural member 442 by means of flexible tensile member 445 which may pass through rounded edge slots 402 in structural members 409 and 442. Upper elastomeric cover 412 may be bonded to structural members 409 and 442 as well as flexible tensile member 445. Flexible tensile member 445 may also be bonded to structural members 409 and 442 except where rolling contact may occur between structural members 409 and 442.

Referring now to FIG. 42, flexible tensile member 445 may be wrapped around tubular members 438 and bonded thereto in the region without rolling action 440 but not bonded to the tubular members 438 in the region of rolling contact 441. Tubular members 438 may be connected to structural members 439 which may in turn be part of or attach to the remainder of the hinged and fixed structures.

Referring now to FIGS. 43 and 44 showing a cross section of a gate assembly in the raised and lowered positions respectively, a gate panel 401 is shown filled with concrete 415 and attached to foundation 426 by anchor bolts 416 holding clamps 437 which may in turn hold hinge flap 436, to which gate panel 401 may be connected. Hinged cover 422 in combination with filler material 423 may be used to provide a smooth surface flush with roadway 407 and gate panel 401.

Referring now to FIGS. 45 and 46, railroad rails 429 are fixed to gate panel 401. Rail segment 430 is pivotably mounted to the foundation by bracket 435. Gate panel 401 is supported against rail loads by deflated air bladder 403 and bearing pads 425. Restraining chain 421 limits the movement of gate panel 401.

Referring to FIGS. 47 and 48, gate panel 401 is shown in its raised position supported by air bladder 3 and restrained by restraining means 421.

Referring to FIG. 49, gate panel 401, in its raised position, is supported by air bladder 333 and attached to embedded frame 406 by hinge 448. Frame 406 is embedded flush with roadway 407.

Referring now to FIGS. 56, 57, 58, 59, 60, 61, and 62, gate panel 401 may be supported by air bladder 333 against side seal 56. Fixed hinge element 61 may retain enlarged edge of air bladder 333 in groove comprising frame 506, groove element 51 and screed 52. Fixed hinge element 61 may be secured to embedded frame 506 by fastening means 55. Seal 56 may be secured to wall 59 by retainer 57 which may in turn be secured by fasteners 58. Connection block-out 54 may be an integral part of the embedded frame shown in FIG. 60. The embedded frame 506 of FIG. 60 may comprise upper edge 560, frame elements, frame element 51, screed 52, and air connection block-out 54. Referring to FIG. 61, an alternate design of enlarged air bladder edge is show in cross-section. Wedges 62 may retain reinforcement layers 63 of air bladder 333.

Referring now to FIG. 110 (gate raised) and FIG. 111 (gate lowered), a drive-over flood control gate in accordance with another embodiment of the present invention is shown. Gate panel 914 may be actuated by air bladder 333. When the gate 914 is in the lowered position, it may transmit traffic loads through air bladder 333 to foundation portion 426. Shims, cut from rubber sheet for example, may be used to facilitate uniform load transfer. In this manner, vibration and noise levels may be minimized while gate cost and weight may be kept at reasonable levels. Hinge element 90 may preferably be manufactured from reinforced rubber materials. Hinge element clamping portions 92, 91, an 914a may preferably be shaped to place the hinge pivot axis as high as possible to minimize tensile stresses in hinge element 90 while providing a flat upper surface which may be safe for pedestrian and vehicular traffic with the gate panel 914 lowered. Seal element may be used to seal the periphery of gate panel 914, thereby minimizing the intrusion of dirt, sand, water, road salt, etc. which might shorten the life or reduce the reliability of the system.

An impounded water control system that involves a movable actuator may comprise a plurality of water gate elements (such as water gate panels) 614a, 614b, 614c; a translatable, water gate actuator element 612 repositionably locatable substantially beneath the plurality of water gate elements; a reposition element (which can be used to relocate the water gate actuator element under different water gate elements) 608 to which the translatable, water gate actuator element 612 is operationally responsive; and a plurality of support elements 607 (which may serve to maintain a raised water gate in a raised position, thus allowing the translatable, water gate actuator element 612 to be relocated beneath another water gate element in order to raise it), each to which at least one individual gate element of the plurality of water gate elements is responsive. The translatable water gate actuator element 612 may comprise two vertically stacked water gate actuator elements 612a, 612b (which may be inflatable) in at least one embodiment. The reposition element 608 may comprise a water gate actuator reposition hose assembly 608 or any other type of system, perhaps including a guide or track for the translatable water gate actuator element, that can be operated to move the translatable water gate actuator element as desired. The plurality of support elements may comprise at least one strut element, which may comprise an upper strut member and a lower strut member pivotally responsive to the upper strut member by a horizontally longitudinal torque tube adjoining at least two adjacent strut elements.

Referring now to FIG. 63, gate panel 614*a* is fixed by hinge means 601 to a spillway 605 and is depicted in its lowered position, which position is required for the efficient passage of flood flows. Gate panel 614*b* is depicted in its raised position in association with an air bladder actuator 612 comprising upper chamber 612*a* and lower chamber 612*b*. Gate panels 614*c* and 614*d* are depicted in their raised positions where they are kept raised by struts 607. The actuator 612 is able to be positioned under any gate panel by means of hose assembly 608. Hose assembly 608 serves as a positioning cable which passes around pulleys 608*b*, 608*c*, 608*d*, and 608*e*. Pulley 608*e* is connected to a drive mechanism 608*f*. Access pit 609 within abutment or pier 611 allows for repair or replacement of actuator 612 away from flows over spillway 605. Although the preferred actuating means is a dual chambered air bladder 612 as shown in FIG. 63, alternative lifting devices such as screw jacks or hydraulic cylinders may be used, if they are configured to be of sufficiently low profile to fit under the lowered gate panels.

Referring now to FIG. 66, a detail of the same arrangement of equipment as FIG. 63 is depicted.

Referring now to FIG. 67, gate panel 614 can be seen to be supported by strut 607, which strut support means is conventional and is by itself not part of the inventive technology. The air bladder 612 comprising chambers 612*a* and 612*b* may be fixed from moving downstream by embed 604, while gate panel 614 may be fixed to the spillway 605 by hinge means 601. Positioning hose 608, which could also be wire rope, or combination of wire rope and hose, may move through conduit 608*a* in a direction opposite to the movement of the actuating means such as air bladder 612.

Referring now to FIG. 68, depicts the same arrangement of equipment as FIG. 68, but with the gate panel 614 in the lowered position.

Referring now to FIG. 69, another embodiment of the present invention is shown wherein gate panel 614*e* is held in its raised position by strut means comprised of elements 607*d*, 607*g*, and 607*f*.

Referring now to FIG. 71, the embodiment of FIG. 69 is shown with an actuating air bladder 612 in its inflated configuration.

Referring now to FIG. 70, the gate panel of FIG. 69, is shown in its lowered position where its top surface is flush with the top edges of foundation. This flush surface can provide a roadway, walkway, or railroad bed surface which may render this configuration eminently suitable for use as a floodwater barrier in lieu of permanent immovable concrete flood walls or earthen levees. The strut means depicted comprises upper elements 607*d* coordinated by torque tube 607*g* and pivotably connected to lower elements 607*f*. Although two support points are shown for gate panels 614*f*, 614*g* and 614*h*, lesser or greater numbers of support points may be used as economics and engineering considerations dictate.

Referring now to FIG. 72, the embodiment of FIG. 70 is shown with air bladder 612 in its deflated configuration.

Referring now to FIGS. 73 and 74, the embodiment of FIGS. 69, 70, 71, and 72 is again shown from downstream (the flood protected side) and upstream (the flooded side) respectively. Gate panel 614*f* is shown lowered. Gate panel 614*g* is shown raised with an actuating air bladder 612 beneath. Gate panels 614*h* and 614*i* are shown raised and supported by strut assemblies 607. The folding of upper strut members 607*d* relative to lower strut members 607*f* may be coordinated by torque tube 607*g*.

Another water control apparatus may involve concrete gate panels and may comprise a concrete water control gate panel body element 401; a slide friction reduced actuator-side water control gate panel surface element 3001 (a smoothed concrete surface or a polyethylene surface, e.g., to reduce sliding friction with an actuator such as, e.g., a water gate panel actuator bladder) responsive to said concrete water control gate panel body element; and a horizontal axis rotation hinge-to-water gate panel attachment element 2007 (that allows attachment of the concrete gate panel to a horizontal axis rotation hinge) fixedly positioned at an overflow orthogonal installed water gate panel bottom edge and to which said concrete water control gate panel body element is responsive. The slide friction reduced actuator-side water control gate panel surface element may be a downstream installed water control gate panel surface element. The apparatus may further comprise an elastomeric horizontal axis rotation hinge element. The horizontal axis rotation hinge-to-water gate panel attachment element may comprise a concrete water control gate panel body encased attachment element. The concrete water control gate panel body element may be a fiber or rebar or post-tensioned rod reinforced concrete water control gate panel body element. An associated method may involve the step of creating a concrete water control gate panel body element 401, establishing a slide friction reduced, actuator-side water control gate panel surface element 2007; and establishing a horizontal axis rotation hinge-to-water gate panel attachment element 3002, each of which may be performed at a concrete water gate panel installation site (thus obviating transportion of a heavy, bulky item).

The generally preferred material for certain gate panels 14 may be reinforced concrete, however, steel, fiberglass, or other construction may be preferred for certain projects. The use of reinforced concrete may allow for simple field (on-site) fabrication of large gate panels that might be difficult to transport if they were manufactured at another location. The preferred method of casting the concrete panels may be to insert concrete form pieces into the foundation to form the underside of gate panel, and then place the concrete with any necessary reinforcement, embedding movable hinge element into the gate panel, while fixing wire rope to hinge tube.

Referring now to FIGS. 75, 76, 77, and 78, an automatic tripping system is shown. Strut 707*h*, which may be tubular, supports gate panel 714 against the pressure of upstream water. The lower end of strut 707*h* is supported against a step in spillway 705 by rocking shoe 707*k*. Rocking shoe 707*k* is connected to a paddle 707*j* by connecting rod 707*i*. High water acting on paddle 707*j* acts to pull connecting rod 707*i* and rotate rocking shoe 7*k* toward a horizontal position, thereby releasing strut 707*h* and causing gate panel 714 to lower. In this manner multiple gate panels may be automatically lowered to protect against upstream flooding. Actuators with spillway 705 could optionally be used to force rocking shoes 707*k* to their horizontal positions, thereby lowering gate panels 714 by remote control.

Referring now to FIGS. 84 through 92, an improved air fitting (or more generally, a pressurized fluid inlet element) 965 in accordance with one aspect of the present invention is shown. Air fitting 965 lacks damaging or damageable protrusions. Said fitting 965 may preferably be located between reinforcing plies 806, 807, and 808 within the lower membrane of an inflatable air bladder as herein disclosed.

Said air fitting 965 may preferably be generally disk shaped and may feature a connection means such as pipe threads 865*b* at a centrally located through-hole.

Said air fitting 965 may feature a tapered profile 965*c* which may limit undesirable changes in direction of reinforcing fabric plies 806, 807 and 808. Excessive changes in direction of reinforcing fabric might otherwise cause de-lamination of the layers of said reinforcing from each other or dis-bonding of said reinforcing from the embedded air fitting 965.

Said air fitting 965 may feature a rounded outer edge 965*a* which may prevent said fitting from cutting aforementioned reinforcing fabric.

The radius R of said rounded outer edges may be sufficiently small, 0.0625 inches for example, such that the formation of voids at location 965*d* in the elastomer and the direct contact of reinforcing cords with said air fitting 965 may be avoided.

Air fitting 965 may be comprised of or coated with a material which bonds to the elastomeric body of said inflatable bladder during vulcanization.

Air fitting (or more generally, pressurized fluid inlet apparatus) 965 may comprise a pressurized fluid conveyer engagement element 3050 (which element can engage in some manner a pressurized fluid conveyer such as a hose or pipe); a thickness enhanced interior edge element 3051 (which element is an interior edge portion of the apparatus that is thicker than the remaining portion of the apparatus); a thickness reduced, exterior edge element 3052 (which is the radially exterior edge portion that is thinner than the thickness enhanced interior edge element) that is installed configuration contactable with an inflatable membrane separation curve 3053 proximate membrane 3054 (which is the inflatable membrane(s) that separates at the outer edge of the apparatus when the contact-adjacent layers diverge to pass around the apparatus); and a thickness varying body element 3055 located between said thickness enhanced interior edge element and said thickness reduced exterior edge element (which element forms the body of the apparatus and connects the exterior edge element to the interior edge element 3052 of the apparatus. The thickness enhanced interior edge element 3051 may be a thickness enhanced, pressurized fluid conveyer engagement element proximate, interior edge element 3057 in the case where the pressurized fluid conveyer engagement element 3050 is located at or near the center of the apparatus (as is the case if the pressurized fluid conveyer engagement element 3050 is a threaded engagement element 3060). The pressurized fluid inlet apparatus 3061 may also operate as a pressurized fluid outlet apparatus. The thickness reduced exterior edge element may be substantially circular (a descriptive term that applies even if there are notches 3062 in the exterior edge element). Further, the thickness reduced exterior edge element may be externally rounded 3064 to have an exterior edge radius of curvature 3065 that is sufficiently small to preclude void formation at the inflatable membrane separation curve 3053 (e.g., the radius of curvature may be approximately 0.0625 inches. The thickness reduced exterior edge element may also be rectangular (a descriptive term that includes square) in plan view. The thickness varying body element need not contact the interior edge element and/or the exterior edge element in order to be between the two and may have a frustral (truncated conical) internal (meaning closer to the inflatable cavity of the bladder) inflatable membrane contacting edge 3058 and an oppositely facing planar (substantially flat), annular, external inflatable membrane contacting edge 3059 (meaning this edge is towards the external atmosphere). Importantly, it is the above-mentioned shape of the apparatus that enables it to be positioned between contact-adjacent layers of an inflatable article, thereby resulting in a pressurized fluid inlet apparatus that is recessed from the outer surface of the inflatable article and that consequently can not be damaged by (nor damage) external parts over which, e.g., the bladder may slide.

Related methods are also included in the ambit of the inventive technology. One such method of conveying pressurized fluid to and from an inflatable article comprises the steps of: dimensioning (e.g., shaping as, e.g., by molding) a pressurized fluid inlet element 3061 having a pressurized fluid inlet element hole 3070; establishing the pressurized fluid inlet element 3061 between two contact-adjacent (meaning side-by-side and touching in sections) inflatable article layers (or inflatable membrane layers) 3071; and establishing an inflatable article layers hole co-axial with the pressurized fluid inlet element hole. The layers may be elastomeric or reinforced elastomeric layers; the inflatable article layers hole may thus be an elastomeric inflatable layers hole.

An abutment plate apparatus (or water gate panel slide friction abatement apparatus) may comprise a polymeric plate element 4000 dimensioned to contact a planar abutment seal face (which may be vertical, e.g.) 4001 throughout a possible water gate position edge sweep 4002 (a range of possible contact motion); and a plate-to-foundation surface attachment element 4020 (such as fastener holes 4004). The polymeric plate element 4000 may be a polyethylene plate element (ultra-high molecular weight polyethylene plate element and/or high density polyethylene plate element); may be a dark colored polymeric plate element 4008 (for thermal heating benefits); may be a high density polymeric plate element and/or an ultra-high molecular weight polymeric plate element); and may be a reinforced polymeric plate element (such as fiberglass) as but a few examples.

Referring now to FIGS. 93, 94, 95, 96, 97, and 98, an abutment plate 966 of UHMW polyethylene and its associated anchor system is shown. Said abutment plate 966 may feature low thermal conductivity, low ice adhesion, and a low coefficient of friction against the associated gate panel seals. Hole spacing dimensions X (of horizontally aligned fastener holes), and Y (of vertically aligned fastener holes) relative to thickness T may preferably be kept below 20 to 1, or 12 to 1, and preferably at 8 to 1. The horizontal or vertical fastener hole separation distances divided by a polymeric plate element thickness (or the related horizontal fastener hole separation distance to plate thickness ratio and the vertical fastener hole separation distance to plate thickness ratio) may be less than approximately 20 (or less than approximately 20:1 expressed as a ratio), less than approximately 12 (or less than approximately 12:1 expressed as a ratio), or approximately equal to eight (or approximately 8:1 expressed as a ratio). A related index, the average, nearest fastener hole separation distance (measure of the average of the nearest fastener hole separation distances) divided by the thickness of the polymeric plate element (or the related average nearest fastener hole separation distance to plate thickness ratio) may be less than approximately 20 (or less than approximately 20:1 expressed as a ratio), less than approximately 12 (or less than approximately 20:1 expressed as a ratio), or approximately equal to eight (or approximately 8:1 expressed as a ratio). Of course, to determine the average, nearest fastener hole separation distance, all nearest fastener hole separation distances are measured and an average is calculated from the total. The method may further comprise the step of recessing edges of fastener holes in order to retain a plate element surface flush, low thermal conductivity material, fastener recession filler.

All fastener holes 4004 may have recessed fastener hole edges 4005 in order to accommodate a plate element surface flush, low thermal conductivity material, fastener recession filler, which may be, e.g., a plate element surface flush polyethylene, fastener recession filler. Plate element surface flush means that the filler material, as installed, will be level and flush with the abutment plate surface. The polymeric plate element may comprise a thermal plate buckling effect mitigative significant number of fastener holes (which is that number of fastener holes separated by only approximately even distances that is sufficient to prevent an operation impairing thermal plate buckling under expected operational environment conditions). The polymeric plate element may have a thermal plate buckling effect mitigative thickness (which is the thickness that is sufficient to prevent an operation impairing thermal plate buckling under expected operational environment conditions). The actual thickness dimension depends on whether the plate is attached through use of a thermal plate buckling effect mitigative significant number of fastener holes. Possible thickness dimensions may be approximately 15 mm and approximately 25, but others dimensions are also possible.

The polymeric plate element may be a unitary polymeric plate 4008 (i.e., one plate element) or may be a plurality of polymeric plates, at least two of which may be adapted for separation in an installed configuration by a sealant accommodating groove 4010. Anchoring may preferably be by means of countersunk bolts which may engage threaded concrete anchors 968. Bolts 967 may preferably be covered with a removable low thermal conductivity material such as polyethylene plugs or auto-body filler after installation.

Related water gate slide friction abatement method may comprise the steps of dimensioning a polymeric material to form a substantially planar polymeric plate element 4000 able to contact an abutment seal face 4015 throughout a possible water gate edge sweep 4002; and establishing a plate-to-foundation surface attachment element 4020 to which said substantially planar polymeric plate element 4000 is responsive. The polymeric material may be dark-colored, ultra high molecular weight, high density, polyethylene, or reinforced, e.g. The polyethylene material may be dark-colored, ultra high molecular weight, high density, or reinforced, e.g. Reinforcement may be by fiberglass, e.g. Other steps include establishing a plurality of fastener holes separated by an average, nearest fastener hole separation distance.

One embodiment of the interpanel seal (or more generally, impounded water leakage prevention apparatus) 73 may comprise an interpanel seal-to-foundation clamp retention enhancement element 5001; an interpanel seal-to-foundation clampable retention element 5002 responsive to said interpanel seal-to-foundation clamp retention enhancement element 5001; an upper, overflow orthogonal water gate panel edge conforming water seal hinge element 5003 responsive to said interpanel seal-to-foundation clampable retention element 5002; and an interpanel seal element 5004 fixedly attachable to a first edge proximate portion 5006 of a first water gate panel 5007 and a second edge proximate portion 5008 of a second water gate panel 5009, wherein said first edge proximate portion 5006 of said first water gate panel 5007 is situated adjacent to said second edge proximate portion 5008 of said second water gate panel 5009 and said first water gate panel 5007 is situated adjacent to said second water gate panel 5009. As is the case with all clamp retention enhancement elements, the interpanel seal-to-foundation clamp retention enhancement element 5002 may be an expanded cross-sectional area part 5010 (maybe having a comma-shaped insert 5011) that serves to enhance the clamp action by providing an obstruction to movement of the clamped surface (of course, the interpanel seal-to-foundation clamp retention enhancement element 5001, as well as the interpanel seal-to-foundation clampable retention element 5002 operate to attach the interpanel seal 73 to the foundation 5012, which may be, e.g., a dam spillway surface). The upper, overflow orthogonal water gate panel edge conforming water seal hinge element 5003 is the part of the apparatus that acts as the hinge and conforms to the overflow orthogonal (upstream, e.g.) water gate panel edge 5016 that, in an installed configuration, is the upper of the two upstream, e.g., water gate panel edges 5017. The interpanel seal element fixedly attachable to a first edge proximate portion 5006 of a first water gate panel 5007 and a second edge proximate portion 5008 of a second water gate panel 5009 is the part that accomplishes most of the sealing between two adjacent (in an installed configuration) water gate panels (the first and the second water gate panel). The edge proximate portion of the water gate panels are those portions of the water gate panels that are near the edges of different water gate panels that are adjacent one another in an installed configuration. Note that the interpanel seal element may be a substantially elongated interpanel seal element (meaning it has a length).

The profile(s) (cross sectional shape and size) of interpanel seal attachment elements may be approximately the same as the profiles of adjacent (or installed-configuration-adjacent) attachment elements (such as the installed-configuration-adjacent inflatable water gate actuator-to-foundation clamp retention enhancement element (see FIG. 100), or the installed-configuration-adjacent water gate actuator-to-foundation clampable retention element (see FIG. 100). Further, parts may be dimensioned to fit compression seal-tight against adjacent impounded water seal elements (see FIG. 100) upon installation, meaning that an interference fit is created by sizing the parts so that their abutting edges compress against one another during installation. The term compression seal tight can also mean applying enough clamping pressure so that the clampable retention element 5002 below the clamp 5020 expands to tightly fit against an abutting installed clamp retention element. An overflow orthogonal, water gate actuator hinge flap element adjacent portion of the interpanel seal element 5004 (that portion of the interpanel seal element that is adjacent the water gate actuator hinge flap element in an installed configuration) may be dimensioned to fit compression seal tight against an installed-configuration-adjacent inflatable water gate actuator hinge flap element. The foundation may be a spillway, e.g., and thus the interpanel seal-to-foundation clampable retention element 5002 may be an interpanel seal-to-spillway clampable retention element 5002. The upper, overflow orthogonal water gate panel edge conforming water seal hinge element 5003 may comprise an overflow orthogonal, vertical, interpanel seal-to-foundation clamp face abutting, corner-augmented edge element 5050, which is an edge of the hinge element that is augmented so as to form a corner 5051 that, in an installed configuration, abuts an overflow orthogonal (downstream, e.g.) vertical face 1051 of an interpanel seal-to-foundation clamp 5020. Ideally, this edge element will be configured to abut substantially all proximate portions of the overflow orthogonal, interpanel seal to foundation clamp face 1051 so as to effectively exclude seal and clamp operation compromising sand and other flow entrained particles and debris. A related method may include the step of corner augmenting (adding, e.g., elastomeric material to form a corner) an upper overflow orthogonal edge of the interpanel seal hinge element to conform to an overflow orthogonal, vertical interpanel seal-to-foundation clamp face edge.

The interpanel seal element 5004 may project beyond a gate panel downstream limit to form a nappe breaker 5053 (which serves to aerate any nappe that might form, thus avoiding the negative effects of oscillating nappes). This nappe break element may be an overtop flow mode dynamic object impact flexible nappe breaker (see FIG. 99) and may be, e.g., a reinforced elastomeric nappe breaker. The term overtop flow mode dynamic object impact flexible nappe breaker means that a nappe break element is made sufficiently flexible so as to absorb and flex without failure or substantial plastic deformation impacts from dynamic objects that one would expect to find flowing in an overtop flow.

Rubber rafts and other small water craft (with and without passengers) are also possible items that one might expect to find flowing with an overtop flow. Here, the concern is for the safety of the passengers, and a sufficiently flexible nappe breaker (or one responsive to an impact flexure element) will flex when struck by a rubber raft instead of puncturing or cutting it as many conventional nappe breakers will. A related method may involve installation projecting (resulting in projection upon installation) the substantially elongated interpanel seal element beyond a gate panel downstream limit to create a nappe break element.

Referring now to FIGS. 99 and 100, a dam spillway gate installation in accordance with one aspect of the present invention is shown in perspective view and exploded view respectively. Inter-panel seal 73 (a type of impounded water leakage prevention apparatus) may have the same profile under clamp bar 76 (the interpanel seal-to-foundation clampable retention element 5002) as does air bladder clampable retention element (the inflatable water gate actuator-to-foundation clampable retention element). The adjoining faces of air bladder 903 and inter-panel seal 73 as well as the adjoining faces of air bladder 903 and abutment seal 75 and the adjoining faces of abutment plate 966 and abutment seal 75 may preferably be shaped to fit tightly, perhaps with a slight interference fit, during installation. In this manner the subsequent application of clamping force from clamp bar 76 may cause the aforementioned adjoining elements to expand tightly against each other in a horizontal direction, thereby creating tightly sealed joints. The sealing of said joints may be supplemented by the use of thin flexible waterproof sheets (or thin waterproof seal supplement sheets) 70 and 74.

Referring now to FIG. 101, a cross section of inter-panel seal 73 of FIGS. 99 and 100 is shown. This inter-panel seal may function best if it is identical in profile to its associated, adjacent air bladder.

Referring now to FIG. 104, a perspective view of the inter-panel seal 73 of FIGS. 99 and 101 is shown.

Referring now to FIGS. 102 and 103, an abutment seal 75 of FIGS. 99 and 100 is shown. The abutment seal apparatus (or impounded water seal apparatus) 75 may comprise an upper, impounded water seal element 6000 that is fixedly attachable to a foundation slide surface adjacent water gate panel 6001, which seal element itself features a flexible flap portion (or more generally a foundation slide surface adjacent, impounded water seal element) 80 which may be held tightly against its corresponding abutment plate or abutment (or more generally foundation slide surface) 6002 by a combination of water pressure and possible also elastic action; a water gate panel conformable seal element 6003; and a longitudinal corner seal element 6004 and a thickness reduced, hingeable, upper, overflow orthogonal water gate panel edge conforming seal element 6006, and an abutment seal-to-foundation attachment element 82. The term foundation slide surface 6002 is intended to include any material that, as either part of the foundation or as an attachment to it (e.g., an abutment plate), is the surface against which the impounded water seal (more specifically the foundation slide surface adjacent, impounded water seal element 80) slides during rotation of the water gate panel. Note that the foundation in a dam setting is the body of the dam (usually concrete) such as the spillway or the abutment; in the case of much smaller water impoundment application, the foundation is the body (underlying and side). In any water control application, the foundation is essentially the solid body parts that exist before the addition of supplemental water control parts and is what the supplemental parts may be attached to. The elastic action may be enhanced by the provision of reinforcing cords 79. A flexible portion (or termed differently, a thickness reduced, hingeable, upper, overflow orthogonal water gate panel edge conforming water seal element) 81 allows the abutment seal to bend with its associated bladder hinge flap (portion 862 in FIG. 81). Portion 82 may preferably match its associated air bladder in thickness (D) and length (B). The abutment seal apparatus may further comprise an abutment seal-to-foundation attachment element 82 which serves to attach it to the foundation such as the spillway of a dam. This attachment element may comprise an abutment seal-to-foundation clampable retention element (which may be substantially flat, e.g.) and an abutment seal-to-foundation clamp retention enhancement element. Note that the abutment seal-to-foundation clampable retention element 6005 is termed substantially flat if it has a substantially flat upper or lower surface (a terminological definition that applies to any substantially flat clampable retention element). Flexible flap portion 80 may incorporate a low friction facing material such as polyethylene for use against abutments faced with stainless steel or epoxy for example. Said facing may be unnecessary in the case of UHMW (ultra-high molecular weight) polyethylene abutment plates. The abutment seal-to-foundation clamp retention enhancement element 6007 may have a substantially circular cross-sectional insert, such as a comma-type insert 21. The abutment seal-to-foundation attachment element 82 may comprise a wedge-shaped abutment seal-to-foundation clamp retention element (see relatedly, part 10 of FIG. 10), and may be configured to have an installed-configuration-adjacent wedge-shaped, gate panel actuator-to-foundation attachment element profile.

The foundation slide surface adjacent, impounded water seal element may be an abutment plate adjacent impounded water seal element (meaning it is capable of being positioned adjacent to (or is actually so positioned) an abutment plate), or a concrete foundation slide surface adjacent impounded water seal element (meaning it is capable of being positioned adjacent to (or is actually so positioned) a concrete foundation slide surface). The abutment plate may be polymeric (such as polyethylene, e.g.) or stainless steel, or rubber, or any low friction wear material. Certain limitations as to the compatibility of sliding surfaces do exist, however—polyethylene (and polymers in general) slide best (i.e., with minimal friction) against rubber, stainless steel, and concrete. The foundation slide surface adjacent impounded water seal element may comprise a low friction wear impounded water seal element that may be a polymeric (such as polyethylene) seal element. The polyethylene may be an ultra high molecular weight polyethylene seal element and/or may be a high density polyethylene seal element. The polymeric seal element may be co-vulcanized to a reinforced elastomer containing EPDM (ethylene propylene diene methylene) rubber, or may be co-vulcanized to a reinforced elastomer comprising EPDM rubber and chlorobutyl. Additionally, the foundation slide surface adjacent impounded water seal element may instead comprise a rubber seal element or a stainless steel seal element. It may also be elastically angularly biased, perhaps with a reinforcement ply enhanced bias, in order to improve the seal with the foundation slide surface. The thickness reduced, hingeable, upper, overflow orthogonal water gate panel edge conforming seal element may comprise a vertical, overflow orthogonal, abutment seal-to-foundation clamp face abutting, corner-augmented edge element 6010 that may be configured to abut substantially all proximate portions of an abutment seal-to-foundation clamp face 1051. Further, the thickness reduced, hingeable, upper, overflow orthogonal water gate panel edge conforming seal element and the abutment seal-to-foundation attachment element may be interference seal width dimensioned, meaning that the widths of these elements may be slightly oversized (perhaps by a quarter inch, e.g.) in order to allow tight compressive fitting upon installation. A heat element 6012 that may be any type of heater (electric, e.g.) may be installed (perhaps by integrally vulcanizing it into or substantially along the length of the foundation slide surface adjacent impounded water seal element) so that the foundation slide surface adjacent, impounded water seal element is thermally responsive to it and thus can prevent the formation of slide obstructing ice. The term substantially along the length includes substantially along only a majority portion of the length.

Referring now to FIGS. 105, 106, 107, 108, and 109 an abutment seal is show in accordance with one aspect of the present invention which may be configured for use in conjunction with a wedge type clamping system as is depicted in FIG. 109. Wedge portion 84 may be configured to match the adjoining hinge member 86 in cross section. Bendable portion 81 permits abutment seal 75 to flex with hinge member 86 as gate panel 914 is lowered and raised. Reinforced portion 85 may be clamped to gate panel 914. Flexible portion 80 may ride against adjoining abutment plate 966 while held in a tightly sealed position by a combination of elastic forces and water pressure. Face 87 is preferably fitted to adjoining hinge member 86 with a slight interference fit. Flexible portion 80 may feature a low friction surface 88 comprised of UHMW polyethylene for example. Low friction surface 88 is preferably designed to tightly fit the adjoining abutment plate. Due to the small distance of travel of this portion of the abutment seal, low friction facing 88 may generally not be required or desirable, but may be included nonetheless, in certain applications, for certain reasons.

Referring now to FIGS. 112, 113, 114, and 115, an inflatable dam (or inflatable elastomeric dam) in accordance with one aspect of the present invention is shown. Swirl inducing ribs 93 may be provided in alternating directions such that the direction flow of water over said inflatable dam may be altered to include a horizontal component normal to the primary direction of flow. In combination said horizontal flow components will in turn form opposing circulating flow patterns 96 and 97 which include velocity components normal to the body of the inflated dam. In this manner the effect of the fin 95 may be augmented. Stable operation may be possible at higher degrees of overtopping than would be possible with a fin arrangement only. Stress relief shape 94 may reduce internal stresses in the inflated dam and may increase the stiffness of the cantilevered fin feature 95. Inflatable dam 983 may be fixed to dam spillway or foundation 995 by means of clamp 101 and spillway groove 102.

A nappe aeration apparatus that avoids the nuisance and potentially destructive effects of oscillating or vibrating nappes while remaining resistant to destruction by debris overflowing impoundment structure and remaining relatively harmless to water craft is also within the ambit of the inventive technology. A nappe aeration apparatus may comprise an overtop flow mode dynamic object impact flexible nappe break element 9500; and a disengagable, flexible nappe break element-to-water impoundment element attachment element 9501 to which said overtop flow mode dynamic object impact flexible nappe break element is responsive. The term disengagable, flexible nappe break element-to-water impoundment element attachment element 9501 refers to a part (which could even comprise magnets and/or bolt holes, e.g.) that allows removal of the nappe breaker. The term overtop flow mode dynamic object impact flexible nappe break element means that a nappe break element is made sufficiently flexible (elastically, meaning after an impact it returns substantially to its pre-impact configuration) so as to absorb and flex without failure or substantial plastic deformation impacts from dynamic objects that one would expect to find flowing in an overtop flow. Rubber rafts and other small water craft (with and without passengers) are also possible items that one might expect to find flowing with an overtop flow. Here, the concern is for the safety of the passengers, and a sufficiently flexible nappe breaker will flex when struck by a rubber raft instead of puncturing or cutting it as many inflexible nappe breakers will. The nappe break element may be an a reinforced elastomeric nappe breaker.

Another nappe aeration apparatus may comprise a nappe break element 9505; a disengagable nappe break element-to-water impoundment element attachment element 9506 to which said nappe break element is responsive; and an overtop flow mode dynamic object impact flexure element 9507 to which said nappe break element is responsive. Essentially, in this second apparatus, the flex upon impact is provided not by the nappe breaker itself (such type of flex would be allowed by nappe breakers made from elastomers), but instead by a discrete flexure element such as a helical spring element or a flexible mounting stem (as but a few examples) to which the nappe breaker is responsive (as by attachment, e.g.) and which flexes (elastically, meaning after an impact it returns substantially to its pre-impact configuration) so as to absorb without failure or substantial plastic deformation impacts from dynamic objects that one would expect to find flowing in an overtop flow. Even if what appears to be the attachment element serves to allow flexure upon impact (e.g., in the case of a flexible stem), the attachment element is defined to be merely that part that enables attachment (perhaps there are fastener holes at the bottom of the stem or a surface at the bottom of the stem that can be epoxied and later removed), thus maintaining the discreteness of the different elements of the apparatus.

An improved impounded water control system operation maintenance apparatus may involve an excessive water gate panel rotation prevention element that, in a storage configuration, does not aesthetically impair the impoundment structure's (such as a dam) appearance. The improved impounded water control system operation maintenance apparatus may comprise a tensionable, excessive bottom-hinged water gate panel rotation prevention element 7020 (any material that is tension strong such as restraining straps that are made from nylon or an elastomeric material or an elastomeric cord, as but a few examples, and able to prevent excessive rotation of a water gate panel); a lower, excessive gate rotation prevention element-to-foundation attachment element 7001 (which serves to attach the tensionable excessive bottom-hinged water gate panel rotation prevention element to the foundation) to which the tensionable, excessive bottom-hinged water gate panel rotation prevention element is responsive and that is fixedly established between oppositely facing ends 7002 of end-proximate water gate panel actuators 7003; and an excessive gate rotation prevention element-to-gate panel attachment element (which serves to attach the tensionable, excessive, bottom-hinged water gate panel rotation prevention element 7020 to a portion of the water gate panel 7052) responsive to the tensionable, excessive bottom-hinged water gate panel rotation prevention element 103. The end-adjacent water gate panel actuators 7003 may be end-adjacent inflatable water gate panel actuation bladders 7005, and a downstream-most edge of the end-adjacent inflatable water gate panel actuation bladders 7006 may be located substantially at a drip plane 106. Further, each of the end-proximate water gate panel actuators 7003 may be responsive to at least one water gate actuator to foundation attachment element 7007, which may be a wedge-shaped, gate panel actuator-to-foundation clamp retention element 7008. In such a case, the apparatus may further comprise a wedge-shaped, gate panel actuator-to-foundation clamp retention element substitute insert 105 positioned substantially between opposing ends of proximate, wedge-shaped gate panel actuator-to-foundation clamp retention elements 7009. Such an insert may be termed an adjacent water gate actuator-to-foundation profile mimicking insert 105. The end-proximate water gate panel actuators may be end-proximate water gate panel floatation elements instead of inflatable actuators. A tensionable, excessive bottom-hinged water gate panel rotation prevention element length 7010, an upper, excessive gate rotation prevention element-to-gate panel attachment element location 7011, and a lower, excessive gate rotation prevention element-to-foundation attachment element location 7012 may be correlated so that a downstream-most end of said tensionable, excessive bottom-hinged water gate panel rotation prevention element 7020 is located substantially under a water control gate panel element 7052 in a lowered configuration (FIG. 117) thus precluding the unsightly appearance of protruding excessive gate panel rotation prevention apparatus in a lowered configuration 104. The tensionable, excessive bottom-hinged water gate panel rotation prevention element 7020 may be a tensionable, collapsible excessive bottom hinged water gate panel rotation prevention element 103, meaning that it can be folded or telescoped or coiled, e.g., or somehow amenable to reconfiguration from its tension mode shape to a different storage configuration when the tension is relieved. An actuatable water gate panel water control system (i.e., the water gate pane actuator, the gate panels and any sealing apparatus) that further comprises any of the above-mentioned improved impounded water control system apparatus is also deemed within the ambit of the inventive technology.

A separate improved impounded water control system operation maintenance apparatus that address the inventive out-of-the way configuration of excessive water gate panel rotation prevention elements in the area of abutments may comprise: a tensionable, excessive bottom-hinged water gate panel rotation prevention element; a lower, excessive gate rotation prevention element-to-foundation attachment element 7012 to which said tensionable, excessive bottom-hinged water gate panel rotation prevention element 7020 is responsive and that is fixedly established between a water gate panel actuator and a substantially vertical foundation surface (see FIGS. 132 and 133); and an upper, excessive gate rotation prevention element-to-gate panel attachment element 7011 responsive to said tensionable, excessive bottom-hinged water gate panel rotation prevention element 7010. The apparatus may comprise a wedge-shaped, gate panel actuator-to-foundation clamp retention element substitute insert 105 positioned substantially between a wedge-shaped gate panel actuator-to-foundation clamp retention element 9572 and a substantially vertical foundation surface 9571. Of course this and other substitute inserts are intended to take the place of the length of inflatable water gate panel actuator-to-foundation attachment element(s) that do not exist because of the shortening of the inflatable bladders that may take place in order to accommodate out-of-sight placement of the excessive gate panel rotation prevention element substantially below the gap between adjacent water gate panels. This placement is preferable to those approaches that reduce the cross-sectional size of the inflatable bladders to insufficient levels so that the length of the excessive gate panel rotation prevention elements (such as restraining straps, e.g.) positioned downstream (or upstream in a system whose actuator is on an impounded flow side) of the inflatable bladder need not exceed that length that results in protrusion of the straps, e.g., in a lowered configuration.

A related method for improving the appearance of a lowered configuration water control gate system comprises the steps of dimensioning (meaning shaping as by some manufacturing process, e.g.) a tensionable, excessive bottom-hinged water gate panel rotation prevention element 7020; establishing a lower, excessive gate rotation prevention element-to-foundation attachment element 7012 to which said tensionable, excessive bottom-hinged water gate panel rotation prevention element 7020 is responsive and that is fixedly established between proximate ends of proximate, vertically projecting flow control elements; and establishing an upper, excessive gate rotation prevention element-to-gate panel attachment element responsive to said tensionable, collapsible, excessive bottom-hinged water gate panel rotation prevention element 7020. The vertically projection flow control elements may be any flow control elements that project vertically, such as water gate panel actuators (such as inflatable water gate panel actuator bladders, or floatable water gate panel actuators), or foundation slide surfaces such as abutment surfaces. In one embodiment, the method may further comprise the step of establishing a wedge-shaped, gate panel actuator-to-foundation clamp retention element substitute insert substantially below a wedge-shaped interpanel seal-to-foundation clamp retention element and between impounded flow proximate (meaning upstream in a configuration where the actuator is on the downstream side of the gate panel; and downstream in a configuration where the actuator is on the upstream side of the gate panel) opposing ends (oppositely facing) of proximate, vertically projecting flow control elements. The method may further comprise the step of correlating the length of the tensionable, excessive bottom-hinged water gate panel rotation prevention element 7020 with a location of each of the lower, excessive gate rotation prevention element-to-foundation attachment element 7012 and the upper, excessive gate rotation prevention element-to-gate panel attachment element 7011 so that a downstream-most end of a detensioned, non-restraint configuration (e.g., collapsed and/or folded), tensionable, excessive bottom-hinged water gate panel rotation prevention element is located under a lowered water control gate panel 914.

Referring to FIGS. 116, 117, 118, and 119, a bottom hinged air actuated gate in accordance with the present invention is shown. Restraining straps, e.g. 103 may be located at the ends of air bladders 334 so that the air bladder size may be maximized or optimized. Generally, for gates over 2.5 meters high, the air bladder should be made as large as possible without extending beyond drip line 106. This results in a conventional restraining strap 104 which protrudes from beneath lowered gate panel 914. Protruding restraining straps may be deemed undesirable by some customers or owners. Gate panel 914 is preferably convexly curved to provide sufficient bending strength to accept the restraining strap loads at it ends. Air bladders 334 may be shortened enough to allow clearance for restraining straps 103 in both the raised and lowered positions. Insert 105, which may be made from reinforced rubber for example, may be used to fill the clamping system between air bladders 334 which do not directly adjoin due to the extra clearance C that may be provided for restraining straps 103.

Referring now to FIG. 79, the details of the preferred hinge means are shown. Movable gussets 806 are welded to movable hinge tube 801a. Fixed gussets 804 are welded to actuator guide tube 804a and to fixed hinge tube 801c. Hinge tubes 801a and 801c are held in proper relationship by wire rope 801b, which may follow a spiral FIG. 8 around hinge tubes 801a and 801c. The wire rope 801b is prevented from slipping by embedment in concrete between gussets 806 and gussets 804. The zone of rolling contact between wire rope 801b and hinge tubes 801a and 801c is left clear of concrete or other fixing means. In the case of a wire rope fixed with concrete, should the need arise to repair the hinge, the concrete between gussets may be selectively removed with a high pressure water jet.

Referring now to FIG. 80, a plan view of the arrangement depicted in FIG. 79 is shown.

Referring now to FIGS. 50 through 55, three different hinges are depicted—an "S" hinge, an integrated figure eight hinge, and a modular figure eight hinge—each of which is within the ambit of the inventive subject matter. The hinge depicted in FIGS. 110 and 111 may be termed a "W" hinge. The hinges themselves, in a general context that includes many applications in addition to water control, are inventive and each considered patentable.

As can be easily understood from the foregoing, the basic concepts of the present invention may be embodied in a variety of ways. It involves both water control and actuator techniques as well as devices to accomplish the appropriate water control or actuation. In this application, the water control techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims included in this patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon for the claims for this patent application. It should be understood that such language changes and broad claiming is accomplished in this filing. This patent application will seek examination of as broad a base of claims as deemed within the applicant's right and will be designed to yield a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "means for actuating" or an "actuator" should be understood to encompass disclosure of the act of "actuating"—whether explicitly discussed or not—and, conversely, were there effectively disclosure of the act of "actuating", such a disclosure should be understood to encompass disclosure of an "actuator" and even a "means for actuating". Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information disclosure statement or citation filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to claim at least: i) each of the water control actuator devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, x) the various combinations and permutations of each of the elements disclosed, and xi) each potentially dependent claim or concept as a dependency on each and every one of the independent claims or concepts presented. In this regard it should be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

What is claimed is:

1. A water gate panel seal slide friction abatement apparatus configured for placement between a water gate panel that is proximate an abutment of a water impoundment structure, and said abutment, said apparatus comprising:
 a plate element that is attached to a surface of said abutment of said water impoundment structure;
 a single, one-piece, abutment seal apparatus that itself includes:
  a first seal portion that is fixedly attached to an edge portion of said water gate panel, said water gate panel adjacent said plate element;
  a second seal portion that is connected with said first seal portion alongside said first seal portion, said second seal portion slideable against said plate element; and
  a third seal portion that is established below said first and second seal portions and that is attached to a water impoundment structure foundation;
said water gate panel seal slide friction abatement apparatus further comprising:
 a seal-to-foundation attachment element that attaches said third portion of said single, one-piece, abutment seal apparatus to said water impoundment structure foundation;
 wherein said plate element is dimensioned to contact said second seal portion throughout a possible water gate position vertical edge sweep; and
 a plate-to-abutment surface attachment element that attaches said plate element to said abutment surface.

2. A water gate panel seal slide friction abatement apparatus as described in claim 1 wherein said plate element is a polymeric plate element.

3. A water gate panel seal slide friction abatement apparatus as described in claim 2 wherein said polymeric plate element is an ultra-high molecular weight polymeric plate element.

4. A water gate panel seal slide friction abatement apparatus as described in claim 2 wherein said polymeric plate element is a high density polymeric plate element.

5. A water gate panel seal slide friction abatement apparatus as described in claim 2 wherein said polymeric plate element is a reinforced polymeric plate element.

6. A water gate panel seal slide friction abatement apparatus as described in claim 5 wherein said reinforced polymeric plate element is fiberglass reinforced polymeric plate element.

7. A water gate panel seal slide friction abatement apparatus as described in claim 2 wherein said polymeric plate element is a polyethylene plate element.

8. A water gate panel seal slide friction abatement apparatus as described in claim 1 wherein said plate-to-abutment surface attachment element comprises a plurality of fastener holes separated by an average, nearest fastener hole separation distance.

9. A water gate panel seal slide friction abatement apparatus as described in claim 8 wherein said average, nearest fastener hole separation distance divided by a polymeric plate element thickness is less than approximately 20.

10. A water gate panel seal slide friction abatement apparatus as described in claim 9 wherein said average, nearest fastener hole separation distance divided by said polymeric plate element thickness is less than approximately 12.

11. A water gate panel seal slide friction abatement apparatus as described in claim 10 wherein a plurality of fastener hole edges are recessed fastener hole edges.

12. A water gate panel seal slide friction abatement apparatus as described in claim 10 wherein said average, nearest fastener hole separation distance divided by said polymeric plate element thickness is approximately eight.

13. A water gate panel seal slide friction abatement apparatus as described in claim 1 wherein said plate-to-abutment surface attachment element comprises a plurality of recessed fastener hole edges.

14. A water gate panel seal slide friction abatement apparatus as described in claim 13 wherein a majority of said plurality of recessed fastener hole edges is each adapted to retain a plate element surface flush, low thermal conductivity material, fastener recession filler.

15. A water gate panel seal slide friction abatement apparatus as described in claim 1 wherein said plate element is a unitary plate.

16. A water gate panel seal slide friction abatement apparatus as described in claim 1 wherein said plate element comprises a plurality of plates.

17. A water gate panel seal slide friction abatement apparatus as described in claim 16 wherein at least two of said plurality of plates are adapted for separation in an installed configuration by a sealant accommodating groove.

18. A water gate panel seal slide friction abatement apparatus as described in claim 16 wherein said plurality of plates are fixedly attached to said abutment surface.

19. A water gate panel seal slide friction abatement apparatus as described in claim 18 wherein said fixedly attached plurality of plates are separated by a sealant accommodating groove.

20. A water gate panel seal slide friction abatement apparatus as described in claim 1 wherein said plate element comprises a thermal plate buckling effect mitigative significant number of fastener holes.

21. A water gate panel seal slide friction abatement apparatus as described in claim 1 wherein said polymeric plate element has a thermal plate buckling effect mitigative thickness.

22. A water gate panel seal slide friction abatement apparatus as described in claim 1 wherein said single, one-piece, abutment seal apparatus further comprises a cross-sectionally enlarged section that is connected with said third seal portion, said cross-sectionally enlarged section enhancing retention of said third seal portion to said water impoundment structure foundation.

23. A water gate panel seal slide friction abatement apparatus as described in claim 22 wherein said cross-sectionally enlarged portion comprises an insert.

24. A water gate panel seal slide friction abatement apparatus as described in claim 22 wherein said cross-sectionally enlarged portion is wedge-shaped.

25. An impounded water seal method comprising the steps of:
fixedly attaching a plate element to a surface of an abutment of a water impoundment structure;
fixedly attaching a first seal portion of a single, one-piece, abutment seal apparatus to an edge portion of a water gate panel that is adjacent said plate element after said plate element is attached to said abutment surface; and
sliding a second seal portion of said single, one-piece, abutment seal apparatus against said plate element, said second seal portion connected with and alongside said first seal portion,
wherein said plate element is dimensioned to contact said second seal portion throughout a possible water gate position edge sweep,
said method further comprising the step of attaching a third seal portion of said single, one-piece, abutment seal apparatus to a foundation of said water impoundment structure.

26. An impounded water seal method as described in claim 25 further comprising the step of elastically biasing said second seal portion towards said plate element.

27. An impounded water seal method as described in claim 26 wherein said step of elastically biasing said second seal portion towards said plate element comprises the step of angularly elastically biasing said second seal portion towards said plate element.

28. An impounded water seal method as described in claim 25 wherein said single, one-piece, abutment seal apparatus comprises reinforcement plies.

29. An impounded water seal method as described in claim 25 wherein said single, one-piece, abutment seal apparatus comprises a flexible flap.

30. An impounded water seal method as described in claim 25 wherein said single, one-piece, abutment seal apparatus comprises a polymeric seal element.

31. An impounded water seal method as described in claim 30 wherein said polymeric seal element comprises polyethylene.

32. An impounded water seal method as described in claim 25 wherein said single, one-piece, abutment seal apparatus is co-vulcanized to a reinforced elastomer that comprises EPDM rubber.

33. An impounded water seal method as described in claim 25 wherein said second seal portion comprises a stainless steel edge.

34. An impounded water seal method as described in claim 25 wherein said single, one-piece, abutment seal apparatus comprises a substantially elastomeric seal element.

35. An impounded water seal method as described in claim 25 further comprising the step of establishing a heat element to which said second seal element is thermally responsive.

36. An impounded water seal method as described in claim 35 wherein said heat element is integrally vulcanized along the length of said second seal element.

37. An impounded water seal method as described in claim 25 further comprising the step of abating slide friction during movement of said single, one-piece, abutment seal.

38. An impounded water seal method as described in claim 25 wherein said plate element is a polymeric plate element.

39. An impounded water seal method as described in claim 38 wherein said polymeric plate element is a reinforced polymeric plate element.

40. An impounded water seal method as described in claim 25 wherein said plate element is a stainless steel plate element.

41. An impounded water seal method as described in claim 25 wherein said plate element comprises a thermal plate buckling effect mitigative significant number of fastener holes.

42. An impounded water seal method as described in claim 25 wherein said plate element has a thermal plate buckling effect mitigative thickness.

43. An impounded water seal method as described in claim 25 further comprising the step of enhancing retention of said third seal portion to said foundation of said water impoundment structure with a cross-sectionally enlarged section that is connected with said third seal portion.

44. An impounded water seal method as described in claim 43 wherein said cross-sectionally enlarged portion comprises an insert.

45. An impounded water seal method as described in claim 43 wherein said cross-sectionally enlarged portion is wedge-shaped.

* * * * *